US012230925B2

(12) United States Patent
Lee et al.

(10) Patent No.: US 12,230,925 B2
(45) Date of Patent: Feb. 18, 2025

(54) HIGH-SPEED CONNECTOR

(71) Applicant: Cheng Uei Precision Industry Co., LTD., New Taipei (TW)

(72) Inventors: Yun-Chien Lee, New Taipei (TW); Yi-Ching Hsu, New Taipei (TW); Chun-Fu Lin, New Taipei (TW); Yu-Hung Su, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 360 days.

(21) Appl. No.: 17/966,887

(22) Filed: Oct. 17, 2022

(65) Prior Publication Data

US 2023/0187881 A1 Jun. 15, 2023

(30) Foreign Application Priority Data

Dec. 13, 2021 (CN) ......................... 202123121951.9

(51) Int. Cl.
*H01R 13/6585* (2011.01)
*H01R 13/6471* (2011.01)
*H01R 13/6597* (2011.01)

(52) U.S. Cl.
CPC ..... *H01R 13/6585* (2013.01); *H01R 13/6471* (2013.01); *H01R 13/6597* (2013.01)

(58) Field of Classification Search
CPC ............ H01R 13/6585; H01R 13/6586; H01R 13/6587; H01R 13/6591; H01R 13/6597; H01R 13/6461; H01R 13/6471
USPC ..................................................... 439/607.05
See application file for complete search history.

(56) References Cited

U.S. PATENT DOCUMENTS

| | | | | |
|---|---|---|---|---|
| 11,894,632 B2 * | 2/2024 | Huang | H01R 13/405 |
| 2021/0075164 A1 * | 3/2021 | Chen | H01R 13/2464 |
| 2022/0344854 A1 * | 10/2022 | Huang | H01R 13/6471 |
| 2022/0344877 A1 * | 10/2022 | Lin | H01R 13/6597 |
| 2023/0144251 A1 * | 5/2023 | Lee | H01R 13/6585 439/607.05 |
| 2023/0187881 A1 * | 6/2023 | Lee | H01R 13/6585 439/607.05 |

* cited by examiner

*Primary Examiner* — Khiem M Nguyen
(74) *Attorney, Agent, or Firm* — Cheng-Ju Chiang

(57) ABSTRACT

A high-speed connector includes an insulating housing, and at least one terminal assembly disposed in the insulating housing. The at least one terminal assembly includes a base body, a plurality of terminals fastened to the base body, and a metal block. A surface of the base body is recessed inward to form a fastening groove. The plurality of the terminals include a plurality of grounding terminals and differential signal terminals. Each of the plurality of the grounding terminals and the differential signal terminals has a fastening portion. The fastening portions of at least several of the plurality of the grounding terminals and the differential signal terminals are exposed to the fastening groove. The metal block is fastened in the fastening groove. The fastening portions of the grounding terminals which are exposed to the fastening groove are electrically connected with the metal block to form a grounding structure.

20 Claims, 29 Drawing Sheets

HIGH-SPEED CONNECTOR

CROSS-REFERENCE TO RELATED APPLICATION

The present application is based on, and claims priority from, China Patent Application No. 202123121951.9, filed Dec. 13, 2021, the disclosure of which is hereby incorporated by reference herein in its entirety.

BACKGROUND OF THE INVENTION

1. Field of the Invention

The present invention generally relates to a high-speed connector, and more particularly to a high-speed connector which improves transmission quality of a high-frequency signal of the high-speed connector by adjusting a dielectric coefficient of a peripheral structure of a terminal of the high-speed connector, and improves an electromagnetic characteristic and a crosstalk interference of the high-speed connector.

2. The Related Art

A current high-speed connector usually includes a grounding plate and a plurality of grounding terminals. The plurality of the grounding terminals are connected to the grounding plate for reducing an insertion loss and a crosstalk interference. The grounding plate has a main body, and a plurality of elastic arms extended from the main body. The main body is a sheet shape. The plurality of the elastic arms are mostly integrally stamped with the main body in forms of cantilever beams. However, a structural strength of the grounding plate is insufficient, and the grounding plate hardly shields differential signal terminals of the current high-speed connector, so the grounding plate has a space that is able to be further improved to benefit a performance improvement of the current high-speed connector.

A conventional high-speed connector includes a housing, an insulating core inserted into the housing, a plurality of terminals fixed to the insulating core, a shielding structure and a transmission module. The plurality of the terminals include a plurality of first conductive terminals fixed to the insulating core, and a plurality of second conductive terminals fixed to the insulating core. The plurality of the first conductive terminals are arranged along a transverse direction. The plurality of the first conductive terminals include two differential signal terminals and two grounding terminals. The two grounding terminals are located adjacent to two opposite outer sides of the two differential signal terminals. The shielding structure has a base material assembled to the housing, and a metallic plating layer plated to the base material. The metallic plating layer contacts with the two grounding terminals to establish an electrical connection between the two grounding terminals. The metallic plating layer is arranged at the two opposite outer sides of the two differential signal terminals, so the metallic plating layer shields the two differential signal terminals along the transverse direction.

However, the above-mentioned shielding structure of the high-speed connector is fully covered with the metallic plating layer to achieve a shielding function, the high-speed connector has following disadvantages, when a signal is radiated towards the metallic plating layer, and the signal contacts with the metallic plating layer, a signal reflection is generated and an oscillation is easily caused to generate many unnecessary resonance points. When the high-speed connector transmits higher speed signals, a high-frequency characteristic of the high-speed connector becomes poorer. When high-frequency signals are transmitted among adjacent terminals, a crosstalk interference of the high-speed connector is hardly avoided. Moreover, the above-mentioned shielding structure of the high-speed connector is fully covered with the metallic plating layer to make the high-frequency characteristic poorer, so a crosstalk effect is affected.

Therefore, it is necessary to provide an innovative high-speed connector which improves transmission quality of a high-frequency signal of the high-speed connector by adjusting a dielectric coefficient of a peripheral structure of a terminal of the high-speed connector, and improves an electromagnetic characteristic and a crosstalk interference of the high-speed connector.

SUMMARY OF THE INVENTION

An object of the present invention is to provide a high-speed connector which improves transmission quality of a high-frequency signal of the high-speed connector by adjusting a dielectric coefficient of a peripheral structure of a terminal of the high-speed connector, and improving an electromagnetic characteristic and a crosstalk interference of the high-speed connector. The high-speed connector includes an insulating housing, and at least one terminal assembly disposed in the insulating housing. The at least one terminal assembly includes a base body, a plurality of the terminals fastened to the base body, and a metal block. A surface of the base body is recessed inward to form a fastening groove. The plurality of the terminals include a plurality of grounding terminals and a plurality of differential signal terminals. Each of the plurality of the grounding terminals and the differential signal terminals has a fastening portion. Two opposite ends of the fastening portion are connected with a contacting portion and a soldering portion. The fastening portions of the plurality of the grounding terminals and the differential signal terminals are fastened in the base body, and the fastening portions of at least several of the plurality of the grounding terminals and the differential signal terminals are exposed to the fastening groove. The metal block is fastened in the fastening groove. The metal block has a main plate. Several portions of a surface of the main plate protrude towards the plurality of the grounding terminals to form a plurality of contacting blocks. The main plate defines at least one slit penetrating through two opposite surfaces of the main plate along an up-down direction. The at least one slit is formed between two adjacent contacting blocks. The fastening portions of the grounding terminals which are exposed to the fastening groove are electrically connected with the plurality of the contacting blocks of the metal block to form a grounding structure. Each two adjacent differential signal terminals are disposed between two grounding terminals. Each two adjacent differential signal terminals which are disposed between the two grounding terminals form a differential signal terminal pair. The at least one slit is aligned with an interstice which is formed between the two fastening portions of the two adjacent differential signal terminals of at least one differential signal terminal pair, and the two fastening portions of the two adjacent differential signal terminals of the at least one differential signal terminal pair are exposed to the fastening groove. An extending direction of the at least one slit and extending directions of the two fastening portions of the two adjacent differential signal terminals of the at least one differential signal terminal pair are the same. The main plate keeps distances from the two fastening portions of the two adjacent differential signal terminals of the at least one differential signal terminal pair.

Another object of the present invention is to provide a high-speed connector. The high-speed connector includes an insulating housing, and at least one terminal assembly disposed in the insulating housing. The at least one terminal assembly includes a base body, a plurality of terminals fastened to the base body, and a metal block. A surface of the base body is recessed inward to form a fastening groove. The plurality of the terminals include a plurality of grounding terminals and a plurality of differential signal terminals. Each of the plurality of the grounding terminals and the differential signal terminals has a fastening portion. Two opposite ends of the fastening portion are connected with a contacting portion and a soldering portion. The fastening portions of the plurality of the grounding terminals and the differential signal terminals are fastened in the base body, and the fastening portions of at least several of the plurality of the grounding terminals and the differential signal terminals are exposed to the fastening groove. The metal block is fastened in the fastening groove. The metal block has a main plate. Several portions of a surface of the main plate protrude towards the plurality of the grounding terminals to form a plurality of contacting blocks. The main plate defines at least one slit penetrating through two opposite surfaces of the main plate along an up-down direction. The at least one slit is formed between two adjacent contacting blocks. The fastening portions of the grounding terminals which are exposed to the fastening groove are electrically connected with the plurality of the contacting blocks of the metal block to form a grounding structure. Each two adjacent differential signal terminals are disposed between two grounding terminals. Each two adjacent differential signal terminals which are disposed between the two grounding terminals form a differential signal terminal pair. The at least one slit is aligned with an interstice which is formed between the two fastening portions of the two adjacent differential signal terminals of at least one differential signal terminal pair, and the two fastening portions of the two adjacent differential signal terminals of the at least one differential signal terminal pair are exposed to the fastening groove. An extending direction of the at least one slit and extending directions of the two fastening portions of the two adjacent differential signal terminals of the at least one differential signal terminal pair are the same. The main plate keeps distances from the two fastening portions of the two adjacent differential signal terminals of the at least one differential signal terminal pair. Each contacting block of the at least one terminal assembly is rectangular.

Another object of the present invention is to provide a high-speed connector. The high-speed connector includes an insulating housing, and at least one terminal assembly disposed in the insulating housing. The at least one terminal assembly includes a base body, a plurality of terminals fastened to the base body, a metal block and a laminar structure. Two opposite surfaces of the base body are recessed inward to form a fastening groove and a locating groove, respectively. The plurality of the terminals include a plurality of grounding terminals and a plurality of differential signal terminals. Each of the plurality of the grounding terminals and the differential signal terminals has a fastening portion. Two opposite ends of the fastening portion are connected with a contacting portion and a soldering portion. The fastening portions of the plurality of the grounding terminals and the differential signal terminals are fastened in the base body, and two opposite surfaces of each fastening portion of the plurality of the grounding terminals and the differential signal terminals which are fastened to two sides of the at least one terminal assembly are exposed to the fastening groove and the locating groove, respectively. The metal block is fastened in the fastening groove. The metal block has a main plate. Several portions of a surface of the main plate protrude towards the plurality of the grounding terminals to form a plurality of contacting blocks. The main plate defines at least one slit penetrating through two opposite surfaces of the main plate along an up-down direction. The at least one slit is formed between two adjacent contacting blocks. The fastening portions of the grounding terminals which are exposed to the fastening groove are electrically connected with the plurality of the contacting blocks of the metal block to form a grounding structure. The laminar structure is fastened in the locating groove. Each two adjacent differential signal terminals are disposed between two grounding terminals. Each two adjacent differential signal terminals which are disposed between the two grounding terminals form a differential signal terminal pair. The at least one slit is aligned with an interstice which is formed between the two fastening portions of the two adjacent differential signal terminals of at least one differential signal terminal pair, and the two fastening portions of the two adjacent differential signal terminals of the at least one differential signal terminal pair are exposed to the fastening groove. An extending direction of the at least one slit and extending directions of the two fastening portions of the two adjacent differential signal terminals of the at least one differential signal terminal pair are the same. The main plate keeps distances from the two fastening portions of the two adjacent differential signal terminals of the at least one differential signal terminal pair. The laminar structure is spaced from the main plate and each two adjacent contacting blocks of the metal block to form an internal space between the laminar structure and the metal block. The fastening portions of the differential signal terminals of the two sides of the at least one terminal assembly pass through the internal spaces which are formed between the laminar structure and the metal block. One surface of each fastening portion of the differential signal terminals of the two sides of the at least one terminal assembly faces an inner surface of the laminar structure. The one surface of each fastening portion of the differential signal terminals of the two sides of the at least one terminal assembly is spaced from the inner surface of the laminar structure to form a clearance between the one surface of each fastening portion of the differential signal terminals of the two sides of the at least one terminal assembly and the inner surface of the laminar structure.

As described above, the contacting blocks of the metal block contact with the grounding terminals of the at least one terminal assembly to form the grounding structures, so that a signal noise is able to be effectively absorbed and the signal noise is able to be effectively restrained for improving the transmission quality of the high-frequency signal of the high-speed connector. Furthermore, a first internal space and each first gap of a first dielectric structure are used for adjusting a dielectric coefficient of a peripheral structure of each first terminal, a second internal space and each second gap of a second dielectric structure are used for adjusting a dielectric coefficient of a peripheral structure of each third terminal, a third internal space and a first clearance are used for adjusting a dielectric coefficient of a peripheral structure of each third terminal of the high-speed connector, and each fourth internal space and a second clearance are used for adjusting a dielectric coefficient of a peripheral structure of each fourth terminal of the high-speed connector to improve the electromagnetic characteristic and the crosstalk interference of the high-speed connector. In addition, a first slit of a first metal block, a second slit of a second metal block, a third slit of a third metal block and a fourth slit of a fourth metal block are used to improve an electromagnetic field crosstalk interference so as to improve the crosstalk interference of the high-speed connector. As a result, the high-speed connector improves the transmission quality of the high-frequency signal of the high-speed connector by adjusting the dielectric coefficient of the peripheral structure of the terminal of the high-speed connector, the high-speed connector improves the electromagnetic characteristic and the crosstalk interference of the high-speed connector.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
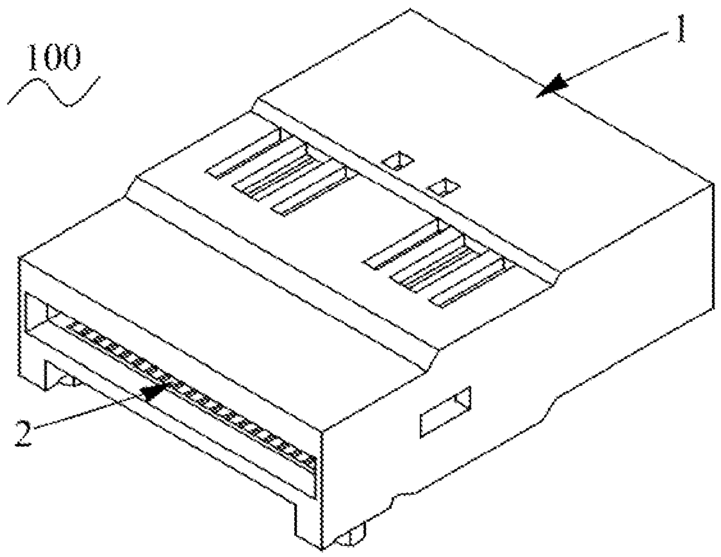
FIG. 1 is a perspective view of a high-speed connector in accordance with the present invention.
Figure 2:
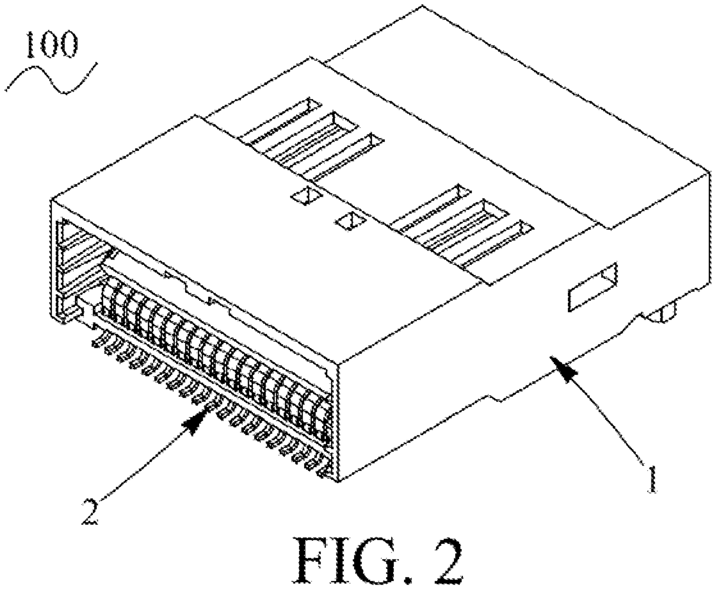
FIG. 2 is another perspective view of the high-speed connector in accordance with the present invention.

Referring to FIG. 1 and FIG. 2, a high-speed connector 100 in accordance with a first preferred embodiment of the present invention is shown. The high-speed connector 100 includes an insulating housing 1 and a terminal module 2. The terminal module 2 is disposed in the insulating housing 1.

Figure 3:
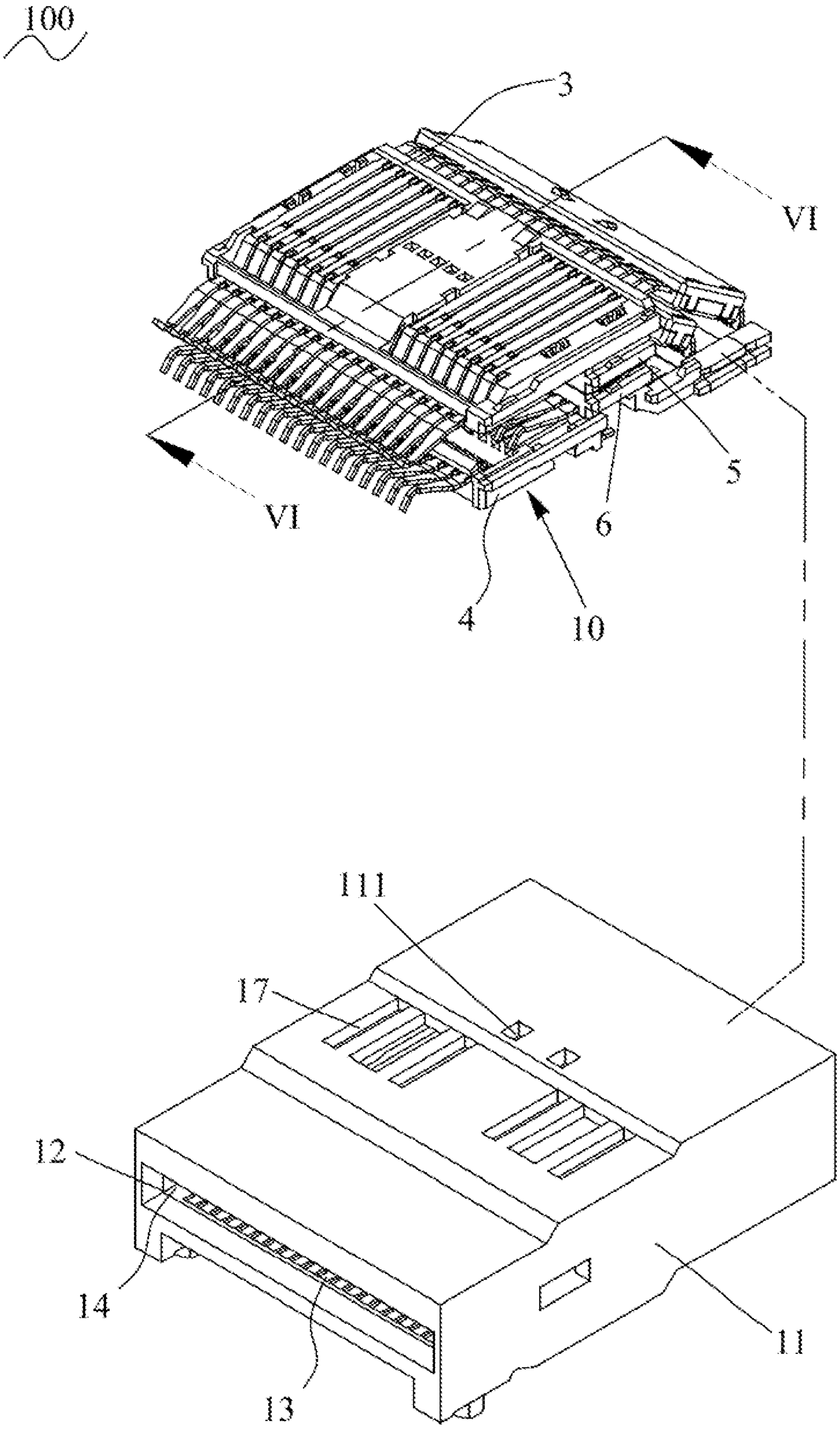
FIG. 3 is a partially exploded view of the high-speed connector of FIG. 1.
Figure 4:
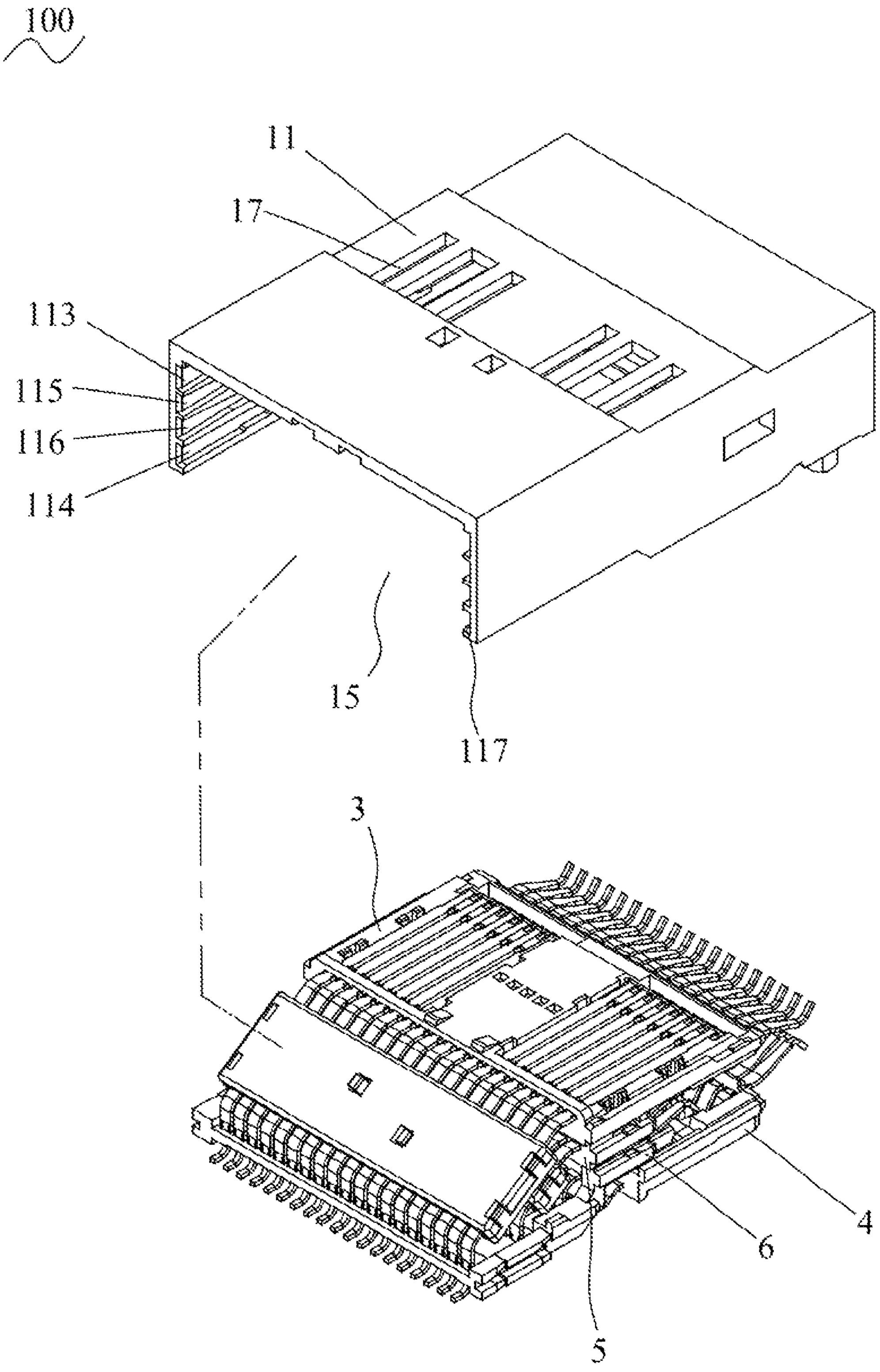
FIG. 4 is another partially exploded view of the high-speed connector of FIG. 3.
Figure 5:
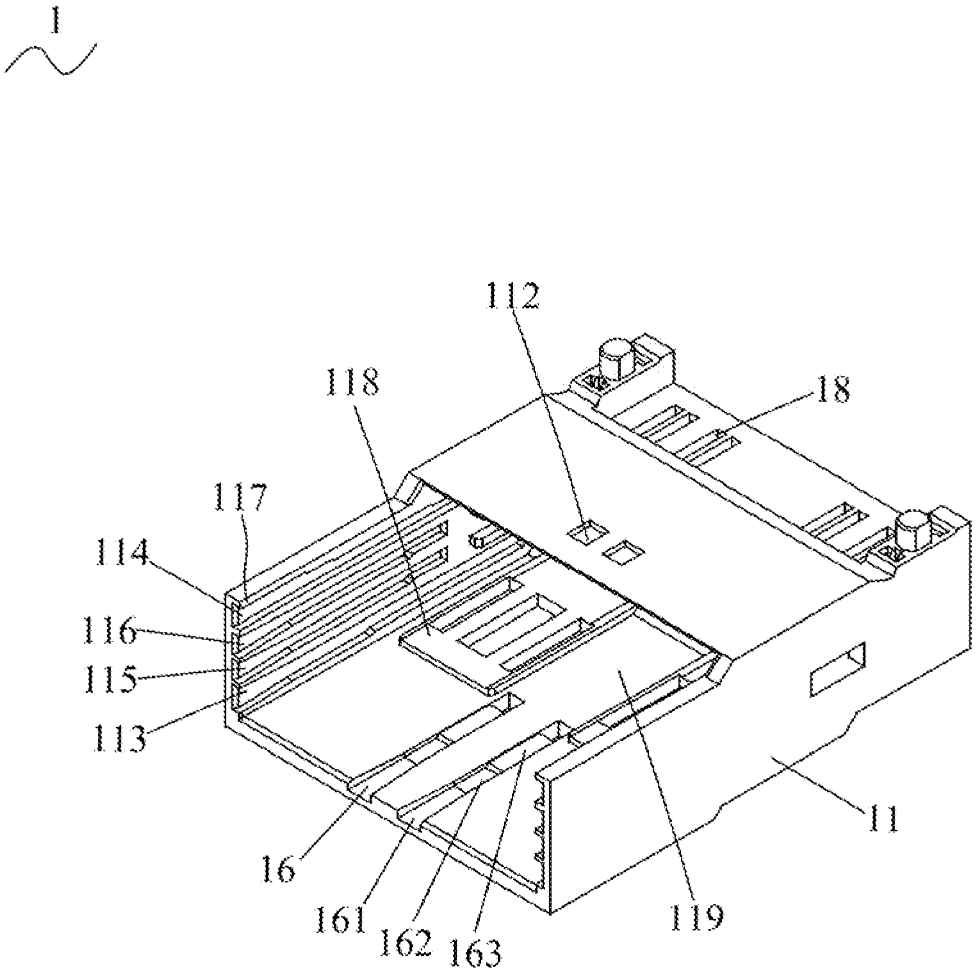
FIG. 5 is a perspective view of an insulating housing of the high-speed connector of FIG. 3.
Figure 6:
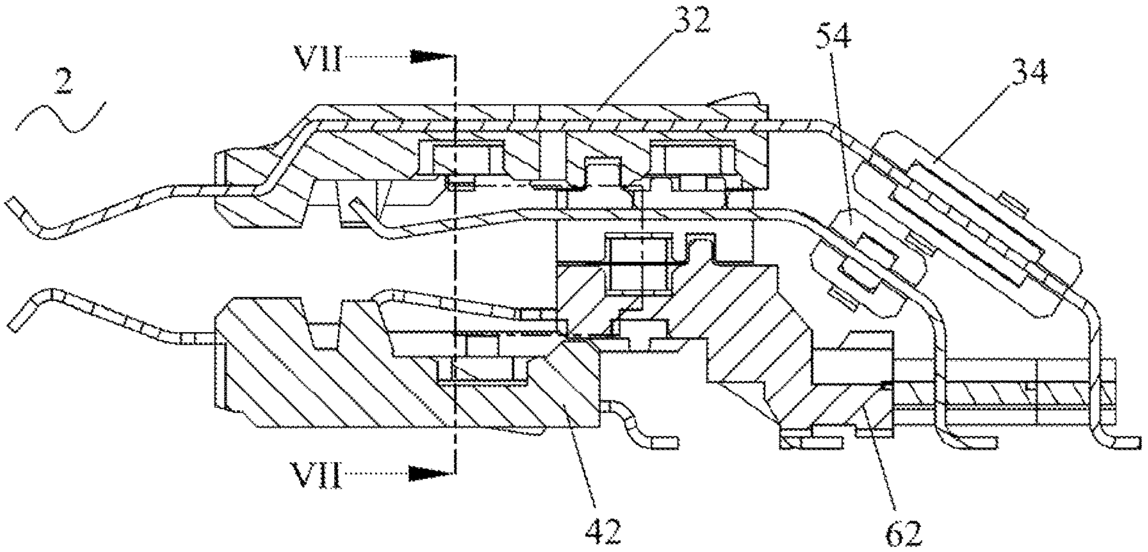
FIG. 6 is a cross-sectional view of the high-speed connector along a line VI-VI of FIG. 3.
Figure 7:
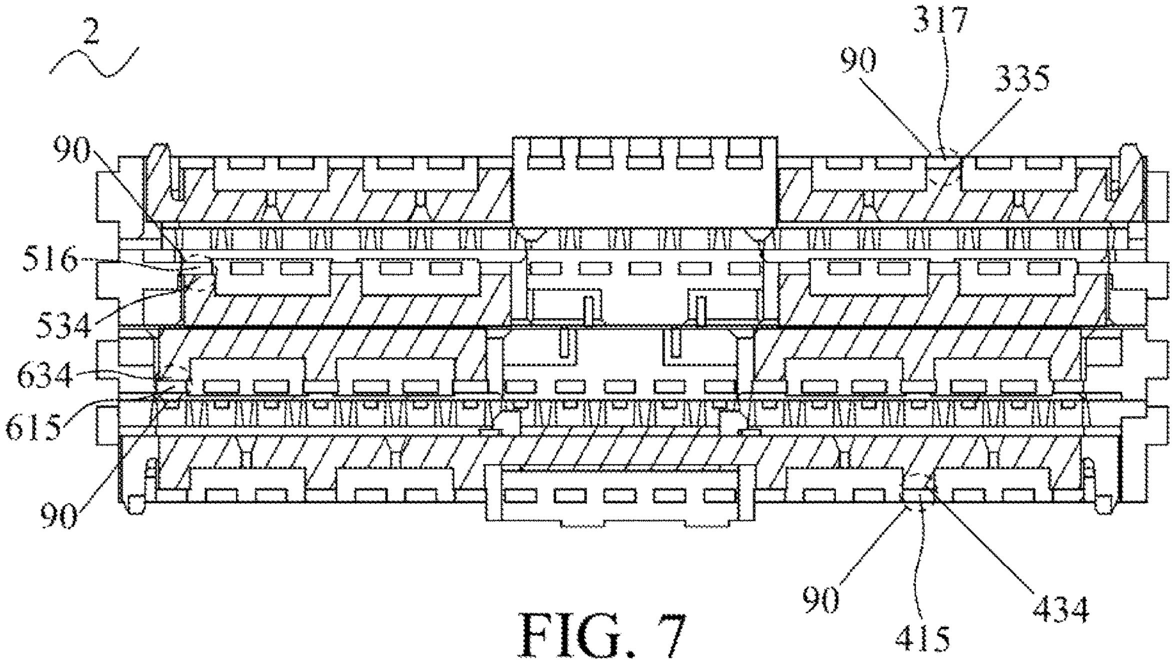
FIG. 7 is a cross-sectional view of the high-speed connector along a line VII-VII of FIG. 6.
Figure 8:
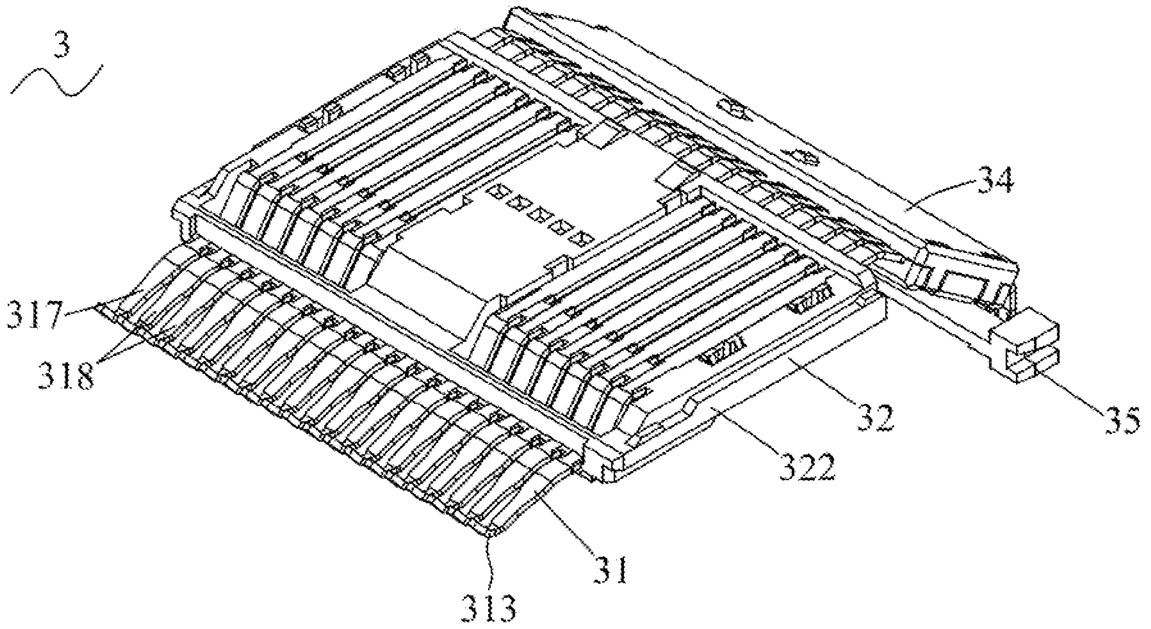
FIG. 8 is a perspective view of a first terminal assembly of a terminal module of the high-speed connector in accordance with a first preferred embodiment of the present invention.
Figure 9:
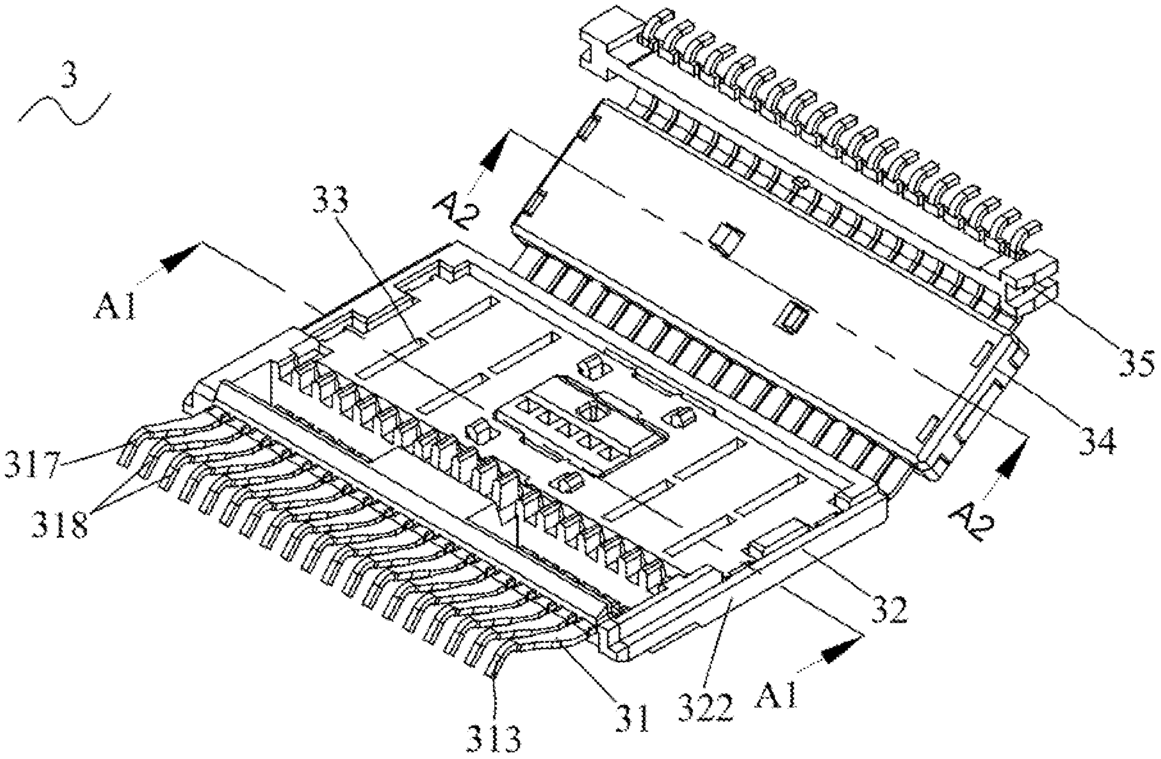
FIG. 9 is another perspective view of the first terminal assembly of the terminal module of the high-speed connector of FIG. 8.
Figure 10:
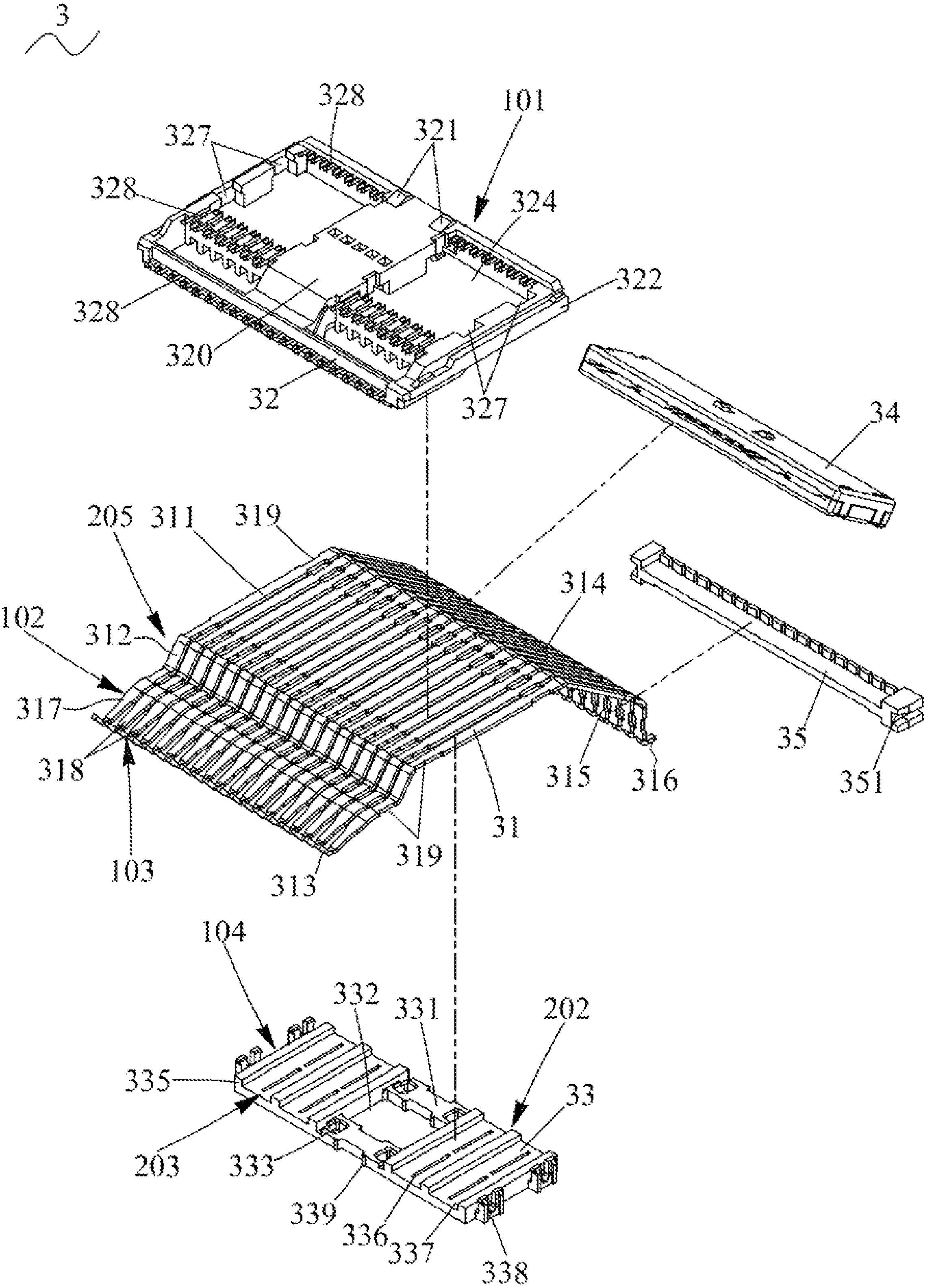
FIG. 10 is an exploded view of the first terminal assembly of the terminal module of the high-speed connector of FIG. 9.
Figure 11:
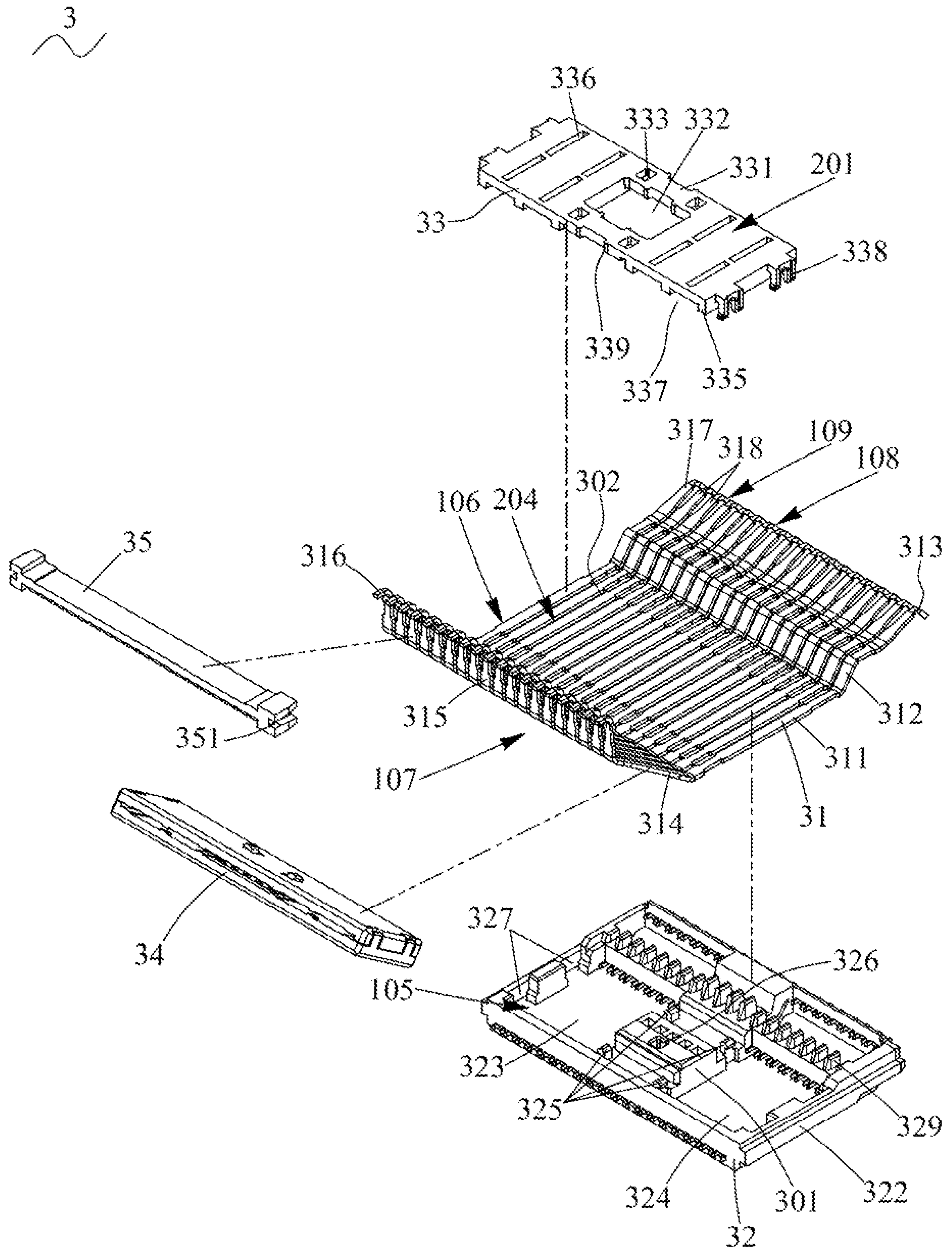
FIG. 11 is another exploded view of the first terminal assembly of the terminal module of the high-speed connector of FIG. 9.
Figure 12:
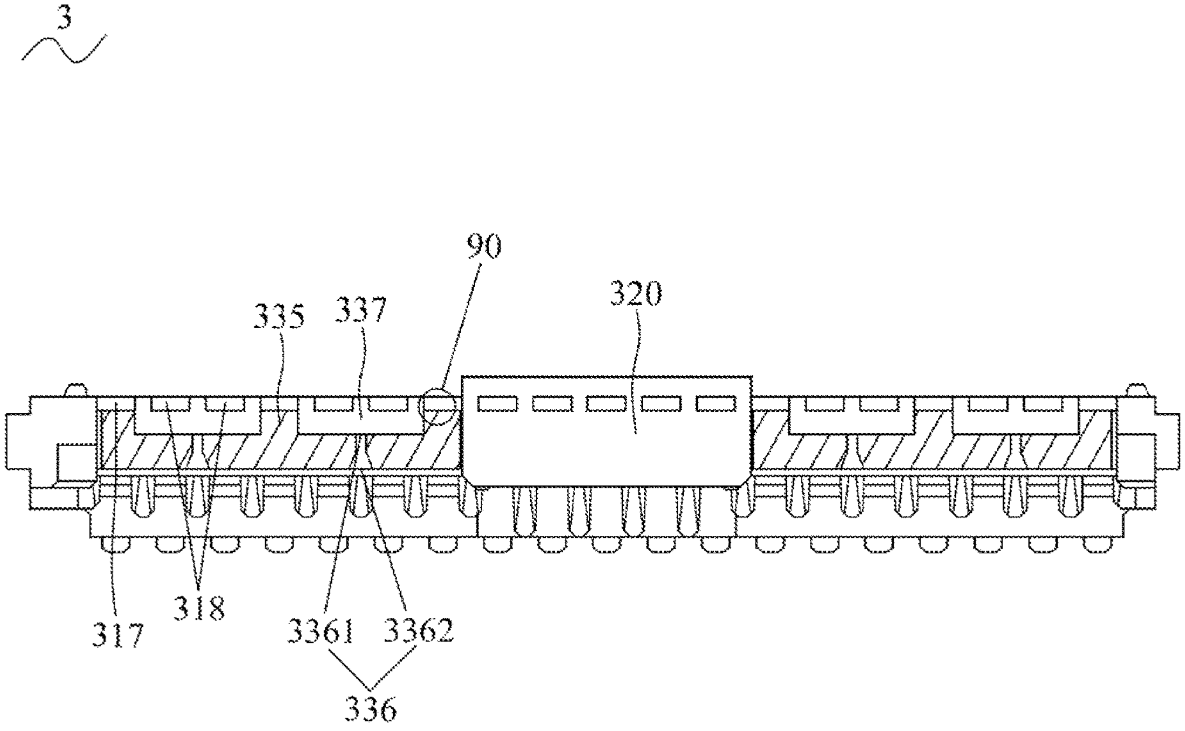
FIG. 12 is a cross-sectional view of the first terminal assembly of the high-speed connector along a line A1-A1 of FIG. 9.

Referring to FIG. 3 to FIG. 5, the insulating housing 1 has a main portion 11, and an accommodating space 12 formed in a rear end of an inside of the main portion 11. The accommodating space 12 penetrates through a rear end of a bottom surface of the main portion 11. Several portions of a front end of the inside of the main portion 11 are recessed inward to form a plurality of first terminal slots 13. The plurality of the first terminal slots 13 are arranged in an upper row and a lower row. Several portions of an upper portion of the front end of the inside of the main portion 11 are recessed inward to form the upper row of the first terminal slots 13 penetrating through a bottom surface of the upper portion of the front end of the inside of the main portion 11. Several portions of a lower portion of the front end of the inside of the main portion 11 are recessed inward to form the lower row of the first terminal slots 13 penetrating through a top surface of the lower portion of the front end of the inside of the main portion 11. The plurality of the first terminal slots 13 are located in front of the accommodating space 12. The plurality of the first terminal slots 13 are communicated with the accommodating space 12.

A middle of a front end of the main portion 11 defines an insertion groove 14. The insertion groove 14 longitudinally penetrates through the front end of the main portion 11. The insertion groove 14 is positioned between the upper row of the first terminal slots 13 and the lower row of the first terminal slots 13. The insertion groove 14 is communicated between the upper row of the first terminal slots 13 and the lower row of the first terminal slots 13. A rear end of the main portion 11 defines an assembling groove 15 penetrating through a rear surface of the main portion 11. The insertion groove 14 is located in front of the accommodating space 12. The insertion groove 14 is communicated with the accommodating space 12. The assembling groove 15 is located behind the accommodating space 12. The assembling groove 15 is communicated with the accommodating space 12.

Referring to FIG. 3 to FIG. 6, the terminal module 2 is inserted into the accommodating space 12 of the insulating housing 1 from the assembling groove 15 of the insulating housing 1. The terminal module 2 includes a first terminal assembly 3, a second terminal assembly 4, a third terminal assembly 5 and a fourth terminal assembly 6 which are mounted in the insulating housing 1. In a concrete implementation, the terminal module 2 is without being limited to include the first terminal assembly 3, the second terminal assembly 4, the third terminal assembly 5 and the fourth terminal assembly 6. The first terminal assembly 3 is corresponding to the second terminal assembly 4. The third terminal assembly 5 is corresponding to the fourth terminal assembly 6.

The first terminal assembly 3 and the second terminal assembly 4 are disposed opposite to each other. The first terminal assembly 3 and the second terminal assembly 4 form a QSFP (Quad Small Form-Factor Pluggable) terminal assembly. The third terminal assembly 5 and the fourth terminal assembly 6 are disposed opposite to each other. The third terminal assembly 5 and the fourth terminal assembly 6 form another QSFP terminal assembly. The third terminal assembly 5 and the fourth terminal assembly 6 are mounted between the first terminal assembly 3 and the second terminal assembly 4. In the concrete implementation, the high-speed connector 100 includes the first terminal assembly 3, the second terminal assembly 4, the third terminal assembly 5 and the fourth terminal assembly 6 to form a QSFP-DD (Quad Small Form Factor Pluggable-Double Density) high-speed connector. The high-speed connector 100 is able to just include the first terminal assembly 3 and the second terminal assembly 4 to form the QSFP high-speed connector. The high-speed connector 100 is also able to include the third terminal assembly 5 and the fourth terminal assembly 6 to form the QSFP high-speed connector.

A top of the main portion 11 of the insulating housing 1 has at least one first through-hole 111 vertically penetrating through the top of the main portion 11 of the insulating housing 1. In the first preferred embodiment, the top of the main portion 11 of the insulating housing 1 has two first through-holes 111 arranged along a transverse direction. The two first through-holes 111 vertically penetrate through the top of the main portion 11. A corresponding mechanism of the first terminal assembly 3 is fastened in the at least one first through-hole 111 of the insulating housing 1, so that the first terminal assembly 3 is fastened in the insulating housing 1. A bottom of the main portion 11 of the insulating housing 1 has at least one second through-hole 112 vertically penetrating through the bottom of the main portion 11. In the first preferred embodiment, the bottom of the main portion 11 of the insulating housing 1 has two second through-holes 112 arranged along the transverse direction. The two second through-holes 112 vertically penetrate through the bottom of the main portion 11. A corresponding mechanism of the second terminal assembly 4 is fastened in the at least one second through-hole 112 of the insulating housing 1, so that the second terminal assembly 4 is fastened in the insulating housing 1.

Two upper portions of two opposite inner side surfaces of the rear end of the main portion 11 are recessed oppositely to form two first locating slots 113. Two lower portions of the two opposite inner side surfaces of the rear end of the main portion 11 are recessed oppositely to form two second locating slots 114. Two tops of two middle portions of the two opposite inner side surfaces of the rear end of the main portion 11 are recessed oppositely to form two third locating slots 115. Two bottoms of the two middle portions of the two opposite inner side surfaces of the rear end of the main portion 11 are recessed oppositely to form two fourth locating slots 116. Corresponding areas of the first terminal assembly 3, the second terminal assembly 4, the third terminal assembly 5 and the fourth terminal assembly 6 of the terminal module 2 are buckled to the two first locating slots 113, the two second locating slots 114, the two third locating slots 115 and the two fourth locating slots 116 of the insulating housing 1, so that the terminal module 2 is fastened in the insulating housing 1.

Referring to FIG. 5, FIG. 10, FIG. 11, FIG. 23 and FIG. 24, The two first locating slots 113, the two third locating slots 115, the two fourth locating slots 116 and the two second locating slots 114 are sequentially disposed along an up-down direction. The two lower portions of the two opposite inner side surfaces of the rear end of the main portion 11 extend towards each other to from two protruding ribs 117. The two protruding ribs 117 are defined as two lower walls of the two second locating slots 114. Two middles of two outer surfaces of two corresponding rear areas of the first terminal assembly 3 are recessed inward to form two first clamping slots 351. Two middles of two outer surfaces of two corresponding rear areas of the third terminal assembly 5 are recessed inward to form two second clamping slots 551. Two rear ends of the two protruding ribs 117 are clamped in the two first clamping slots 351 and the two second clamping slots 551, so that the first terminal assembly 3 and the third terminal assembly 5 are fastened to the insulating housing 1.

Referring to FIG. 2 to FIG. 6, two sides of an inner surface of the top of the main portion 11 of insulating housing 1 extend downward to form two convex surfaces 118. A quantity of the convex surfaces 118 of the insulating housing 1 is equal to a quantity of side positions of a top of the first terminal assembly 3. A middle of the inner surface of the top of the main portion 11 of the insulating housing 1 has a concave surface 119 formed between the two convex surfaces 118. The two convex surfaces 118 are corresponding to two side positions of the top of the first terminal assembly 3. The concave surface 119 is corresponding to a middle position of the top of the first terminal assembly 3.

At least one portion of the middle of the inner surface of the top of the main portion 11 of the insulating housing 1 is recessed inward to form at least one sliding groove 16. The at least one first through-hole 111 is disposed in front of the at least one sliding groove 16. The at least one sliding groove 16 extends longitudinally. The at least one first through-hole 111 is longitudinally aligned with the at least one sliding groove 16. A rear end of the at least one sliding groove 16 is communicated with the assembling groove 15. A front end of the at least one sliding groove 16 is communicated with the at least one first through-hole 111. An inner surface of a top wall of the at least one sliding groove 16 has an inclining zone 161, a buffering zone 162 and a stopping zone 163 longitudinally arranged in sequence. A rear end of the inner surface of the top wall of the at least one sliding groove 16 slantwise extends frontward and downward to form the inclining zone 161. A front end of the inclining zone 161 of the at least one sliding groove 16 extends frontward to form the buffering zone 162. A front end of the buffering zone 162 of the at least one sliding groove 16 protrudes downward, and then extends frontward and towards the at least one first through-hole 111 to form the stopping zone 163. A top surface of the inclining zone 161 of the at least one sliding groove 16 is an inclined plane. A top surface of the buffering zone 162 of the at least one sliding groove 16 is a flat plane. A top surface of the stopping zone 163 of the at least one sliding groove 16 is another flat plane. The top surface of the stopping zone 163 and the top surface of the buffering zone 162 of the at least one sliding groove 16 form a segment difference, so that a horizontal level of the top surface of the stopping zone 163 of the at least one sliding groove 16 is lower than a horizontal level of the top surface of the buffering zone 162 of the at least one sliding groove 16. The concave surface 119 is disposed among the at least one sliding groove 16 and the two convex surfaces 118.

In the first preferred embodiment, two sides of the middle of the inner surface of the top of the main portion 11 of the insulating housing 1 are recessed inward to form two sliding grooves 16. At least one corresponding section of a top of the terminal module 2 passes through the at least one sliding groove 16, and then the at least one corresponding section of the top of the terminal module 2 is fastened in the at least one first through-hole 111 of the insulating housing 1, so that the terminal module 2 is fastened in the insulating housing 1. Specifically, two corresponding sections of the top of the terminal module 2 pass through the two sliding grooves 16, and the two corresponding sections of the top of the terminal module 2 are fastened in the two first through-holes 111 of the insulating housing 1, so that the terminal module 2 is fastened in the insulating housing 1.

Each first through-hole 111 is disposed in front of one sliding groove 16. Each sliding groove 16 extends longitudinally. Each first through-hole 111 is longitudinally aligned with the one sliding groove 16. The rear end of each sliding groove 16 is communicated with the assembling groove 15. The front end of each sliding groove 16 is communicated with one first through-hole 111. The inner surface of the top wall of each sliding groove 16 has the inclining zone 161, the buffering zone 162 and the stopping zone 163 longitudinally arranged in sequence. The rear end of the inner surface of the top wall of each sliding groove 16 slantwise extends frontward and downward to form the inclining zone 161. The front end of the inclining zone 161 of each sliding groove 16 extends frontward to form the buffering zone 162. The front end of the buffering zone 162 of each sliding groove 16 protrudes downward, and then extends frontward and towards the one first through-hole 111 to form the stopping zone 163. The top surface of the inclining zone 161 of each sliding groove 16 is the inclined plane. The top surface of the buffering zone 162 of each sliding groove 16 is the flat plane. The top surface of the stopping zone 163 of each sliding groove 16 is another flat plane. The top surface of the stopping zone 163 and the top surface of the buffering zone 162 of each sliding groove 16 form the segment difference, so that the horizontal level of the top surface of the stopping zone 163 of each sliding groove 16 is lower than the horizontal level of the top surface of the buffering zone 162 of each sliding groove 16. The concave surface 119 is disposed among the two sliding grooves 16 and the two convex surfaces 118.

When the terminal module 2 is inserted into the accommodating space 12 from the assembling groove 15, each corresponding section of the top of the terminal module 2 enters the buffering zone 162 along the inclining zone 161 of the one sliding groove 16, each corresponding section of the top of the terminal module 2 slides along the buffering zone 162 of the one sliding groove 16, and then each corresponding section of the top of the terminal module 2 passes through the stopping zone 163 of the one sliding groove 16. Finally, each corresponding section of the top of the terminal module 2 is buckled to the one first through-hole 111. The two inclining zones 161 of the two sliding grooves 16 bring conveniences for the two corresponding sections of the top of the terminal module 2 to enter the two sliding grooves 16. The two inclining zones 161 of the two sliding grooves 16 prevent the two corresponding sections of the top of the terminal module 2 bruising. The two stopping zones 163 of the two sliding grooves 16 are used for abutting against the two corresponding sections of the top of the terminal module 2 to prevent the terminal module 2 from sliding.

Referring to FIG. 2, FIG. 3, FIG. 4, FIG. 5, FIG. 6, FIG. 10 and FIG. 18, two sides of a middle of the top of the main portion 11 form a plurality of first penetrating grooves 17 arranged along the transverse direction. Each first penetrating groove 17 penetrates through the top of the main portion 11 and extends longitudinally. The plurality of the first penetrating grooves 17 are used for an electrical regulation, so that the high-speed connector 100 has a high-frequency signal stability. Positions of the plurality of the first penetrating grooves 17 are corresponding to upper positions of terminals 205 of the top of the terminal module 2. Two sides of a front end of the bottom of the main portion 11 form a plurality of second penetrating grooves 18 arranged along the transverse direction. Each second penetrating groove 18 penetrates through the bottom of the main portion 11 and extends longitudinally. The plurality of the second penetrating grooves 18 are used for the electrical regulation, so that the high-speed connector 100 has the high-frequency signal stability. Positions of the plurality of the second penetrating grooves 18 are corresponding to lower positions of the terminals 205 of a bottom of the terminal module 2.

Referring to FIG. 8 to FIG. 11, the first terminal assembly 3 includes a plurality of first terminals 31, a first base body 32, a first metal block 33, a first dielectric structure 34 and a first holding element 35. The plurality of the first terminals 31 are fastened to the first base body 32. The plurality of the first terminals 31 are partially surrounded by the first base body 32. Middles of the plurality of the first terminals 31 are surrounded by the first base body 32. The first metal block 33 is disposed in the first base body 32, and the first metal block 33 is positioned under the plurality of the first terminals 31. The first dielectric structure 34 is disposed to rear ends of the plurality of the first terminals 31. The rear ends of the plurality of the first terminals 31 are surrounded by the first dielectric structure 34. The first dielectric structure 34 is used for adjusting a dielectric coefficient of a peripheral structure of each first terminal 31 to improve a crosstalk interference of the high-speed connector 100. Lower portions of the plurality of the first terminals 31 are surrounded by the first holding element 35.

Each first terminal 31 has a first fastening portion 311, a first stepping portion 312, a first contacting portion 313 connected to a front end of the first fastening portion 311, a first extending portion 314, a first bending portion 315, and a first soldering portion 316 connected to a rear end of the first fastening portion 311. The first fastening portions 311 of the plurality of the first terminals 31 which are located at two sides of the first base body 32 of two sides of the first terminal assembly 3 are corresponding to the positions of the plurality of the first penetrating grooves 17 which are formed at the two sides of the middle of the top of the main portion 11 of the insulating housing 1. The front end of the first fastening portion 311 slantwise extends frontward and downward to form the first stepping portion 312. A front end of the first stepping portion 312 extends frontward and then is arched downward to form the first contacting portion 313. The first stepping portions 312 and rear ends of the first contacting portions 313 of the first terminals 31 of the two sides of the first terminal assembly 3 are exposed to two sides of a front end of the first base body 32. A front end of the first contacting portion 313 of each first terminal 31 projects beyond a front surface of the first base body 32. The first contacting portions 313 of the plurality of the first terminals 31 are disposed in the upper row of the first terminal slots 13. Bottom surfaces of the first contacting portions 313 of the plurality of the first terminals 31 are exposed out of the upper row of the first terminal slots 13, and the bottom surfaces of the first contacting portions 313 of the plurality of the first terminals 31 project into the insertion groove 14.

The rear end of the first fastening portion 311 slantwise extends rearward and downward to form the first extending portion 314. A rear end of the first extending portion 314 is bent downward to form the first bending portion 315. A bottom end of the first bending portion 315 is bent rearward to form the first soldering portion 316. The rear end of the first fastening portion 311, the first extending portion 314, the first bending portion 315 and the first soldering portion 316 of each first terminal 31 project beyond a rear surface of the first base body 32. The first dielectric structure 34 is fastened to the first extending portions 314 of the plurality of the first terminals 31. Tail ends of the first bending portions 315 of the plurality of the first terminals 31 are surrounded by the first holding element 35. Two opposite sides of the front end of each first fastening portion 311, two opposite sides of the rear end of each first fastening portion 311 and two opposite sides of the rear end of each first contacting portion 313 are recessed inward to form a plurality of first lacking grooves 319. Corresponding formations of the first base body 32 are inserted into the first lacking grooves 319 of the plurality of the first terminals 31.

The plurality of the first terminals 31 include a plurality of first grounding terminals 317 and a plurality of first differential signal terminals 318. Each two adjacent first differential signal terminals 318 are located between two first grounding terminals 317. In the first preferred embodiment, the plurality of the first terminals 31 includes seven first grounding terminals 317 and twelve first differential signal terminals 318. Each first differential signal terminal 318 is used for transmitting a signal. The first fastening portion 311 of one first grounding terminal 317 and the first fastening portions 311 of four first differential signal terminals 318 are surrounded by a middle of the first base body 32.

The front ends of the first fastening portions 311, the first stepping portions 312 and the rear ends of the first contacting portions 313 of the first terminals 31 of a middle of the first terminal assembly 3 are surrounded by the middle of the first base body 32. The first base body 32 has a first surrounding portion 320, at least one first protruding block 321, two first protruding portions 322, a first fastening groove 323, a plurality of first openings 324, a plurality of first locking hooks 325, a first location hole 326, a plurality of first restricting holes 327 and a plurality of first connecting portions 328.

The first surrounding portion 320 is disposed to the middle of the first base body 32, and the first surrounding portion 320 is connected between the front end of the first base body 32 and a rear end of the first base body 32. The first fastening portion 311 of the one first grounding terminal 317 and the first fastening portions 311 of the four first differential signal terminals 318 are surrounded by the first surrounding portion 320. The first surrounding portion 320 of the first base body 32 of the first terminal assembly 3 is corresponding to the concave surface 119 of the insulating housing 1.

At least one portion of a rear end of a top surface of the first surrounding portion 320 of the first base body 32 protrudes upward to form the at least one first protruding block 321. A quantity of the at least one first protruding block 321 of the first base body 32 is equal to a quantity of the at least one first through-hole 111 of the insulating housing 1. The at least one first protruding block 321 passes through the at least one sliding groove 16. The at least one first protruding block 321 is fastened in the at least one first through-hole 111 of the insulating housing 1. In the first preferred embodiment, two sides of the rear end of the top surface of the first surrounding portion 320 of the first base body 32 protrude upward to form two first protruding blocks 321. After each first protruding block 321 passes through the one sliding groove 16, each first protruding block 321 is fastened in the one first through-hole 111 of the insulating housing 1, so that the first terminal assembly 3 is fastened to the insulating housing 1.

When the terminal module 2 is inserted into the accommodating space 12 from the assembling groove 15, each first protruding block 321 of the first base body 32 of the terminal module 2 enters the buffering zone 162 along the inclining zone 161 of the one sliding groove 16, each first protruding block 321 of the first base body 32 of the terminal module 2 slides along the buffering zone 162 of the one sliding groove 16, and then each first protruding block 321 of the first base body 32 of the terminal module 2 passes through the stopping zone 163 of the one sliding groove 16. Finally, each first protruding block 321 of the first base body 32 of the terminal module 2 is buckled to the one first through-hole 111. The two inclining zones 161 of the two sliding grooves 16 bring the conveniences for the two first protruding blocks 321 of the first terminal assembly 3 of the terminal module 2 to enter the two sliding grooves 16. The two inclining zones 161 of the two sliding grooves 16 prevent the two first protruding blocks 321 of the first terminal assembly 3 of the terminal module 2 bruising. The two stopping zones 163 of the two sliding grooves 16 are used for abutting against the two first protruding blocks 321 of the first terminal assembly 3 of the terminal module 2 to prevent the first terminal assembly 3 of the terminal module 2 from sliding.

In the first preferred embodiment, two opposite sides of the first base body 32 extend outward to form the two first protruding portions 322. The two first protruding portions 322 of the first base body 32 are buckled in two front ends of the two first locating slots 113 of the insulating housing 1, so that the first terminal assembly 3 is fastened to the insulating housing 1. A middle of a bottom surface of the rear end of the first base body 32 is recessed inward to form the first fastening groove 323. The first metal block 33 is disposed in the first fastening groove 323 of the first base body 32. The first base body 32 has four first openings 324. The front end of the first base body 32 has two first openings 324, and the rear end of the first base body 32 has the other two first openings 324. The two first openings 324 of the front end of the first base body 32 penetrate through two sides of a top surface and two sides of a bottom surface of the front end of the first base body 32. Two tops of two sides of the first fastening groove 323 extend upward to form the other two first openings 324 penetrating through two sides of a top surface of the rear end of the first base body 32.

The first openings 324 of the first base body 32 are formed to two sides of the first surrounding portion 320. A front end of the first surrounding portion 320 is located between the two first openings 324 of the front end of the first base body 32. A rear end of the first surrounding portion 320 is located between the other two first openings 324 of the front end of the first base body 32. The first stepping portions 312 and the rear ends of the first contacting portions 313 of the plurality of the first grounding terminals 317 and the first differential signal terminals 318 of the two sides of the first terminal assembly 3 are exposed to the two first openings 324 of the front end of the first base body 32. The first fastening portions 311 of the plurality of the first grounding terminals 317 and the first differential signal terminals 318 of the two sides of the first terminal assembly 3 are exposed to the other two first openings 324 of the rear end of the first base body 32. The first fastening portions 311 of the plurality of the first grounding terminals 317 and the first differential signal terminals 318 of the two sides of the first terminal assembly 3 are exposed to the first fastening groove 323 from the other two first openings 324 of the first base body 32. A quantity of the first openings 324 of the rear end of the first base body 32 of the first terminal assembly 3 is equal to a quantity of the convex surfaces 118 of insulating housing 1. The first openings 324 of the rear end of the first base body 32 of the first terminal assembly 3 are corresponding to the convex surfaces 118 of the insulating housing 1.

A middle of a bottom surface of the rear end of the first surrounding portion 320 of the first base body 32 extends downward to form a supporting block 301. Several portions of the bottom surface of the rear end of the first surrounding portion 320 of the first base body 32 extend downward and then protrude outward to form the plurality of the first locking hooks 325. The plurality of the first locking hooks 325 are used for fastening the first metal block 33. A middle of a bottom surface of the supporting block 301 is recessed inward to form the first location hole 326. A corresponding mechanism of the third terminal assembly 5 is fastened in the first location hole 326, so that the third terminal assembly 5 is fastened with the first terminal assembly 3. The plurality of the first restricting holes 327 penetrate through two sides of a top surface and two sides of a bottom surface of the first base body 32. Corresponding structures of the first metal block 33 are disposed in the plurality of the first restricting holes 327, so that the first metal block 33 is fastened to the first base body 32.

An upper surface of the first base body 32 has the plurality of the first connecting portions 328. The plurality of the first connecting portions 328 are longitudinally arranged in three rows. Each first connecting portion 328 is disposed between two adjacent first terminals 31. The plurality of the first connecting portions 328 are used to simplify a mold manufacturing process. The plurality of the first connecting portions 328 are embedded into the plurality of the first lacking grooves 319 of the plurality of the first fastening portions 311 and the plurality of the first contacting portions 313 of the plurality of the first terminals 31. A lower surface of the first base body 32 has a transverse row of second terminal slots 329. Corresponding parts of the third terminal assembly 5 are disposed to the transverse row of the second terminal slots 329. During an assembling process of the high-speed connector 100, the transverse row of the second terminal slots 329 are used for preventing the corresponding parts of the third terminal assembly 5 from tilting.

The first metal block 33 is fastened in the first fastening groove 323 of the first base body 32. The first metal block 33 is located under the plurality of the first terminals 31. The first metal block 33 has a first main plate 331, a first limiting hole 332, a plurality of first locking holes 333, a plurality of first contacting blocks 335, a plurality of first slits 336, a plurality of first separating grooves 337, a plurality of first restricting portions 338 and a plurality of first contacting points 339.

The first main plate 331 is received in the first fastening groove 323. A middle of the first main plate 331 defines the first limiting hole 332 vertically penetrating through middles of a top surface and a bottom surface of the first main plate 331. The first limiting hole 332 is positioned corresponding to the supporting block 301 of the first surrounding portion 320. The supporting block 301 is limited in the first limiting hole 332. A front and a rear of the first main plate 331 defines the plurality of the first locking holes 333 penetrating through the top surface and the bottom surface of the first main plate 331. The first locking holes 333 of the front of the first main plate 331 are located in front of the first limiting hole 332. The first locking holes 333 of the rear of the first main plate 331 are located behind the first limiting hole 332. The plurality of the first locking hooks 325 of the first base body 32 pass through the plurality of the first locking holes 333. The plurality of the first locking hooks 325 are buckled to side walls of the plurality of the first locking holes 333. Bottoms of the plurality of the first locking hooks 325 are blocked by the bottom surface of the first main plate 331.

Referring to FIG. 7 to FIG. 12, several portions of two sides of the top surface of the first main plate 331 protrude upward and towards the plurality of the first terminals 31 to form the plurality of the first contacting blocks 335. The plurality of the first contacting blocks 335 are spaced from one another. The first limiting hole 332 is located between the first contacting blocks 335 of the two sides of the top surface of the first main plate 331. In the first preferred embodiment, each first contacting block 335 is rectangular. Each first contacting block 335 extends in a longitudinal direction. The plurality of the first contacting blocks 335 are in contact with the first fastening portions 311 of the first grounding terminals 317 of the first terminals 31 of the two sides of the first terminal assembly 3 to form a grounding structure 90, so that a signal noise is able to be effectively absorbed and the signal noise is able to be effectively restrained for improving transmission quality of a high-frequency signal of the high-speed connector 100.

The first main plate 331 has the plurality of the first slits 336 penetrating through the top surface and the bottom surface of the first main plate 331. Each first slit 336 is formed in a bugle shape. A transverse width of a top of each first slit 336 is narrower than a transverse width of a bottom of each first slit 336. Each first slit 336 has a first narrow aperture 3361 and a first wide aperture 3362. The first narrow aperture 3361 is formed at the top surface of the first main plate 331. The first wide aperture 3362 is formed at the bottom surface of the first main plate 331. The first narrow aperture 3361 and the first wide aperture 3362 are used to improve an electromagnetic field crosstalk interference.

In the first preferred embodiment, each two first slits 336 are formed between two adjacent first contacting blocks 335. Each first slit 336 extends in the longitudinal direction. Each two adjacent first differential signal terminals 318 form a first differential signal terminal pair. Each two first slits 336 formed between the two adjacent first contacting blocks 335 are aligned in the longitudinal direction. Each two first slits 336 which are formed between the two adjacent first contacting blocks 335 are aligned with a first interstice 302 between the two first fastening portions 311 of the two adjacent first differential signal terminals 318 of one first differential signal terminal pair along an up-down direction. In a concrete implementation, the high-speed connector 100 is without being limited to align each two first slits 336 which are formed between the two adjacent first contacting blocks 335 with the first interstice 302 between the two first fastening portions 311 of the two adjacent first differential signal terminals 318 of the one first differential signal terminal pair along the up-down direction.

Each first separating groove 337 is formed among the two adjacent first contacting blocks 335 and the first main plate 331. Each first separating groove 337 is rectangular. The plurality of the first separating grooves 337 are corresponding to the first fastening portions 311 of the first differential signal terminals 318 of the two sides of the first terminal assembly 3 along a vertical direction. The first fastening portions 311 of the first differential signal terminals 318 of the two sides of the first terminal assembly 3 are received in the plurality of the first separating grooves 337. The first fastening portions 311 of each two adjacent first differential signal terminals 318 of the two sides of the first terminal assembly 3 are received in one first separating groove 337. Bottom walls of the plurality of the first separating grooves 337 are spaced from the first fastening portions 311 of the first differential signal terminals 318 of the two sides of the first terminal assembly 3 along the vertical direction, and several portions of the first main plate 331 are defined as the bottom walls of the plurality of the first separating grooves 337, so the first main plate 331 keeps distances from the first fastening portions 311 of the first differential signal terminals 318 of the two sides of the first terminal assembly 3 along the vertical direction.

Several portions of two opposite side surfaces of the first metal block 33 protrude outward and then protrude upward to form the plurality of the first restricting portions 338. A quantity of the first restricting portions 338 of the first metal block 33 is equal to a quantity of the first restricting holes 327 of the first base body 32. The plurality of the first restricting portions 338 of the first metal block 33 are restricted in the plurality of the first restricting holes 327 of the first base body 32, so the first metal block 33 is fastened in the first fastening groove 323 of the first base body 32. Several portions of two middles of a front surface and a rear surface of the first main plate 331 protrude outward to form the plurality of the first contacting points 339. The plurality of the first contacting points 339 of the first main plate 331 abut against a front inner wall and a rear inner wall of the first fastening groove 323 of the first base body 32, so that the first metal block 33 is fastened to the first base body 32.

In this first preferred embodiment, the first metal block 33 has four first locking holes 333, six first contacting blocks 335, eight first slits 336, four first separating grooves 337, four first restricting portions 338 and four first contacting points 339.

Figure 13:
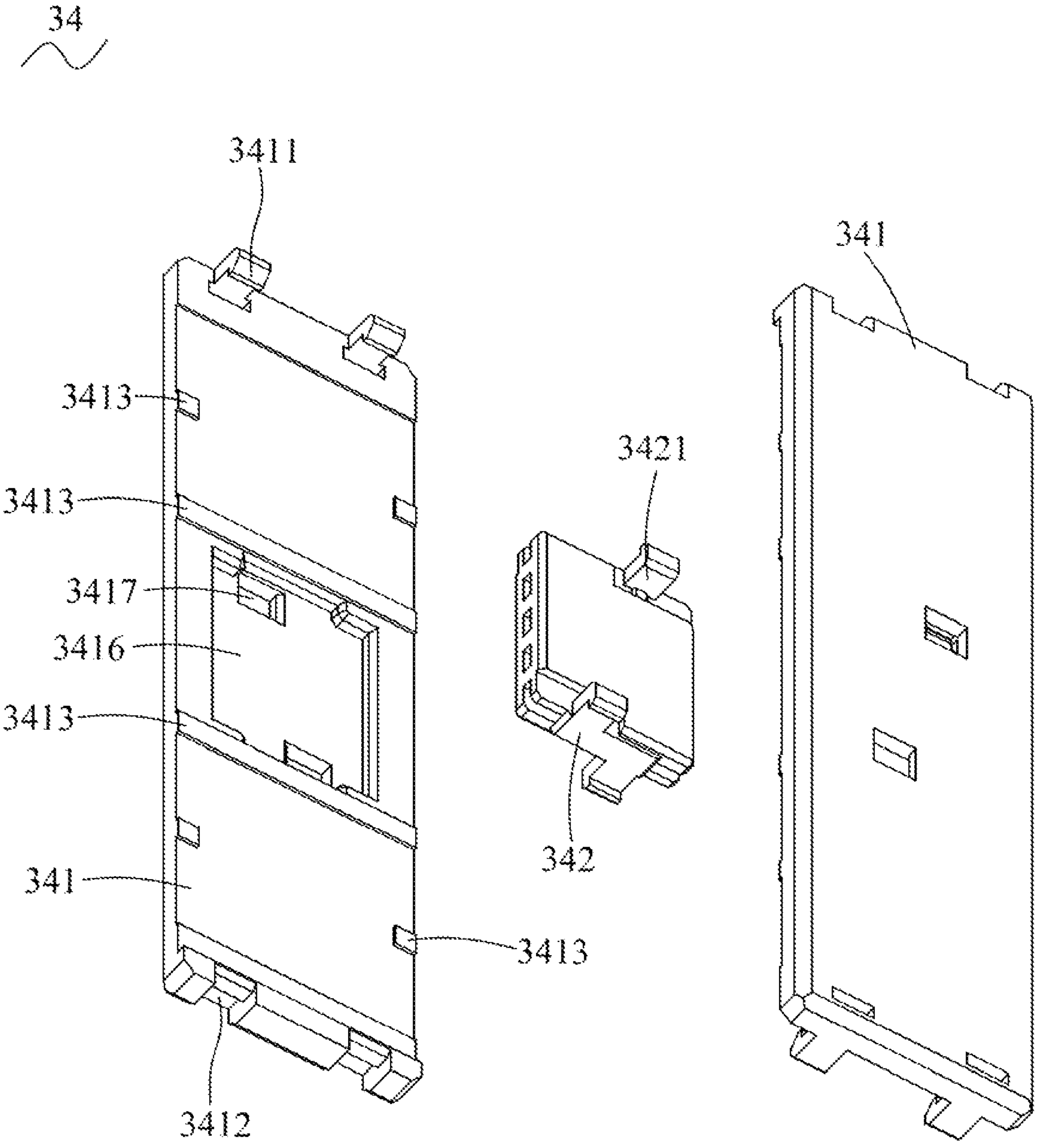
FIG. 13 is an exploded view of a first dielectric structure of the first terminal assembly of the terminal module of the high-speed connector of FIG. 9.
Figure 14:
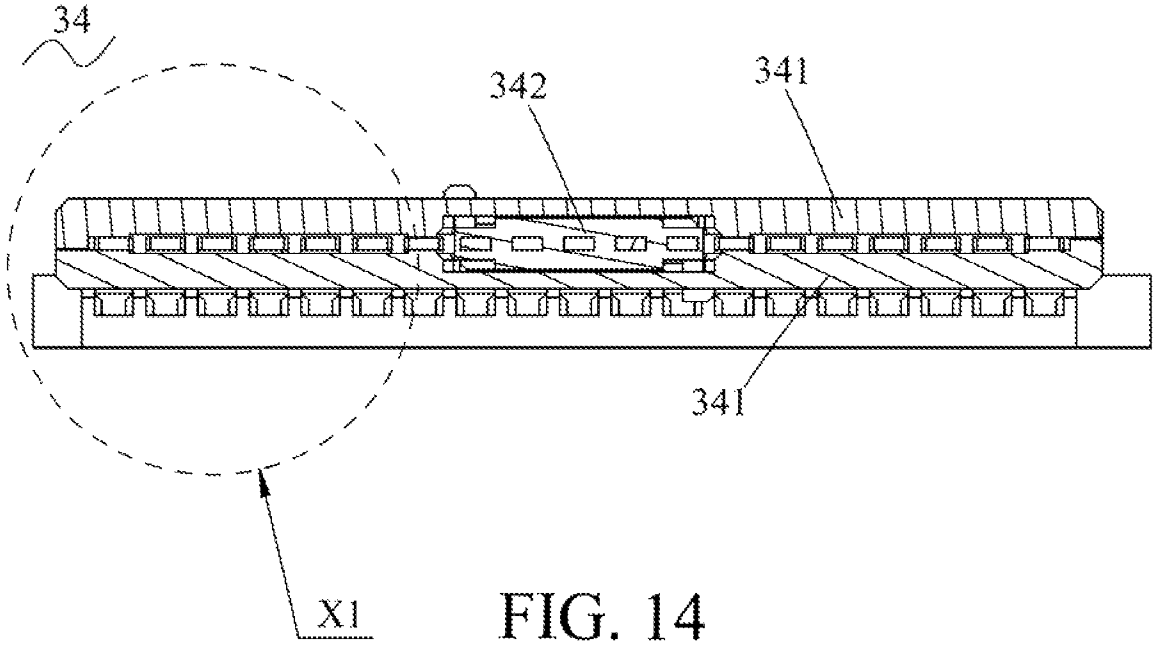
FIG. 14 is a cross-sectional view of the first dielectric structure of the high-speed connector along a line A2-A2 of FIG. 9.
Figure 15:
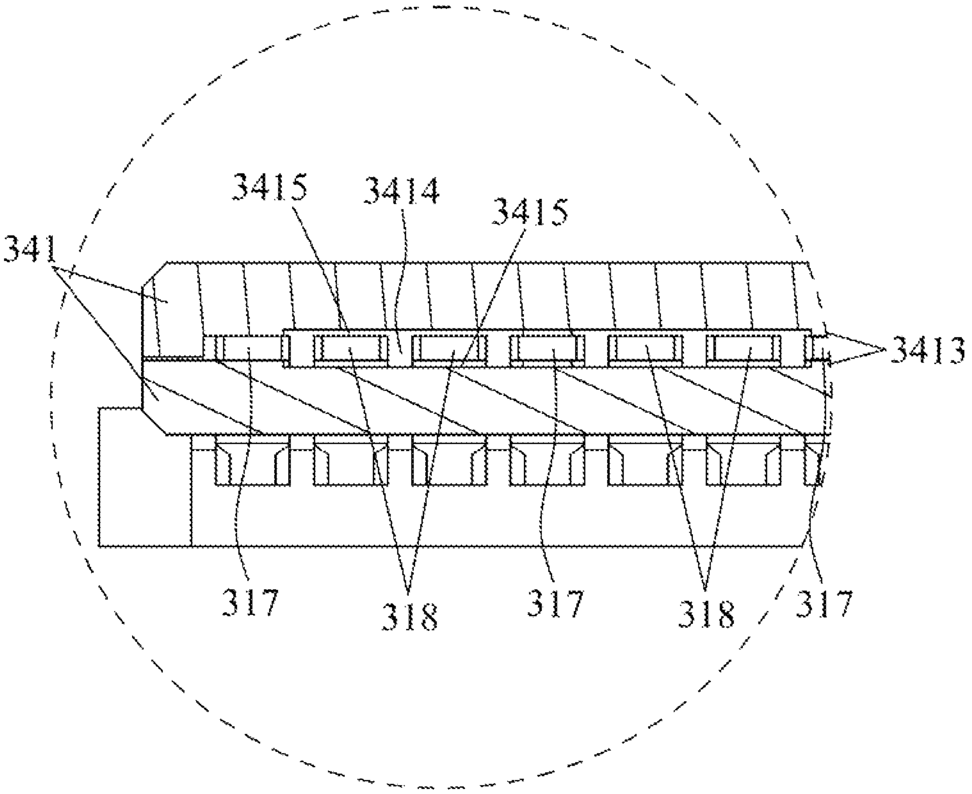
FIG. 15 is an enlarged view of an encircled portion X1 of the high-speed connector of FIG. 14.
Figure 16:
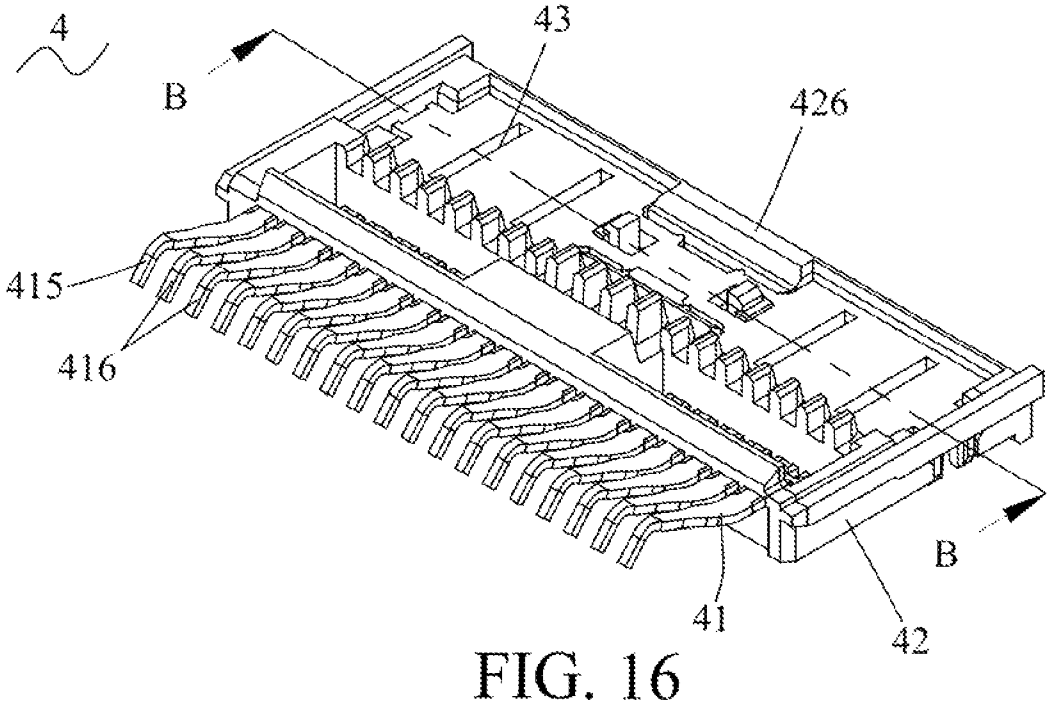
FIG. 16 is a perspective view of a second terminal assembly of the terminal module of the high-speed connector of FIG. 3.
Figure 17:
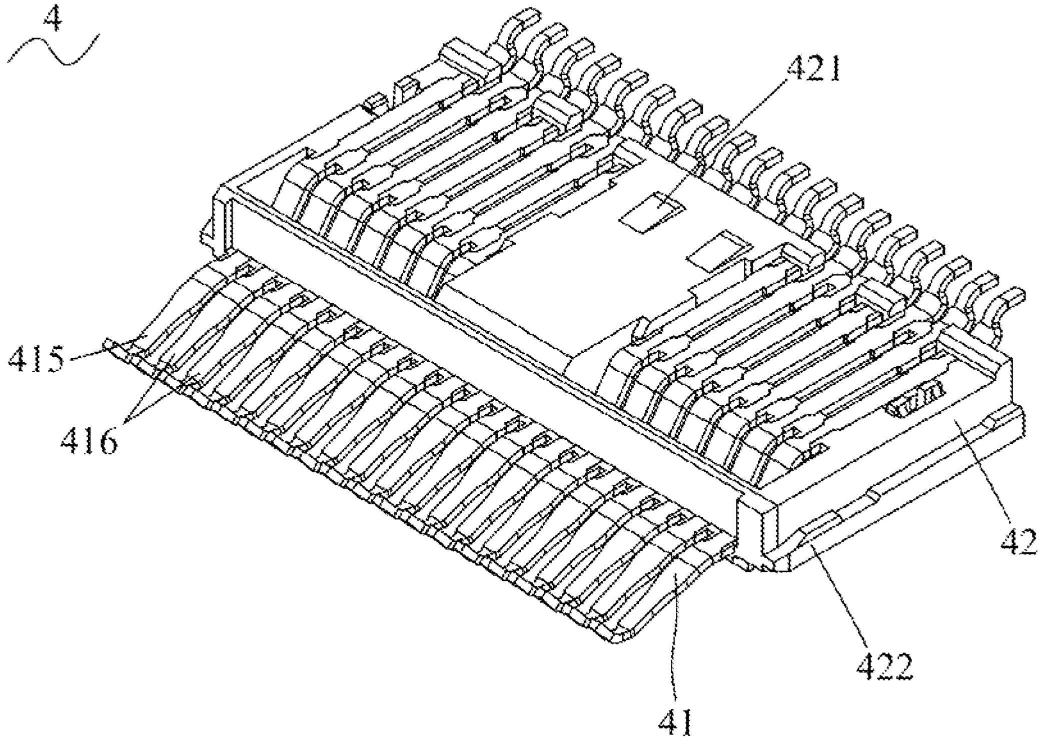
FIG. 17 is another perspective view of the second terminal assembly of the terminal module of the high-speed connector of FIG. 16.
Figure 18:
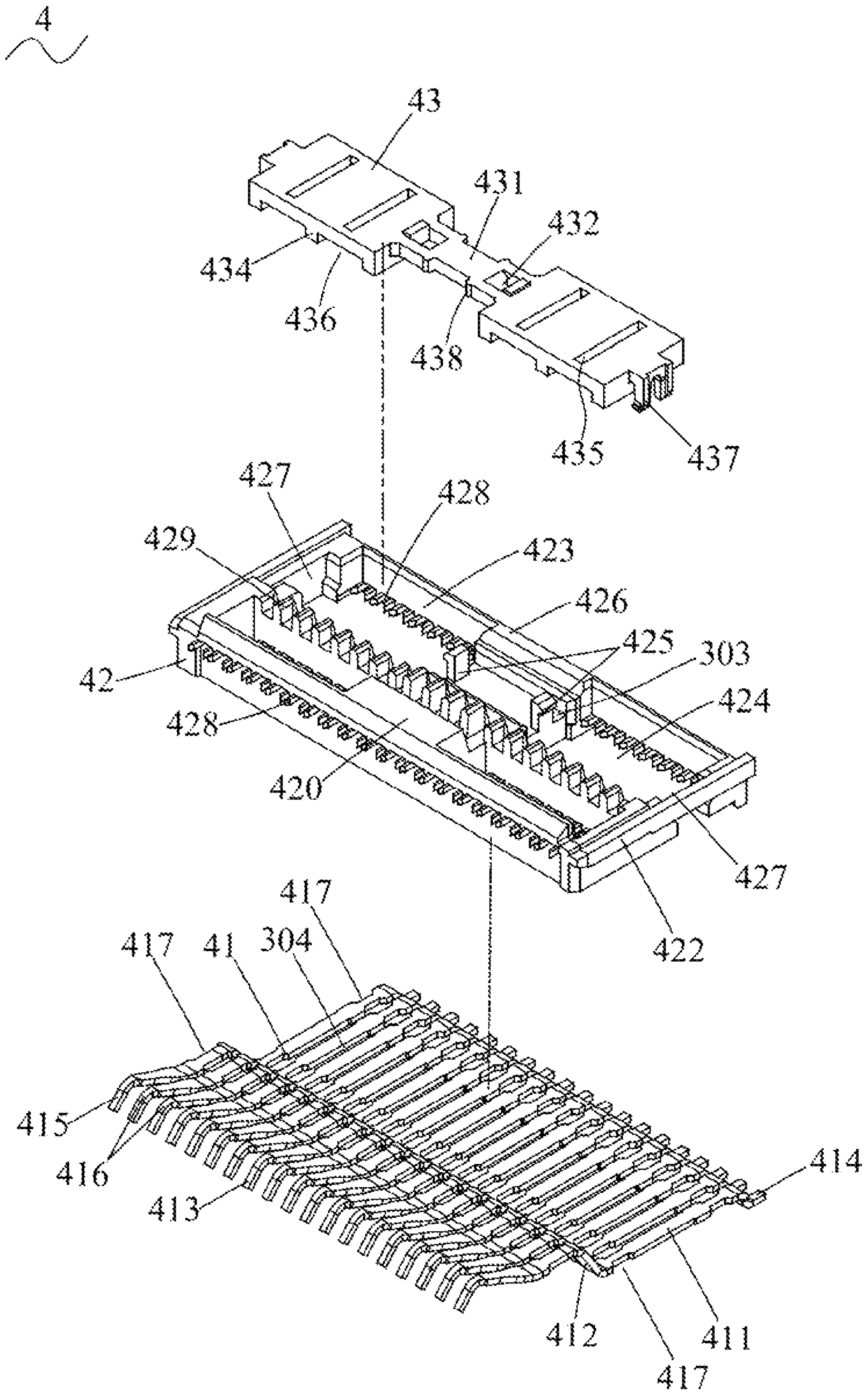
FIG. 18 is an exploded view of the second terminal assembly of the terminal module of the high-speed connector of FIG. 16.
Figure 19:
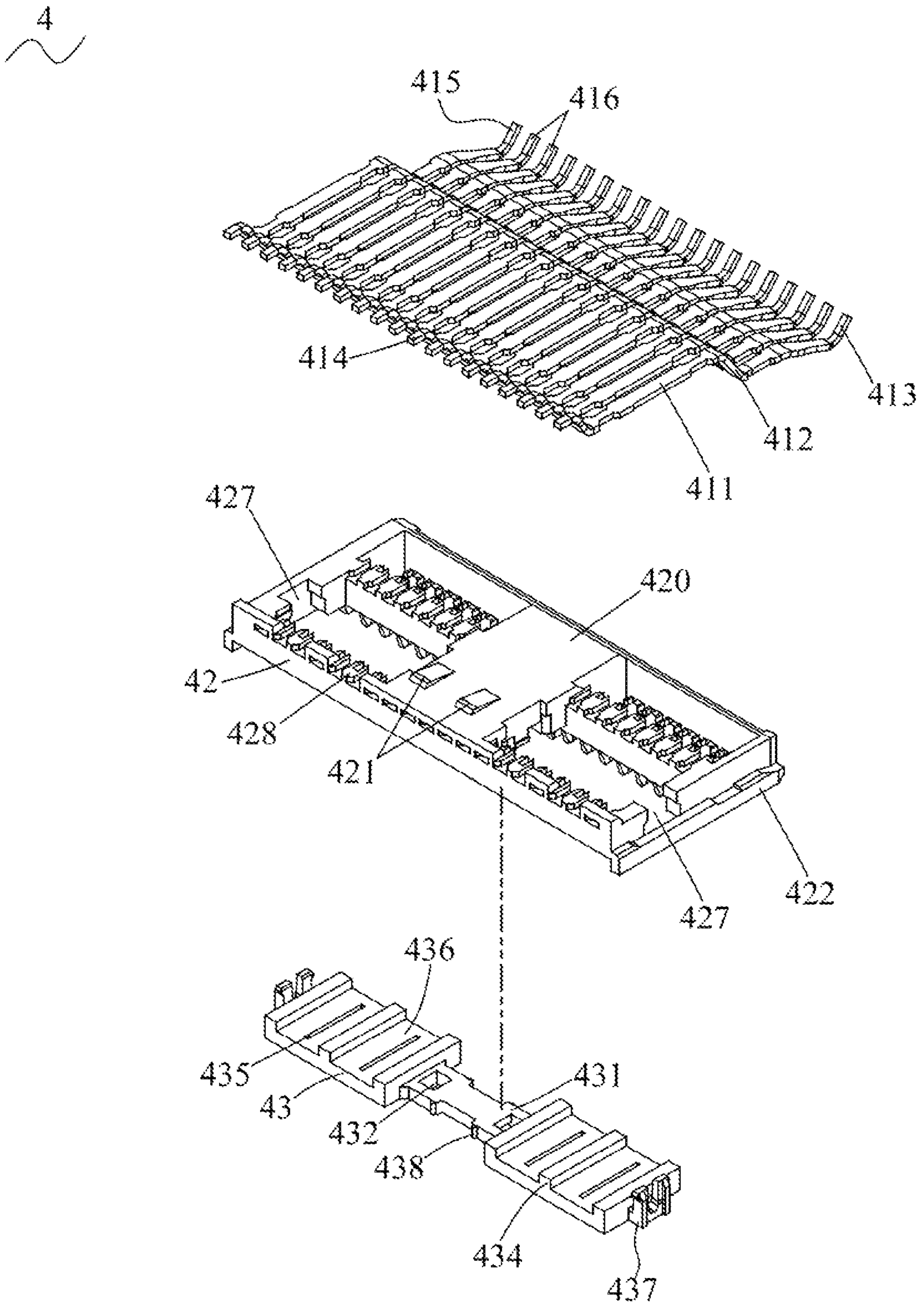
FIG. 19 is another exploded view of the second terminal assembly of the terminal module of the high-speed connector of FIG. 16.
Figure 20:
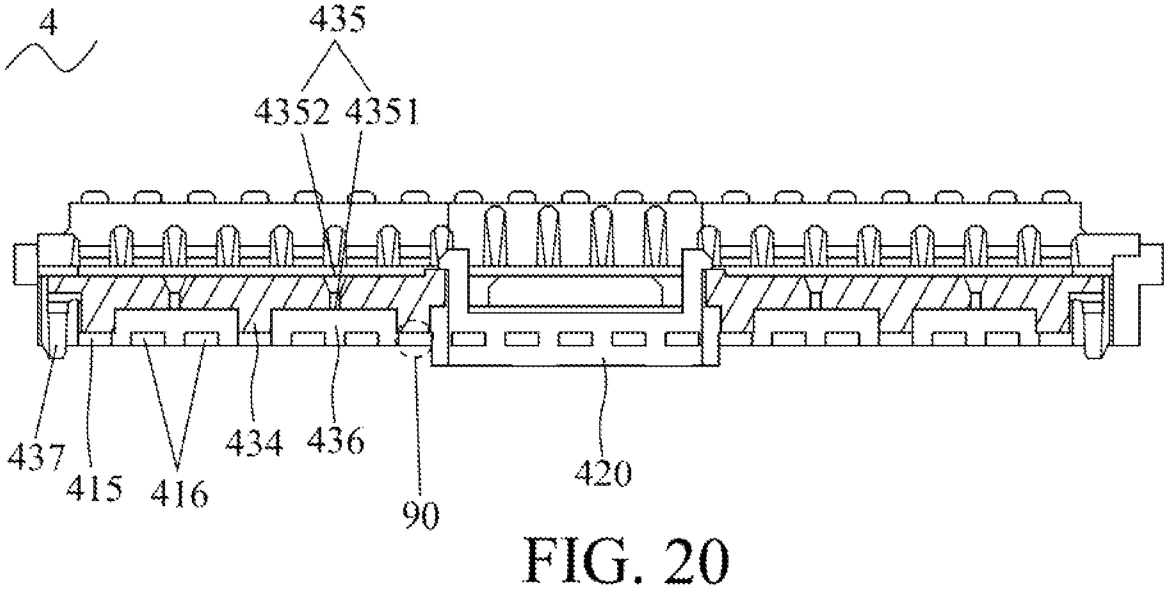
FIG. 20 is a cross-sectional view of the second terminal assembly of the high-speed connector along a line B-B of FIG. 16.
Figure 21:
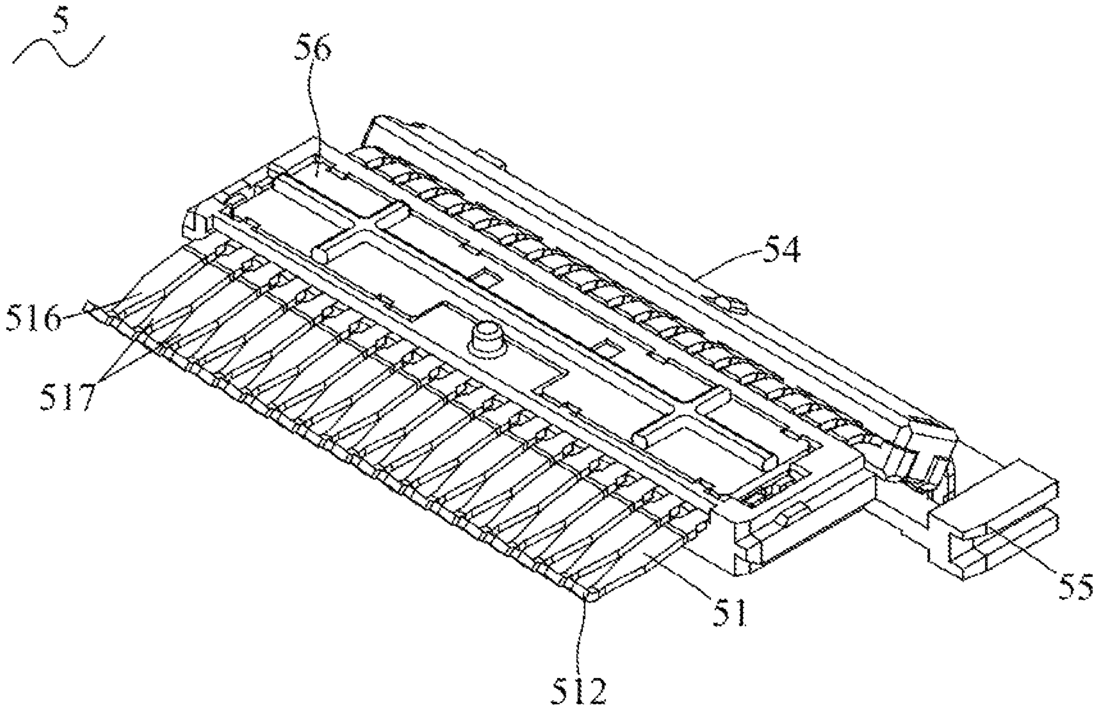
FIG. 21 is a perspective view of a third terminal assembly of the terminal module of the high-speed connector of FIG. 3.
Figure 22:
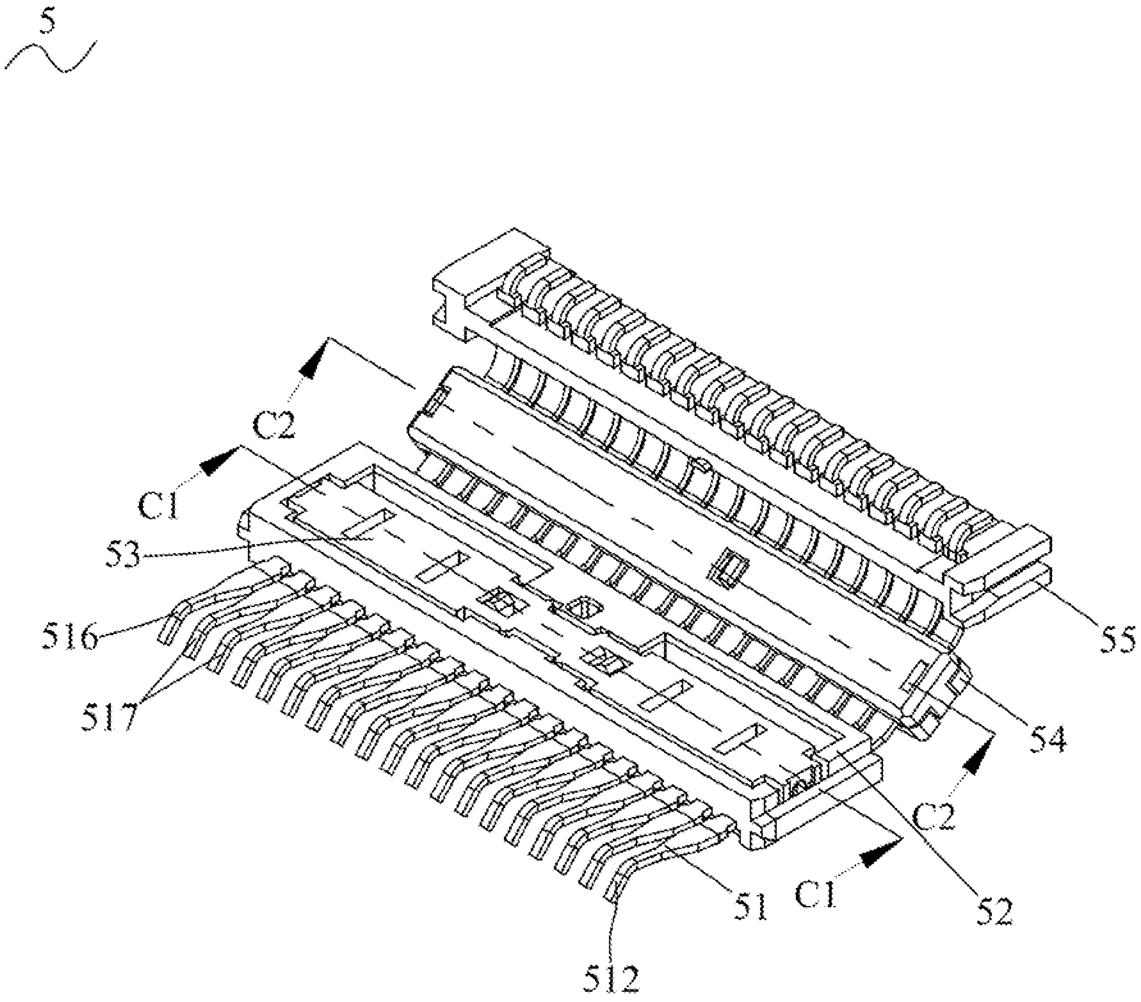
FIG. 22 is another perspective view of the third terminal assembly of the terminal module of the high-speed connector of FIG. 3.

Referring to FIG. 13 to FIG. 15, the first dielectric structure 34 has two first covers 341 and a first fastening structure 342. The two first covers 341 are disposed corresponding to each other. The first fastening structure 342 is disposed between the two first covers 341. In one condition, structures of the two first covers 341 are the same. In another condition, the two first covers 341 are symmetrical. The two first covers 341 are disposed opposite to each other. The two first covers 341 and the first fastening structure 342 are buckled in a whole. The two first covers 341 are buckled by the first fastening structure 342 to form an entirety.

Each first cover 341 has a first extending foot 3411, a first notch 3412, a plurality of first attaching surfaces 3413 and a first interval 3414. One side of each first cover 341 protrudes inward and perpendicular to each first cover 341 to form the first extending foot 3411. The other side of each first cover 341 has the first notch 3412 penetrating through an outer surface, an inner surface and the other side surface of each first cover 341. In the first preferred embodiment, each first cover 341 has two first extending feet 3411, two first notches 3412, the plurality of the first attaching surfaces 3413 and the first interval 3414. Two portions of the one side of each first cover 341 protrude inward and perpendicular to each first cover 341 to form the two first extending feet 3411. The other side of each first cover 341 has the two first notches 3412 penetrating through the outer surface, the inner surface and the other side surface of each first cover 341. The two first extending feet 3411 of one first cover 341 are disposed corresponding to the two first notches 3412 of the other first cover 341. The first extending feet 3411 of the two first covers 341 are buckled with the first notches 3412 of the two first covers 341.

Two sides of the inner surface of each first cover 341 has the plurality of the first attaching surfaces 3413 protruded beyond the inner surface of each first cover 341. The first attaching surfaces 3413 of the two first covers 341 clamp the first extending portions 314 of the first grounding terminals 317 of the two sides of the first terminal assembly 3. The first attaching surfaces 3413 of the two first covers 341 are corresponding to the first extending portions 314 of the first grounding terminals 317 of the two sides of the first terminal assembly 3. The first attaching surfaces 3413 of the one first cover 341 are corresponding to upper surfaces of the first extending portions 314 of the first grounding terminals 317 of the two sides of the first terminal assembly 3, and the first attaching surfaces 3413 of the other first cover 341 are corresponding to lower surfaces of the first extending portions 314 of the first grounding terminals 317 of the two sides of the first terminal assembly 3. The first attaching surfaces 3413 of the one first cover 341 contact with the upper surfaces of the first extending portions 314 of the first grounding terminals 317 of the two sides of the first terminal assembly 3, and the first attaching surfaces 3413 of the other first cover 341 contact with the lower surfaces of the first extending portions 314 of the first grounding terminals 317 of the two sides of the first terminal assembly 3.

The first attaching surfaces 3413 of the one first cover 341 face the first attaching surfaces 3413 of the other first cover 341. The first attaching surfaces 3413 of the two first covers 341 are spaced to form the first interval 3414 among the first attaching surfaces 3413 of the two first covers 341. The first extending portions 314 of the first differential signal terminals 318 of the two sides of the first terminal assembly 3 pass through the first interval 3414. The upper surfaces and the lower surfaces of the first extending portions 314 of the first differential signal terminals 318 of the two sides of the first terminal assembly 3 are spaced from the two inner surfaces of the two first covers 341 to form two first gaps 3415. The first interval 3414 and each first gap 3415 of the first dielectric structure 34 are used for adjusting the dielectric coefficient of the peripheral structure of each first terminal 31 to improve an electromagnetic characteristic and the crosstalk interference of the high-speed connector 100.

A middle of the inner surface of each first cover 341 is recessed inward to from a first sunken portion 3416. The first sunken portion 3416 is used for receiving the first fastening structure 342. The first sunken portion 3416 of each first cover 341 has at least one first perforation 3417 penetrating through the inner surface and the outer surface of each first cover 341. In the first preferred embodiment, the first sunken portion 3416 of each first cover 341 has two first perforations 3417. The two first perforations 3417 penetrate through the two inner surfaces and the two outer surfaces of the two first covers 341. Corresponding hooks of the first fastening structure 342 are disposed to the first perforations 3417 of the two first covers 341, and the corresponding hooks of the first fastening structure 342 are buckled to the two outer surfaces of the two first covers 341, so that the first fastening structure 342 is located between the two first covers 341, and the first fastening structure 342 is fastened between the two first covers 341.

Referring to FIG. 8 to FIG. 15, each side of the first fastening structure 342 has at least one first buckling hook 3421. In the first preferred embodiment, the first fastening structure 342 has four first buckling hooks 3421. Each side of the first fastening structure 342 has two first buckling hooks 3421. The two first buckling hooks 3421 of each side of the first fastening structure 342 oppositely extend towards the two first covers 341, and then protrude outward to form the two first buckling hooks 3421. A quantity of the first buckling hooks 3421 of the first fastening structure 342 is equal to a quantity of the first perforations 3417 of the two first covers 341. The first buckling hooks 3421 of the first fastening structure 342 are buckled in the first perforations 3417 of the two first covers 341, and the first buckling hooks 3421 of the first fastening structure 342 hook the two outer surfaces of the two first covers 341, so that the first fastening structure 342 is located between the two first covers 341, and the first fastening structure 342 is fastened between the two first covers 341. The first extending portions 314 of the first terminals 31 of the middle of the first terminal assembly 3 longitudinally pass through a middle of the first fastening structure 342.

Bottom ends of the plurality of the first terminals 31 are surrounded by the first holding element 35. Two opposite side surfaces of the first holding element 35 are recessed inward to form the two first clamping slots 351. The two rear ends of the two protruding ribs 117 of the insulating housing 1 are clamped in the two first clamping slots 351 of the first terminal assembly 3, so that the first terminal assembly 3 is located to the insulating housing 1, and the first terminal assembly 3 is fastened to the insulating housing 1. Each first clamping slot 351 is shown as a horn shape, and a front of each first clamping slot 351 is wider than a rear of each first clamping slot 351, so that the two protruding ribs 117 of the insulating housing 1 are buckled in the two first clamping slots 351 conveniently.

Referring to FIG. 3 to FIG. 20, the second terminal assembly 4 is corresponding to the first terminal assembly 3 along the up-down direction. The second terminal assembly 4 is disposed under the first terminal assembly 3. The second terminal assembly 4 includes a plurality of second terminals 41, a second base body 42 and a second metal block 43. The plurality of the second terminals 41 are fastened to the second base body 42. The plurality of the second terminals 41 are partially surrounded by the second base body 42. The second metal block 43 is disposed to the second base body 42.

Each second terminal 41 has a second fastening portion 411, a second stepping portion 412, a second contacting portion 413 and a second soldering portion 414. A front end of the second fastening portion 411 slantwise extends upward and frontward to form the second stepping portion 412. A front end of the second stepping portion 412 extends frontward and then is arched upward to form the second contacting portion 413. A rear end of the second fastening portion 411 is bent downward and then extends rearward to form the second soldering portion 414. Two sides of the front end of the second fastening portion 411, two sides of the rear end of the second fastening portion 411 and two sides of a rear end of the second contacting portion 413 are recessed inward to form a plurality of second lacking grooves 417. Corresponding formations of the second base body 42 are engaged with the plurality of the second lacking grooves 417 of the second fastening portions 411 and the second contacting portions 413 of the plurality of the second terminals 41 by a plastic injection molding technology.

The second stepping portions 412 and the rear ends of the second contacting portions 413 of the second terminals 41 of two sides of the second terminal assembly 4 are exposed to two sides of a front end of the second base body 42. Front ends of the second contacting portions 413 of the plurality of the second terminals 41 project beyond a front surface of the second base body 42. The second contacting portions 413 of the plurality of the second terminals 41 are disposed in the lower row of the first terminal slots 13. Top surfaces of the second contacting portions 413 of the plurality of the second terminals 41 are exposed out of the lower row of the first terminal slots 13. The top surfaces of the second contacting portions 413 of the plurality of the second terminals 41 project into the insertion groove 14. The second contacting portions 413 of the plurality of the second terminals 41 of the two sides of the second terminal assembly 4 are corresponding to the plurality of the second penetrating grooves 18 of the insulating housing 1.

The plurality of the second terminals 41 include a plurality of second grounding terminals 415 and a plurality of second differential signal terminals 416. In the first preferred embodiment, the plurality of the second terminals 41 includes seven second grounding terminals 415 and twelve second differential signal terminals 416. Each two adjacent second differential signal terminals 416 are located between two second grounding terminals 415. Each second differential signal terminal 416 is used for transmitting the signal. The second fastening portion 411 of one second grounding terminal 415 and the second fastening portions 411 of four second differential signal terminals 416 are surrounded by a middle of the second base body 42.

The second fastening portions 411, the second stepping portions 412 and the rear ends of the second contacting portions 413 of the second terminals 41 of a middle of the second terminal assembly 4 are surrounded by the middle of the second base body 42. The second base body 42 has a second surrounding portion 420, at least one second protruding block 421, two second protruding portions 422, a second fastening groove 423, a plurality of second openings 424, two second locking hooks 425, a supporting portion 426, two second restricting holes 427, a plurality of second connecting portions 428 and a plurality of third terminal slots 429. In the first preferred embodiment, the second base body 42 includes two second protruding blocks 421.

The second surrounding portion 420 is disposed to the middle of the second base body 42. The second surrounding portion 420 is connected between the front end of the second base body 42 and a rear end of the second base body 42. The second fastening portion 411 of the one second grounding terminal 415 and the second fastening portions 411 of the four second differential signal terminals 416 are surrounded by the second surrounding portion 420. A rear end of a bottom surface of the second surrounding portion 420 of the second base body 42 extends downward to form the at least one second protruding block 421. In the first preferred embodiment, two sides of the rear end of the bottom surface of the second surrounding portion 420 of the second base body 42 extend downward to form the two second protruding blocks 421. A quantity of the at least one second protruding block 421 of the second base body 42 is equal to a quantity of the at least one second through-hole 112 of the insulating housing 1. The two second protruding blocks 421 are fastened in the two second through-holes 112 of the insulating housing 1, so that the second terminal assembly 4 is located to the insulating housing 1, and the second terminal assembly 4 is fastened to the insulating housing 1.

In the first preferred embodiment, two opposite sides of the second base body 42 extend outward to form the two second protruding portions 422. The two second protruding portions 422 are buckled in the two second locating slots 114 of the insulating housing 1, so that the second terminal assembly 4 is located to the insulating housing 1, and the second terminal assembly 4 is fastened to the insulating housing 1. A middle of a top surface of the rear end of the second base body 42 is recessed downward to form the second fastening groove 423. The second metal block 43 is disposed in the second fastening groove 423 of the second base body 42. The second base body 42 has four second openings 424 formed to two sides of the second surrounding portion 420. The front end of the second base body 42 has two second openings 424 arranged along the transverse direction, and the rear end of the second base body 42 has the other two second openings 424 arranged along the transverse direction. The two second openings 424 of the front end of the second base body 42 penetrate through two sides of a top surface and two sides of a bottom surface of the front end of the second base body 42. Two bottoms of two sides of the second fastening groove 423 extend downward to form the other two second openings 424 penetrating through two sides of a bottom surface of the rear end of the second base body 42.

A front end of the second surrounding portion 420 is located between the two second openings 424 of the front end of the second base body 42. A rear end of the second surrounding portion 420 is located between the other two second openings 424 of the rear end of the second base body 42. The second stepping portions 412 and the rear ends of the second contacting portions 413 of the plurality of the second grounding terminals 415 and the second differential signal terminals 416 of the two sides of the second terminal assembly 4 are exposed to the two second openings 424 of the front end of the second base body 42. The second fastening portions 411 of the plurality of the second grounding terminals 415 and the second differential signal terminals 416 of the two sides of the second terminal assembly 4 are exposed to the other two second openings 424 of the rear end of the second base body 42. The second fastening portions 411 of the plurality of the second grounding terminals 415 and the second differential signal terminals 416 of the two sides of the second terminal assembly 4 are exposed to the second fastening groove 423 from the other two second openings 424 of the rear end of the second base body 42.

A middle of a top surface of the rear end of the second surrounding portion 420 is recessed inward to form a first buckling groove 303. Two sides of the top surface of the rear end of the second surrounding portion 420 extend upward and then protrude outward to form the two second locking hooks 425. The two second locking hooks 425 are located to the first buckling groove 303. The two second locking hooks 425 are used for fastening the second metal block 43. A rear end wall of the second fastening groove 423 of the second base body 42 is formed as the supporting portion 426. In this first preferred embodiment, a corresponding mechanism of the fourth terminal assembly 6 abuts against the supporting portion 426 of the second base body 42.

The two second restricting holes 427 penetrate through two sides of a top surface and two sides of a bottom surface of the second base body 42. Two second restricting portions 437 of the second metal block 43 are restricted in the two second restricting holes 427, so that the second metal block 43 is fastened to the second base body 42.

A lower surface of the second base body 42 has the plurality of the second connecting portions 428. Each second connecting portion 428 is disposed between two adjacent second terminals 41. Each second connecting portion 428 is used to simplify the mold manufacturing process. The plurality of the second connecting portions 428 are longitudinally arranged in three rows. In the first preferred embodiment, the plurality of the second connecting portions 428 are embedded in the plurality of the second lacking grooves 417 of the second fastening portions 411 and the second contacting portions 413 of the plurality of the second terminals 41. An upper surface of the second base body 42 has a transverse row of third terminal slots 429. Front ends of a plurality of fourth terminals 61 of the fourth terminal assembly 6 are disposed to the transverse row of the third terminal slots 429. During the assembling process of the high-speed connector 100, the transverse row of the third terminal slots 429 are used for preventing the plurality of the fourth terminals 61 of the fourth terminal assembly 6 from tilting.

The second metal block 43 is fastened in the second fastening groove 423 of the second base body 42. The plurality of the second terminals 41 are disposed under the second metal block 43. The second metal block 43 has a second main plate 431, two second locking holes 432, a plurality of second contacting blocks 434, a plurality of second slits 435, a plurality of second separating grooves 436, the two second restricting portions 437 and a plurality of second contacting points 438.

The second main plate 431 is received in the second fastening groove 423. A middle of the second main plate 431 defines the two second locking holes 432 vertically penetrating through a top surface and a bottom surface of the second main plate 431. The two second locking holes 432 are arranged along the transverse direction. The two second locking hooks 425 of the second base body 42 pass through the two second locking holes 432. The two second locking hooks 425 are buckled to side walls of the two second locking holes 432. Tops of the two second locking hooks 425 are blocked by the top surface of the second main plate 431.

In this first preferred embodiment, a width of each side of the second main plate 431 is greater than a width of the middle of the second main plate 431. Several portions of two sides of the bottom surface of the second main plate 431 protrude downward and towards the plurality of the second terminals 41 to form the plurality of the second contacting blocks 434. The plurality of the second contacting blocks 434 are spaced from one another. The two second locking holes 432 are located between the second contacting blocks 434 of the two sides of the bottom surface of the second main plate 431. In the first preferred embodiment, each second contacting block 434 is rectangular. Each second contacting block 434 extends in the longitudinal direction. The plurality of the second contacting blocks 434 are in contact with the second fastening portions 411 of the second grounding terminals 415 of the second terminals 41 of the two sides of the second terminal assembly 4 to form the grounding structure 90, so that the signal noise is able to be effectively absorbed and the signal noise is able to be effectively restrained for improving the transmission quality of the high-frequency signal of the high-speed connector 100.

The second main plate 431 has the plurality of the second slits 435 penetrating through two sides of the top surface and the two sides of the bottom surface of the second main plate 431. A transverse width of a bottom of each second slit 435 is narrower than a transverse width of a top of each second slit 435. Each second slit 435 has a second narrow aperture 4351 and a second wide aperture 4352. The second narrow aperture 4351 is formed at the bottom surface of the second main plate 431. The second wide aperture 4352 is formed at the top surface of the second main plate 431. The second narrow aperture 4351 and the second wide aperture 4352 are used to improve the electromagnetic field crosstalk interference.

In this first preferred embodiment, each second slit 435 is formed between two adjacent second contacting blocks 434. Each second slit 435 extends along the longitudinal direction. Each two adjacent second differential signal terminals 416 form a second differential signal terminal pair. Each second slit 435 which is formed between the two adjacent second contacting blocks 434 is aligned with a second interstice 304 between the two second fastening portions 411 of the two adjacent second differential signal terminals 416 of one second differential signal terminal pair along the up-down direction. In the concrete implementation, the high-speed connector 100 is without being limited to align each second slit 435 which is formed between the two adjacent second contacting blocks 434 with the second interstice 304 between the two second fastening portions 411 of the two adjacent second differential signal terminals 416 of the one second differential signal terminal pair along the up-down direction.

Each second separating groove 436 is formed among the two adjacent second contacting blocks 434 and the second main plate 431. Each second separating groove 436 is rectangular. The plurality of the second separating grooves 436 are corresponding to the second fastening portions 411 of the second differential signal terminals 416 of the two sides of the second terminal assembly 4 along the vertical direction. The second fastening portions 411 of the second differential signal terminals 416 of the two sides of the second terminal assembly 4 are received in the plurality of the second separating grooves 436. Each two adjacent second differential signal terminals 416 are received in one second separating groove 436. Top walls of the plurality of the second separating grooves 436 are spaced from the second fastening portions 411 of the second differential signal terminals 416 of the two sides of the second terminal assembly 4 along the vertical direction, and several portions of the second main plate 431 are defined as the top walls of the plurality of the second separating grooves 436, so the second main plate 431 keeps distances from the second fastening portions 411 of the second differential signal terminals 416 of the two sides of the second terminal assembly 4 along the vertical direction.

Two opposite side surfaces of the second metal block 43 protrude outward and then protrude downward to form the two second restricting portions 437. A quantity of the second restricting portions 437 of the second metal block 43 is equal to a quantity of the second restricting holes 427 of the second base body 42. The plurality of the second restricting portions 437 of the second metal block 43 are restricted in the plurality of the second restricting holes 427 of the second base body 42, so the second metal block 43 is fastened in the second fastening groove 423 of the second base body 42. Several portions of two middles of the front surface and the rear surface of the second main plate 431 protrude outward to form the plurality of the second contacting points 438. The plurality of the second contacting points 438 of the second main plate 431 abut against a front inner wall and a rear inner wall of the first buckling groove 303 of the second surrounding portion 420 of the second base body 42, so that the second metal block 43 is fastened to the second base body 42.

In this first preferred embodiment, the second metal block 43 has the two second locking holes 432, six second contacting blocks 434, four second slits 435, four second separating grooves 436, the two second restricting portions 437 and four second contacting points 438.

Referring to FIG. 3 to FIG. 28, the third terminal assembly 5 includes a plurality of third terminals 51, a third base body 52, a third metal block 53, a second dielectric structure 54, a second holding element 55 and a first laminar structure 56.

The plurality of the third terminals 51 are disposed between the first laminar structure 56 and the third metal block 53. The plurality of the third terminals 51 are fastened to the third base body 52. The plurality of the third terminals 51 are partially surrounded by the third base body 52. The third metal block 53 is disposed in the third base body 52, and the third metal block 53 is disposed under the plurality of the third terminals 51.

Rear ends of the plurality of the third terminals 51 are surrounded by the second dielectric structure 54. The second dielectric structure 54 is used for adjusting a dielectric coefficient of a peripheral structure of each third terminal 51 to improve the crosstalk interference of the high-speed connector 100. Lower portions of the plurality of the third terminals 51 are surrounded by the second holding element

55. The first laminar structure 56 is disposed in the third base body 52, and the first laminar structure 56 is disposed on the plurality of the third terminals 51. The first laminar structure 56 is opposite to the third metal block 53. The first laminar structure 56 is used for adjusting the dielectric coefficient of the peripheral structure of each third terminal 51 to improve the crosstalk interference of the high-speed connector 100. A position of the first laminar structure 56 is corresponding to a position of the rear end of the first base body 32. The first laminar structure 56 is mounted under the rear end of the first base body 32.

Each third terminal 51 has a third fastening portion 511, a third contacting portion 512, a second extending portion 513, a second bending portion 514 and a third soldering portion 515. A front end of the third fastening portion 511 extends frontward, and then is arched downward to form the third contacting portion 512. A rear end of the third fastening portion 511 slantwise extends rearward and downward to form the second extending portion 513. A rear end of the second extending portion 513 is bent downward to form the second bending portion 514. A tail end of the second bending portion 514 is bent rearward to form the third soldering portion 515. The third fastening portions 511 of the plurality of the third terminals 51 are fastened to the third base body 52. The third contacting portions 512 of the plurality of the third terminals 51 project beyond a front surface of the third base body 52. The third contacting portions 512 of the plurality of the third terminals 51 are disposed in the plurality of the second terminal slots 329 of the first terminal assembly 3.

During the assembling process of the high-speed connector 100, the plurality of the second terminal slots 329 are used for preventing the third contacting portions 512 of the third terminal assembly 5 from tilting. The second extending portions 513 of the plurality of the third terminals 51 project beyond a rear surface of the third base body 52. The second dielectric structure 54 is fastened to the second extending portions 513 of the plurality of the third terminals 51. Tail ends of the plurality of the second bending portions 514 of the plurality of the third terminals 51 are surrounded by the second holding element 55. Two opposite sides of the front end of each third fastening portion 511, two opposite sides of the rear end of each third fastening portion 511 and two opposite sides of each second bending portion 514 are recessed inward to form a plurality of third lacking grooves 518. Corresponding formations of the third base body 52 are embedded into the plurality of the third lacking grooves 518 of the third fastening portions 511 and the second bending portions 514 of the plurality of the third terminals 51.

The plurality of the third terminals 51 include a plurality of third grounding terminals 516 and a plurality of third differential signal terminals 517. Each two adjacent third differential signal terminals 517 are disposed between two third grounding terminals 516. In the first preferred embodiment, the plurality of the third terminals 51 include seven third grounding terminals 516 and twelve third differential signal terminals 517. Each third differential signal terminal 517 is used for transmitting the signal. The third fastening portion 511 of one third grounding terminal 516 and the third fastening portions 511 of four third differential signal terminals 517 are surrounded by a middle of the third base body 52.

The third base body 52 has a third surrounding portion 520, a first locating pillar 521, two third protruding portions 522, a third fastening groove 523, two third openings 524, two third locking hooks 525, a second location hole 526, two third restricting holes 527 and a plurality of third connecting portions 528. The third surrounding portion 520 is disposed at the middle of the third base body 52, and the third surrounding portion 520 is connected between a front end of the third base body 52 and a rear end of the third base body 52. The third fastening portion 511 of the one third grounding terminal 516 and the third fastening portions 511 of the four third differential signal terminals 517 are surrounded by the third surrounding portion 520. A front end of a top surface of the third surrounding portion 520 of the third base body 52 extends upward to form the first locating pillar 521. The first locating pillar 521 is fastened in the first location hole 326 of the first base body 32 of the first terminal assembly 3, so that the third terminal assembly 5 is fastened to the first terminal assembly 3.

In the first preferred embodiment, two opposite sides of the third base body 52 extend outward to form the two third protruding portions 522. The two third protruding portions 522 are buckled in the two third locating slots 115 of the insulating housing 1, so that the third terminal assembly 5 is fastened to the insulating housing 1. A middle of a bottom surface of the third base body 52 is recessed inward to form the third fastening groove 523. A middle of a top surface of the third base body 52 is recessed inward to form a first locating groove 501. The third metal block 53 is disposed in the third fastening groove 523 of the third base body 52. The first laminar structure 56 is disposed in the first locating groove 501. Two tops of two sides of the third fastening groove 523 extend upward to two sides of the first locating groove 501 to form the two third openings 524. The two third openings 524 are formed to two sides of the third surrounding portion 520. Top surfaces of the third fastening portions 511 of the plurality of the third grounding terminals 516 and the third differential signal terminals 517 of the third terminal assembly 5 are exposed to the first locating groove 501. The third fastening portions 511 of the plurality of the third grounding terminals 516 and the third differential signal terminals 517 of two sides of the third terminal assembly 5 are exposed to the two third openings 524 of the third base body 52. Bottom surfaces of the third fastening portions 511 of the plurality of the third grounding terminals 516 and the third differential signal terminals 517 of the two sides of the third terminal assembly 5 are exposed to the third fastening groove 523 from the two third openings 524 of the third base body 52.

A middle of the third fastening groove 523 of the third base body 52 transversely penetrate through a middle of a bottom surface of the third surrounding portion 520 to form a second buckling groove 502. Two sides of a bottom of the third surrounding portion 520 extend downward and then protrude outward to form the two third locking hooks 525. The two third locking hooks 525 are located to the middle of the third fastening groove 523. The two third locking hooks 525 are located to the second buckling groove 502. The two third locking hooks 525 are used for fastening the third metal block 53. A rear end of the bottom surface of the third surrounding portion 520 is recessed inward to form the second location hole 526. A corresponding structure of the fourth terminal assembly 6 is fastened in the second location hole 526, so that the fourth terminal assembly 6 is fastened to the third terminal assembly 5.

The two opposite sides of the third base body 52 define the two third restricting holes 527 penetrating through the top surface and the bottom surface of the third base body 52. Two third restricting portions 537 of the third metal block 53 are disposed in the two third restricting holes 527, so that the third metal block 53 is fastened to the third base body 52. An upper surface of the third base body 52 and an upper surface of the second holding element 55 have the plurality of the third connecting portions 528. The plurality of the third connecting portions 528 are longitudinally arranged in three rows. Each third terminal 51 is disposed between two adjacent third connecting portions 528. Each third connecting portion 528 is used to simplify the mold manufacturing process. In the first preferred embodiment, the plurality of the third connecting portions 528 are embedded into the third lacking grooves 518 of the third fastening portions 511 and the second bending portions 514 of the plurality of the third terminals 51.

The third metal block 53 is fastened in the third fastening groove 523 of the third base body 52. The third metal block 53 is positioned under the plurality of the third terminals 51. The third metal block 53 has a third main plate 531, two third locking holes 532, a plurality of third contacting blocks 534, a plurality of third slits 535, a plurality of third separating grooves 536, the two third restricting portions 537 and a plurality of third contacting points 538.

The third main plate 531 is received in the third fastening groove 523. A middle of the third main plate 531 defines the two third locking holes 532 vertically penetrating through a top surface and a bottom surface of the third main plate 531. The two third locking holes 532 are arranged along the transverse direction. The two third locking hooks 525 of the third base body 52 pass through the two third locking holes 532. The two third locking hooks 525 are buckled to side walls of the two third locking holes 532. Bottoms of the two third locking hooks 525 are blocked by the bottom surface of the third main plate 531.

In this first preferred embodiment, a width of each side of the third main plate 531 is greater than a width of the middle of the third main plate 531. Several portions of two sides of the top surface of the third main plate 531 protrude upward and towards the plurality of the third terminals 51 to form the plurality of the third contacting blocks 534. The plurality of the third contacting blocks 534 are spaced from one another. The two third locking holes 532 are located between the third contacting blocks 534 of the two sides of the top surface of the third main plate 531. In the first preferred embodiment, each third contacting block 534 is rectangular. Each third contacting block 534 extends in the longitudinal direction. The plurality of the third contacting blocks 534 are in contact with the bottom surfaces of the third fastening portions 511 of the plurality of the third grounding terminals 516 of the third terminals 51 of the two sides of the third terminal assembly 5 to form the grounding structure 90, so that the signal noise is able to be effectively absorbed and the signal noise is able to be effectively restrained for improving the transmission quality of the high-frequency signal of the high-speed connector 100.

The third main plate 531 has the plurality of the third slits 535 penetrating through the two sides of the top surface and two sides of the bottom surface of the third main plate 531. A transverse width of a top of each third slit 535 is narrower than a transverse width of a bottom of each third slit 535. Each third slit 535 has a third narrow aperture 5351 and a third wide aperture 5352. The third narrow aperture 5351 is formed at the top surface of the third main plate 531. The third wide aperture 5352 is formed at the bottom surface of the third main plate 531. The third narrow aperture 5351 and the third wide aperture 5352 are used to improve the electromagnetic field crosstalk interference.

In this first preferred embodiment, each third slit 535 is formed between two adjacent third contacting blocks 534. Each third slit 535 extends along the longitudinal direction. Each two adjacent third differential signal terminals 517 form a third differential signal terminal pair. Each third slit 535 which is formed between the two adjacent third contacting blocks 534 is aligned with a third interstice 503 between the two third fastening portions 511 of the two adjacent third differential signal terminals 517 of one third differential signal terminal pair along the up-down direction. In the concrete implementation, the high-speed connector 100 is without being limited to align each third slit 535 which is formed between the two adjacent third contacting blocks 534 with the third interstice 503 between the two third fastening portions 511 of the two adjacent third differential signal terminals 517 of the one third differential signal terminal pair along the up-down direction.

Each third separating groove 536 is formed among the two adjacent third contacting blocks 534 and the third main plate 531. Each third separating groove 536 is rectangular. The plurality of the third separating grooves 536 are corresponding to the third fastening portions 511 of the third differential signal terminals 517 of the two sides of the third terminal assembly 5 along the vertical direction. The third fastening portions 511 of the third differential signal terminals 517 of the two sides of the third terminal assembly 5 are received in the plurality of the third separating grooves 536. The third fastening portions 511 of each two adjacent third differential signal terminals 517 of the two sides of the third terminal assembly 5 are received in one third separating groove 536. Bottom walls of the plurality of the third separating grooves 536 are spaced from the third fastening portions 511 of the third differential signal terminals 517 of the two sides of the third terminal assembly 5 along the vertical direction, and several portions of the third main plate 531 are defined as the bottom walls of the plurality of the third separating grooves 536, so the third main plate 531 keeps distances from the third fastening portions 511 of the third differential signal terminals 517 of the two sides of the third terminal assembly 5 along the vertical direction.

Two opposite side surfaces of the third metal block 53 protrude outward and then protrude upward to form the two third restricting portions 537. A quantity of the third restricting portions 537 of the third metal block 53 is equal to a quantity of the third restricting holes 527 of the third base body 52. The two third restricting portions 537 of the third metal block 53 are restricted in the two third restricting holes 527 of the third base body 52, so the third metal block 53 is fastened in the third fastening groove 523 of the third base body 52. Several portions of two middles of a front surface and a rear surface of the third main plate 531 protrude outward to form the plurality of the third contacting points 538. The plurality of the third contacting points 538 of the third main plate 531 abut against a front inner wall and a rear inner wall of the second buckling groove 502 of the third surrounding portion 520 of the third base body 52, so that the third metal block 53 is fastened to the third base body 52.

In this first preferred embodiment, the third metal block 53 has the two third locking holes 532, six third contacting blocks 534, four third slits 535, four third separating grooves 536, the two third restricting portions 537 and four third contacting points 538.

Figure 26:
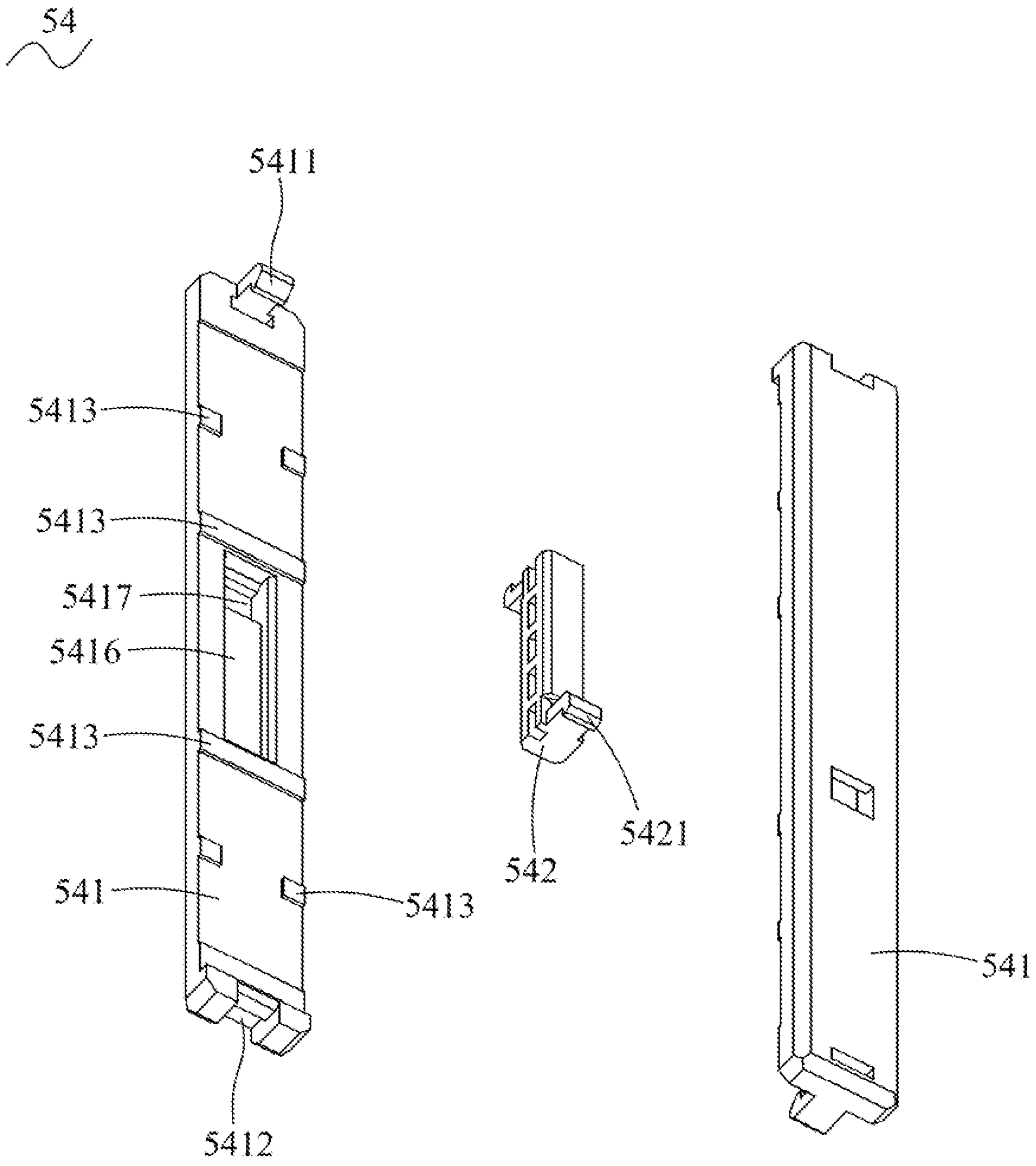
FIG. 26 is an exploded view of a second dielectric structure of the third terminal assembly of the high-speed connector of FIG. 22.
Figure 27:
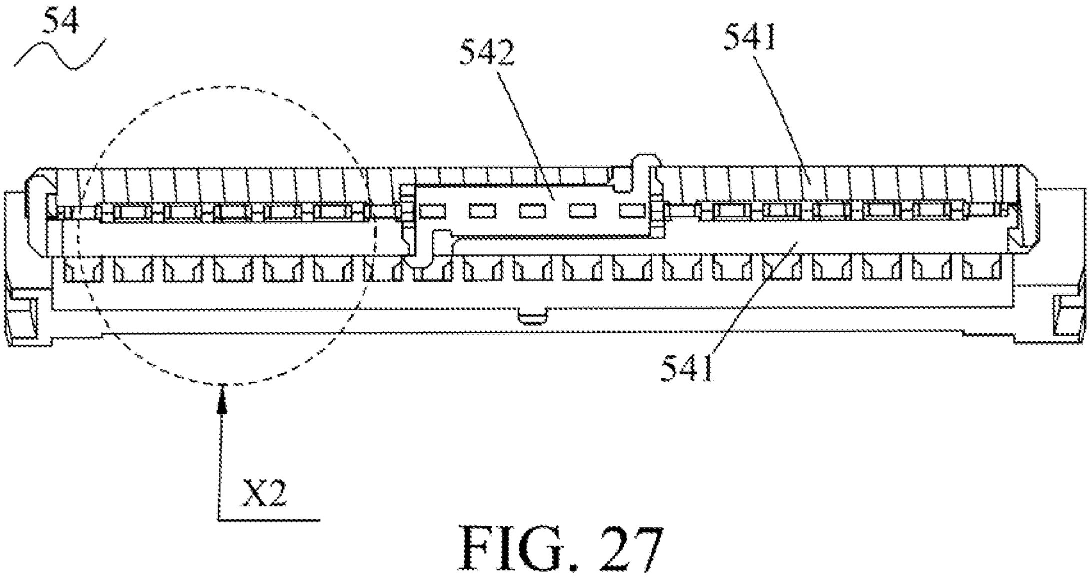
FIG. 27 is a cross-sectional view of the second dielectric structure of the third terminal assembly of the high-speed connector along a line C2-C2 of FIG. 22.
Figure 28:
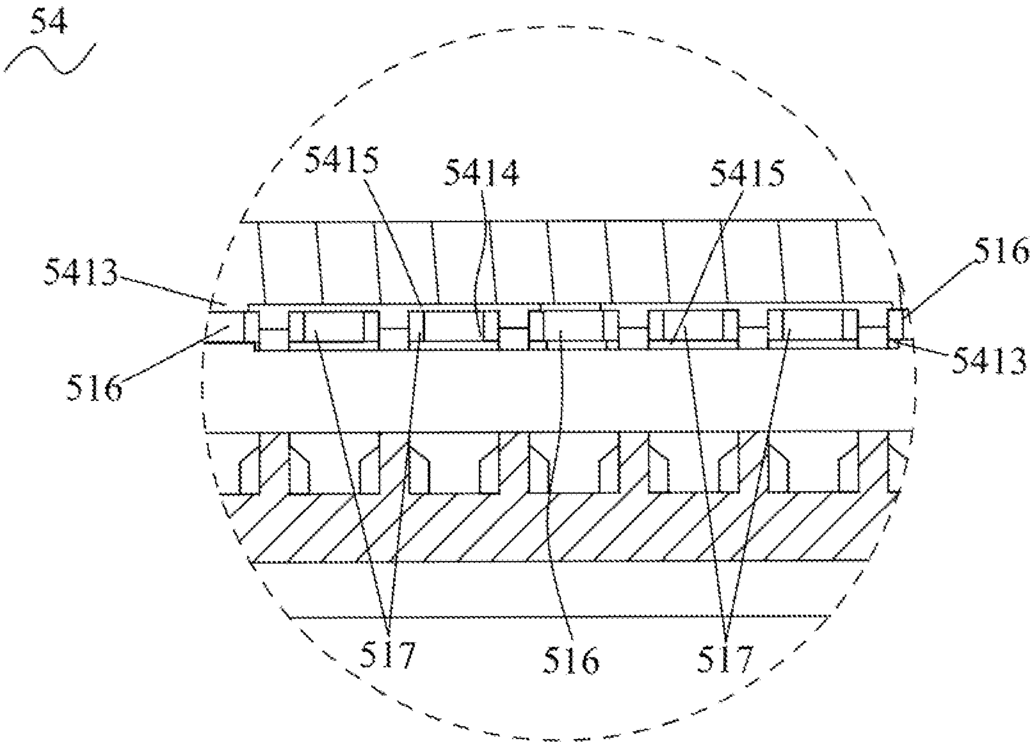
FIG. 28 is an enlarged view of an encircled portion X2 of the high-speed connector of FIG. 27.

Referring to FIG. 26 to FIG. 28, the second dielectric structure 54 includes two second covers 541 and a second fastening structure 542. In one condition, structures of the two second covers 541 are the same. In another condition, the two second covers 541 are symmetrical. The two second covers 541 are disposed opposite to each other. The second fastening structure 542 is disposed between the two second covers 541. Two sides of the second fastening structure 542 penetrate through the two second covers 541. The two second covers 541 and the second fastening structure 542 are buckled in a whole. The two second covers 541 are buckled by the second fastening structure 542 to form another entirety.

Each second cover 541 has a second extending foot 5411, a second notch 5412, a plurality of second attaching surfaces 5413 and a second interval 5414. One side of each second cover 541 has the second notch 5412 penetrating through an outer surface, an inner surface and one side surface of each second cover 541. The other side of each second cover 541 protrudes inward and perpendicular to each second cover 541 to form the second extending foot 5411. Each second extending foot 5411 is disposed corresponding to one second notch 5412. The two second extending feet 5411 of the two second covers 541 are buckled with the two second notches 5412 of the two second covers 541.

Two sides of the inner surface of each second cover 541 has the plurality of the second attaching surfaces 5413 protruded beyond the inner surface of each second cover 541. The second attaching surfaces 5413 of one second cover 541 face the second attaching surfaces 5413 of the other second cover 541. The second attaching surfaces 5413 of the two second covers 541 are spaced to form the second interval 5414. The second extending portions 513 of the plurality of the third terminals 51 pass through the second interval 5414. The second attaching surfaces 5413 of the two second covers 541 are corresponding to the second extending portions 513 of the third grounding terminals 516 of the two sides of the third terminal assembly 5. The second attaching surfaces 5413 of the two second covers 541 clamp the second extending portions 513 of the third grounding terminals 516 of the two sides of the third terminal assembly 5. The second attaching surfaces 5413 of the one second cover 541 are corresponding to upper surfaces of the second extending portions 513 of the third grounding terminals 516 of the two sides of the third terminal assembly 5, and the second attaching surfaces 5413 of the other second cover 541 are corresponding to lower surfaces of the second extending portions 513 of the third grounding terminals 516 of the two sides of the third terminal assembly 5. The second attaching surfaces 5413 of the one second cover 541 contact with the upper surfaces of the second extending portions 513 of the third grounding terminals 516 of the two sides of the third terminal assembly 5, and the second attaching surfaces 5413 of the other second cover 541 contact with the lower surfaces of the second extending portions 513 of the third grounding terminals 516 of the two sides of the third terminal assembly 5.

The upper surface and the lower surface of the second extending portion 513 of each third differential signal terminal 517 of the two sides of the third terminal assembly 5 are spaced from the two inner surfaces of the two second covers 541 to form two second gaps 5415. A plurality of the second gaps 5415 are formed among the third terminal assembly 5 and the two inner surfaces of the two second covers 541. The second interval 5414 and each second gap 5415 of the second dielectric structure 54 are used for adjusting the dielectric coefficient of the peripheral structure of each third terminal 51 to improve the electromagnetic characteristic and the crosstalk interference of the high-speed connector 100.

A middle of the inner surface of each second cover 541 is recessed inward to from a second sunken portion 5416. The second sunken portion 5416 is used for receiving the second fastening structure 542. One side of the second sunken portion 5416 of each second cover 541 has a second perforation 5417 penetrating through the inner surface and the outer surface of each second cover 541. Corresponding hooks of the second fastening structure 542 are disposed to the second perforations 5417 of the two second covers 541, and the corresponding hooks of the second fastening structure 542 are buckled to the two outer surfaces of the two second covers 541, so that the second fastening structure 542 is fastened between the two second covers 541.

One side of the second fastening structure 542 has a second buckling hook 5421. In the first preferred embodiment, two opposite sides of the second fastening structure 542 extend oppositely and then protrude oppositely to form two second buckling hooks 5421. A quantity of the second buckling hooks 5421 of the second fastening structure 542 is equal to a quantity of the second perforations 5417 of the two second covers 541. The second buckling hooks 5421 of the second fastening structure 542 are buckled in the second perforations 5417 of the two second covers 541, and the second buckling hooks 5421 of the second fastening structure 542 hook the two outer surfaces of the two second covers 541, so that the second fastening structure 542 is fastened between the two second covers 541. The second extending portions 513 of the third terminals 51 of a middle of the third terminal assembly 5 longitudinally pass through a middle of the second fastening structure 542.

Referring to FIG. 3 to FIG. 24, bottom ends of the plurality of the third terminals 51 are surrounded by the second holding element 55. The tail ends of the plurality of the second bending portions 514 of the plurality of the third terminals 51 are surrounded by the second holding element 55. Two opposite side surfaces of the second holding element 55 are recessed inward to form the two second clamping slots 551. The two rear ends of the two protruding ribs 117 of the insulating housing 1 are clamped in the two second clamping slots 551 of the third terminal assembly 5, so that the third terminal assembly 5 is fastened to the insulating housing 1. Each second clamping slot 551 is shown as the horn shape, and a rear end of each second clamping slot 551 is narrower than a front end of each second clamping slot 551, so that the two protruding ribs 117 of the insulating housing 1 are buckled in the two second clamping slots 551 conveniently.

When the terminal module 2 is assembled, the second holding element 55 is disposed in front of the first holding element 35, and the two second clamping slots 551 of the second holding element 55 are disposed in front of the two first clamping slots 351 of the first holding element 35. The two second clamping slots 551 of the second holding element 55 and the two first clamping slots 351 of the first holding element 35 are aligned along the longitudinal direction. Two rear ends of the two second clamping slots 551 of the second holding element 55 are communicated with two front ends of the two first clamping slots 351 of the first holding element 35.

Figure 23:
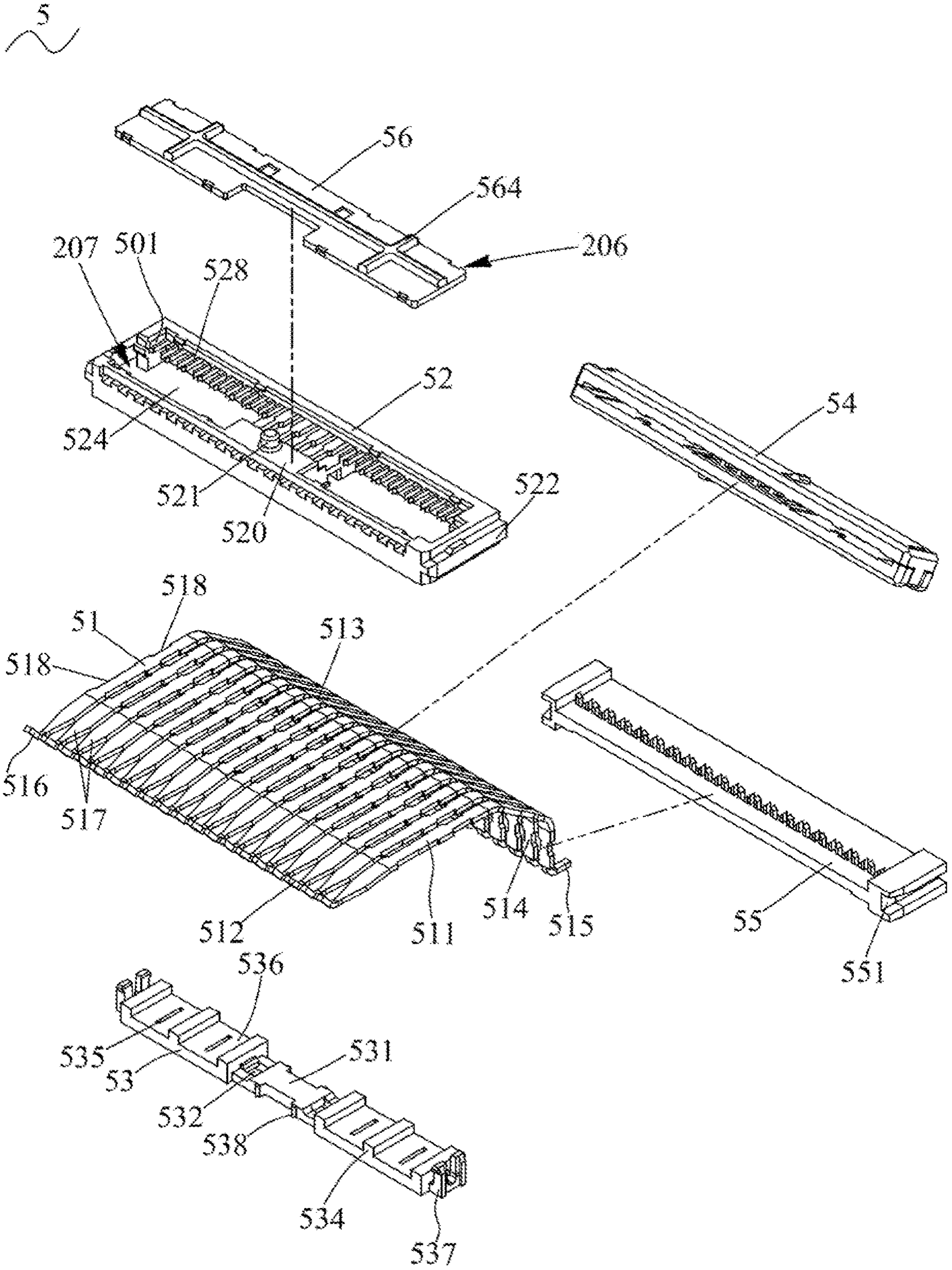
FIG. 23 is an exploded view of the third terminal assembly of the terminal module of the high-speed connector of FIG. 22.
Figure 24:
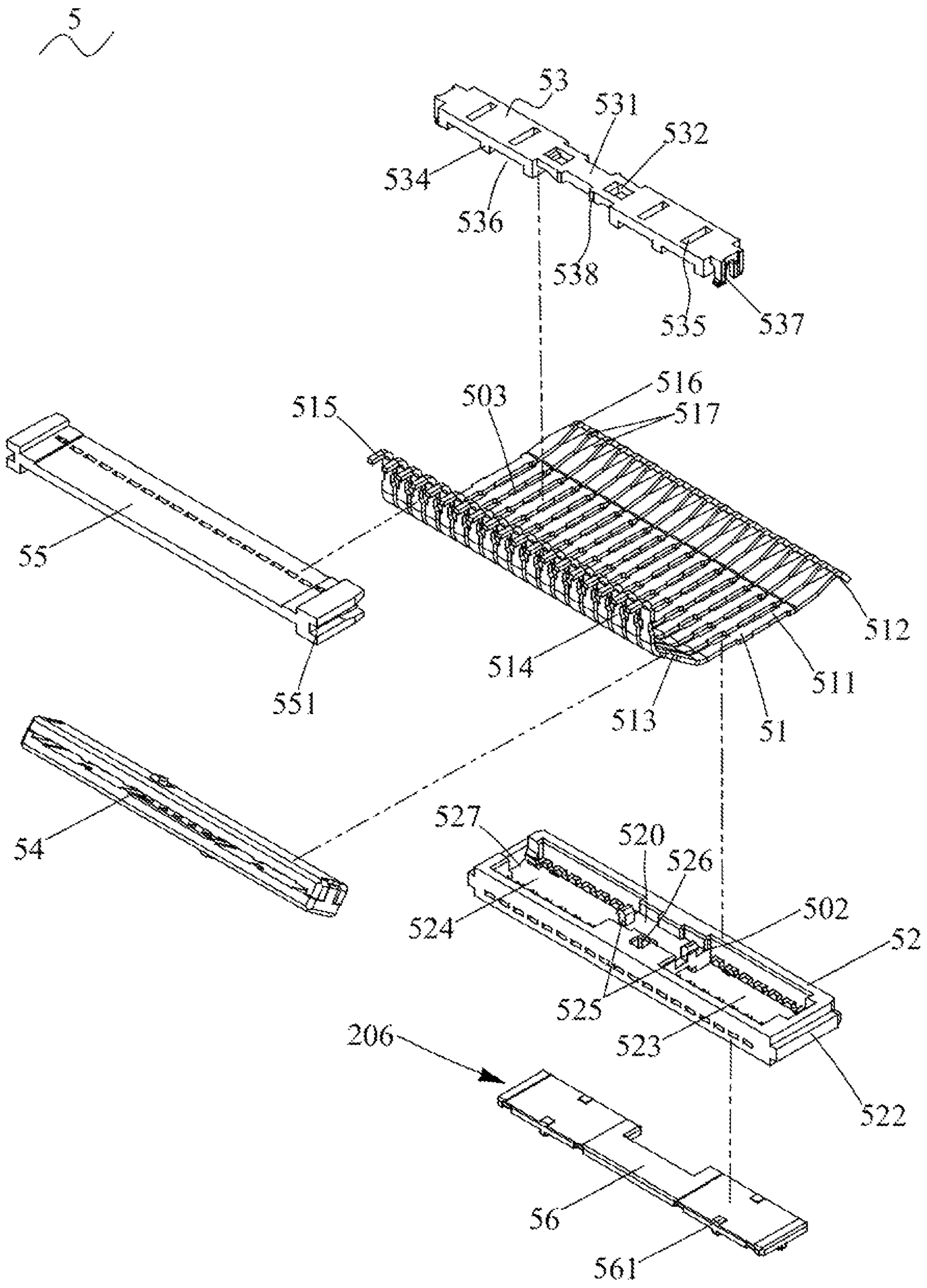
FIG. 24 is another exploded view of the third terminal assembly of the terminal module of the high-speed connector of FIG. 22.
Figure 25:
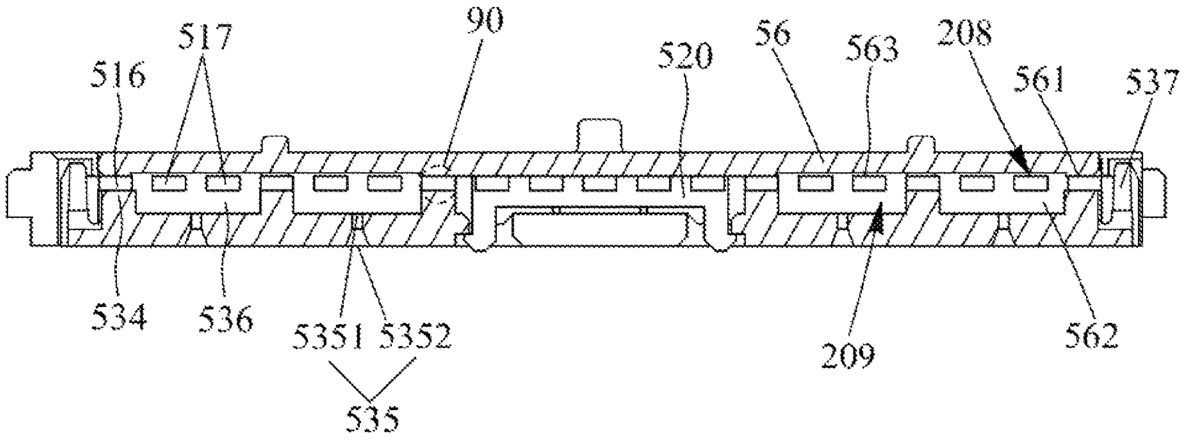
FIG. 25 is a cross-sectional view of the third terminal assembly of the high-speed connector along a line C1-C1 of FIG. 22.

Referring to FIG. 23 to FIG. 25, the first laminar structure 56 is formed by the plastic injection molding technology. The first laminar structure 56 is located in the first locating groove 501. An inner surface of the first laminar structure 56 has a plurality of third attaching surfaces 561. Several portions of two sides of a bottom surface of the first laminar structure 56 protrude downward to form the plurality of the third attaching surfaces 561. In the first preferred embodiment, the plurality of the third attaching surfaces 561 of the first laminar structure 56 are corresponding to the top surfaces of the third fastening portions 511 of the third grounding terminals 516 of the two sides of the third terminal assembly 5. The plurality of the third attaching surfaces 561 of the first laminar structure 56 contact with the top surfaces of the third fastening portions 511 of the third grounding terminals 516 of the two sides of the third terminal assembly 5.

The first laminar structure 56 is spaced from the third metal block 53. The first laminar structure 56, the third main plate 531 and the plurality of the third contacting blocks 534 of the third metal block 53 surround a plurality of first internal spaces 562. Each first internal space 562 is formed among the first laminar structure 56, the third main plate 531 and the two adjacent third contacting blocks 534 of the third metal block 53. The third fastening portions 511 of each two adjacent third differential signal terminals 517 of the two sides of the third terminal assembly 5 pass through one first internal space 562. The top surface of the third fastening portion 511 of each third differential signal terminal 517 of the two sides of the third terminal assembly 5 is spaced from the inner surface of the first laminar structure 56 to form a first clearance 563. A plurality of the first clearances 563 are formed between the third terminal assembly 5 and the inner surface of the first laminar structure 56. The first internal space 562 and the first clearance 563 are used for adjusting the dielectric coefficient of the peripheral structure of each third terminal 51 of the high-speed connector 100 to improve the electromagnetic characteristic and the crosstalk interference of the high-speed connector 100.

In the concrete implementation, according to a whole structure adjustment of the third terminal assembly 5, a size of the first clearance 563 is changed, and the first clearance 563 is even canceled. An outer surface of the first laminar structure 56 extends outward to form a first strengthening structure 564. The first strengthening structure 564 is used for reinforcing a structural strength of the first laminar structure 56. In the first preferred embodiment, two sides of the first strengthening structure 564 are shown as two cross structures from a top view to reinforce the structural strength of the first laminar structure 56.

Figure 29:
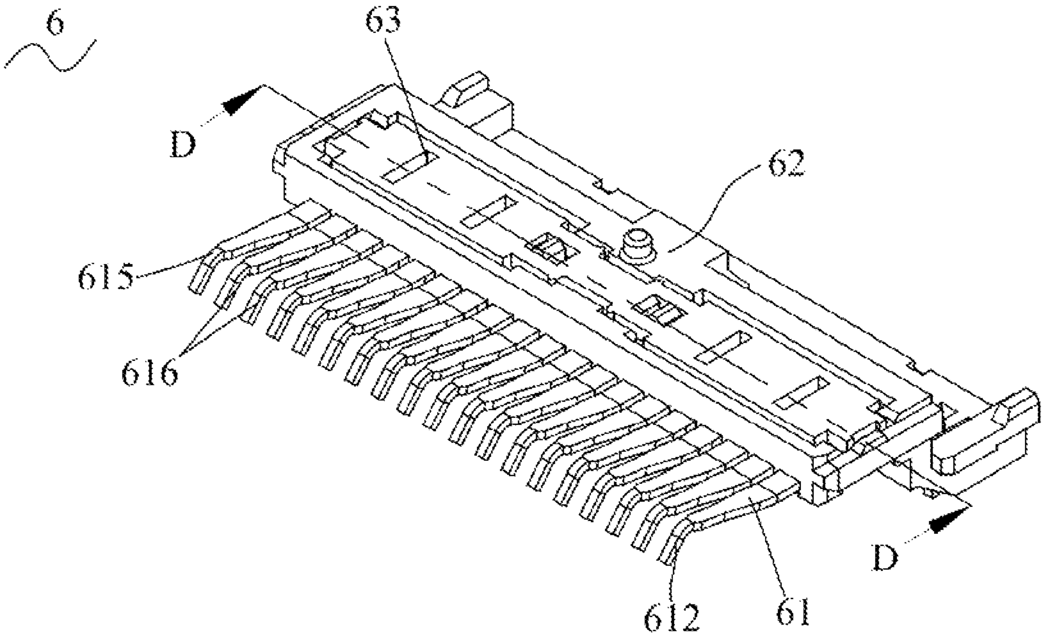
FIG. 29 is a perspective view of a fourth terminal assembly of the terminal module of the high-speed connector of FIG. 3.
Figure 30:
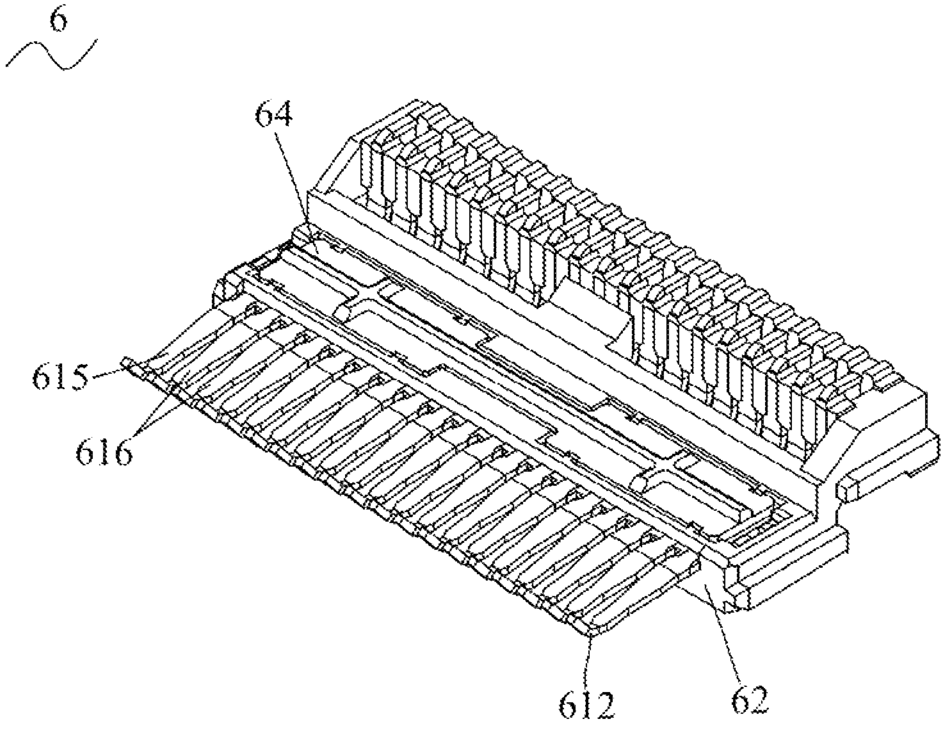
FIG. 30 is another perspective view of the fourth terminal assembly of the terminal module of the high-speed connector of FIG. 29.

Referring to FIG. 3, FIG. 29 and FIG. 30, the fourth terminal assembly 6 is corresponding to the third terminal assembly 5 along the up-down direction. The fourth terminal assembly 6 is mounted under the third terminal assembly 5. The fourth terminal assembly 6 includes the plurality of fourth terminals 61, a fourth base body 62, a fourth metal block 63 and a second laminar structure 64. The plurality of the fourth terminals 61 are fastened to the fourth base body 62, and the plurality of the fourth terminals 61 are partially surrounded by the fourth base body 62. The fourth metal block 63 is disposed in the fourth base body 62, and the plurality of the fourth terminals 61 are disposed under the fourth metal block 63. The second laminar structure 64 is disposed in the fourth base body 62, and the second laminar structure 64 is positioned under the plurality of the fourth terminals 61. The plurality of the fourth terminals 61 are mounted between the fourth metal block 63 and the second laminar structure 64. The second laminar structure 64 is used for adjusting the dielectric coefficient of the peripheral structure of each fourth terminal 61 to improve the crosstalk interference of the high-speed connector 100.

Referring to FIG. 3 to FIG. 33, each fourth terminal 61 has a fourth fastening portion 611, a fourth contacting portion 612, a third bending portion 613 and a fourth soldering portion 614. A front end of the fourth fastening portion 611 extends frontward and then is arched upward to form the fourth contacting portion 612. A rear end of the fourth fastening portion 611 is bent downward to form the third bending portion 613. A tail end of the third bending portion 613 is bent rearward to form the fourth soldering portion 614. The fourth fastening portions 611 of the plurality of the fourth terminals 61 are fastened to the fourth base body 62. The fourth contacting portions 612 of the plurality of the fourth terminals 61 project beyond a front surface of the fourth base body 62. The fourth contacting portions 612 of the plurality of the fourth terminals 61 of the fourth terminal assembly 6 are disposed in the row of the third terminal slots 429 of the second terminal assembly 4. During the assembling process of the high-speed connector 100, the row of the third terminal slots 429 are used for preventing the fourth contacting portions 612 of the fourth terminal assembly 6 from tilting. The third bending portions 613 of the plurality of the fourth terminals 61 project beyond a rear surface of the fourth base body 62. Two opposite sides of the front end of each fourth fastening portion 611, two opposite sides of the rear end of each fourth fastening portion 611 and two opposite sides of each third bending portion 613 are recessed inward to from a plurality of fourth lacking grooves 617. Corresponding portions of the fourth base body 62 are embedded in the plurality of the fourth lacking grooves 617 of the fourth fastening portions 611 and the third bending portions 613 of the plurality of the fourth terminals 61.

The plurality of the fourth terminals 61 include a plurality of fourth grounding terminals 615 and a plurality of fourth differential signal terminals 616. Each two adjacent fourth differential signal terminals 616 are disposed between two fourth grounding terminals 615. In the first preferred embodiment, the plurality of the fourth terminals 61 include seven fourth grounding terminals 615 and twelve fourth differential signal terminals 616. Each fourth differential signal terminal 616 is used for transmitting the signal. The fourth fastening portion 611 of one fourth grounding terminal 615 and the fourth fastening portions 611 of four fourth differential signal terminals 616 are surrounded by a middle of the fourth base body 62.

The fourth base body 62 has a fourth surrounding portion 620, a second locating pillar 621, a plurality of fourth protruding portions 622, a fourth fastening groove 623, a plurality of fourth openings 624, a plurality of fourth locking hooks 625, two fourth restricting holes 626 and a plurality of fourth connecting portions 627. The fourth surrounding portion 620 is disposed to the middle of the fourth base body 62, and the fourth surrounding portion 620 is connected between a front end and a rear end of the fourth base body 62. The fourth fastening portion 611 of the one fourth grounding terminal 615 and the fourth fastening portions 611 of the four fourth differential signal terminals 616 are surrounded by the fourth surrounding portion 620 of the fourth base body 62. A top surface of the fourth surrounding portion 620 of the fourth base body 62 extends upward to form the second locating pillar 621. The second locating pillar 621 of the fourth surrounding portion 620 of the fourth base body 62 is fastened in the second location hole 526 of the third base body 52 of the third terminal assembly 5, so that the fourth terminal assembly 6 is fastened to the third terminal assembly 5.

In the first preferred embodiment, several portions of two opposite sides of the fourth base body 62 extend outward to form the plurality of the fourth protruding portions 622. The plurality of the fourth protruding portions 622 are arranged in two rows along the front-to-rear direction. A front row of the fourth protruding portions 622 are located above a rear row of the fourth protruding portions 622. The fourth protruding portions 622 of the fourth base body 62 are buckled in the two second locating slots 114 and the two fourth locating slots 116 of the insulating housing 1, so that the fourth terminal assembly 6 is fastened to the insulating housing 1. A middle of a top surface of the front end of the fourth base body 62 is recessed downward to form the fourth fastening groove 623. A middle of a bottom surface of the front end of the fourth base body 62 is recessed inward to form a second locating groove 601. The fourth metal block 63 is disposed in the fourth fastening groove 623 of the fourth base body 62. The second laminar structure 64 is mounted in the second locating groove 601.

The fourth base body 62 has four fourth openings 624. The four fourth openings 624 are located to two opposite sides of the fourth surrounding portion 620. The front end of the fourth base body 62 has two fourth openings 624, and the rear end of the fourth base body 62 has the other two fourth openings 624. A front end of the fourth surrounding portion 620 is located between the two fourth openings 624 of the front end of the fourth base body 62. A rear end of the fourth surrounding portion 620 is located between the other two fourth openings 624 of the rear end of the fourth base body 62. Two bottoms of two sides of the fourth fastening groove 623 extend downward to two sides of the second locating groove 601 to form the two fourth openings 624 of the front end of the fourth base body 62. The other two fourth openings 624 of the rear end of the fourth base body 62 penetrate through two sides of a top surface and two sides of a bottom surface of the rear end of the fourth base body 62.

Bottom surfaces of the fourth fastening portions 611 of the plurality of the fourth grounding terminals 615 and the fourth differential signal terminals 616 of the fourth terminal assembly 6 are exposed to the second locating groove 601. The fourth fastening portions 611 of the plurality of the fourth grounding terminals 615 and the fourth differential signal terminals 616 of two sides of the fourth terminal assembly 6 are exposed to the two fourth openings 624 of the front end of the fourth base body 62. Top surfaces of the fourth fastening portions 611 of the plurality of the fourth grounding terminals 615 and the fourth differential signal terminals 616 of the two sides of the fourth terminal assembly 6 are exposed to the fourth fastening groove 623 from the two fourth openings 624 of the front end of the fourth base body 62. The third bending portions 613 of the plurality of the fourth grounding terminals 615 and the fourth differential signal terminals 616 are exposed to the two fourth openings 624 of the rear end of the fourth base body 62. The front end of the fourth base body 62 of the fourth terminal assembly 6 abuts against the supporting portion 426 of the second base body 42.

A middle of the fourth fastening groove 623 transversely penetrate through a middle of the top surface of the fourth surrounding portion 620 of the fourth base body 62 to form a third buckling groove 602. Two sides of a top of the fourth surrounding portion 620 extend upward and then protrude outward to form the two fourth locking hooks 625. The two fourth locking hooks 625 are located to the middle of the fourth fastening groove 623. The two fourth locking hooks 625 are located to the third buckling groove 602. The two fourth locking hooks 625 are used for fastening the fourth metal block 63. The two fourth restricting holes 626 vertically penetrate through two sides of the top surface and two sides of the bottom surface of the front end of the fourth base body 62. Two fourth restricting portions 637 of the fourth metal block 63 are disposed in the two fourth restricting holes 626, so that the fourth metal block 63 is fastened to the fourth base body 62.

A lower portion of the fourth base body 62 has the plurality of the fourth connecting portions 627. The plurality of the fourth connecting portions 627 are longitudinally arranged in three rows. Each row of the fourth connecting portions 627 are arranged transversely. Each fourth terminal 61 is located between two adjacent fourth connecting portions 627. The plurality of the fourth connecting portions 627 are used to simplify the mold manufacturing process. In the first preferred embodiment, the plurality of the fourth connecting portions 627 are embedded in the fourth lacking grooves 617 of the fourth fastening portions 611 and the third bending portions 613 of the plurality of the fourth terminals 61.

The fourth metal block 63 is fastened in the fourth fastening groove 623 of the fourth base body 62, and the plurality of the fourth terminals 61 are positioned under the fourth metal block 63. The fourth metal block 63 has a fourth main plate 631, two fourth locking holes 632, a plurality of fourth contacting blocks 634, a plurality of fourth slits 635, a plurality of fourth separating grooves 636, two fourth restricting portions 637 and a plurality of fourth contacting points 638.

The fourth main plate 631 is received in the fourth fastening groove 623. A middle of the fourth main plate 631 defines the two fourth locking holes 632 vertically penetrating through a top surface and a bottom surface of the fourth main plate 631. The two fourth locking holes 632 are arranged along the transverse direction. The two fourth locking hooks 625 of the fourth base body 62 pass through the two fourth locking holes 632. The two fourth locking hooks 625 are buckled to side walls of the two fourth locking holes 632. Tops of the two fourth locking hooks 625 are blocked by the top surface of the fourth main plate 631.

In this first preferred embodiment, a width of each side of the fourth main plate 631 is greater than a width of the middle of the fourth main plate 631. Several portions of two sides of the bottom surface of the fourth main plate 631 protrude downward and towards the plurality of the fourth terminals 61 to form the plurality of the fourth contacting blocks 634. The plurality of the fourth contacting blocks 634 are spaced from one another. The two fourth locking holes 632 are located between the fourth contacting blocks 634 of the two sides of the bottom surface of the fourth main plate 631. In the first preferred embodiment, each fourth contacting block 634 is rectangular. Each fourth contacting block 634 extends in the longitudinal direction. The plurality of the fourth contacting blocks 634 are in contact with the top surfaces of the fourth fastening portions 611 of the plurality of the fourth grounding terminals 615 of the fourth terminals 61 of the two sides of the fourth terminal assembly 6 to form the grounding structure 90, so that the signal noise is able to be effectively absorbed and the signal noise is able to be effectively restrained for improving the transmission quality of the high-frequency signal of the high-speed connector 100.

The fourth main plate 631 has the plurality of the fourth slits 635 penetrating through two sides of the top surface and the two sides of the bottom surface of the fourth main plate 631. A transverse width of a bottom of each fourth slit 635 is narrower than a transverse width of a top of each fourth slit 635. Each fourth slit 635 has a fourth narrow aperture 6351 and a fourth wide aperture 6352. The fourth narrow aperture 6351 is formed at the bottom surface of the fourth main plate 631. The fourth wide aperture 6352 is formed at the top surface of the fourth main plate 631. The fourth narrow aperture 6351 and the fourth wide aperture 6352 are used to improve the electromagnetic field crosstalk interference.

In this first preferred embodiment, each fourth slit 635 is formed between two adjacent fourth contacting blocks 634. Each fourth slit 635 extends along the longitudinal direction. Each two adjacent fourth differential signal terminals 616 form a fourth differential signal terminal pair. Each fourth slit 635 which is formed between the two adjacent fourth contacting blocks 634 is aligned with a fourth interstice 603 between the two fourth fastening portions 611 of the two adjacent fourth differential signal terminals 616 of one fourth differential signal terminal pair along the up-down direction. In the concrete implementation, the high-speed connector 100 is without being limited to align each fourth slit 635 which is formed between the two adjacent fourth contacting blocks 634 with the fourth interstice 603 between the two fourth fastening portions 611 of the two adjacent fourth differential signal terminals 616 of the one fourth differential signal terminal pair along the up-down direction.

Each fourth separating groove 636 is formed among the two adjacent fourth contacting blocks 634 and the fourth main plate 631. Each fourth separating groove 636 is rectangular. The plurality of the fourth separating grooves 636 are corresponding to the fourth fastening portions 611 of the fourth differential signal terminals 616 of the two sides of the fourth terminal assembly 6 along the vertical direction. The fourth fastening portions 611 of the fourth differential signal terminals 616 of the two sides of the fourth terminal assembly 6 are received in the plurality of the fourth separating grooves 636. Each two adjacent fourth differential signal terminals 616 are received in one fourth separating groove 636. Top walls of the plurality of the fourth separating grooves 636 are spaced from the fourth fastening portions 611 of the fourth differential signal terminals 616 of the two sides of the fourth terminal assembly 6 along the vertical direction, and several portions of the fourth main plate 631 are defined as the top walls of the plurality of the fourth separating grooves 636, so the fourth main plate 631 keeps distances from the fourth fastening portions 611 of the fourth differential signal terminals 616 of the two sides of the fourth terminal assembly 6 along the vertical direction.

Two opposite side surfaces of the fourth metal block 63 protrude outward and then protrude downward to form the two fourth restricting portions 637. A quantity of the fourth restricting portions 637 of the fourth metal block 63 is equal to a quantity of the fourth restricting holes 626 of the fourth base body 62. The two fourth restricting portions 637 of the fourth metal block 63 are restricted in the two fourth restricting holes 626 of the fourth base body 62, so the fourth metal block 63 is fastened in the fourth fastening groove 623 of the fourth base body 62. Several portions of two middles of a front surface and a rear surface of the fourth main plate 631 protrude outward to form the plurality of the fourth contacting points 638. The plurality of the fourth contacting points 638 of the fourth main plate 631 abut against a front inner wall and a rear inner wall of the third buckling groove 602 of the fourth surrounding portion 620 of the fourth base body 62, so that the fourth metal block 63 is fastened to the fourth base body 62.

The fourth metal block 63 has the two fourth locking holes 632, six fourth contacting blocks 634, four fourth slits 635, four fourth separating grooves 636, the two fourth restricting portions 637 and four fourth contacting points 638.

Figure 31:
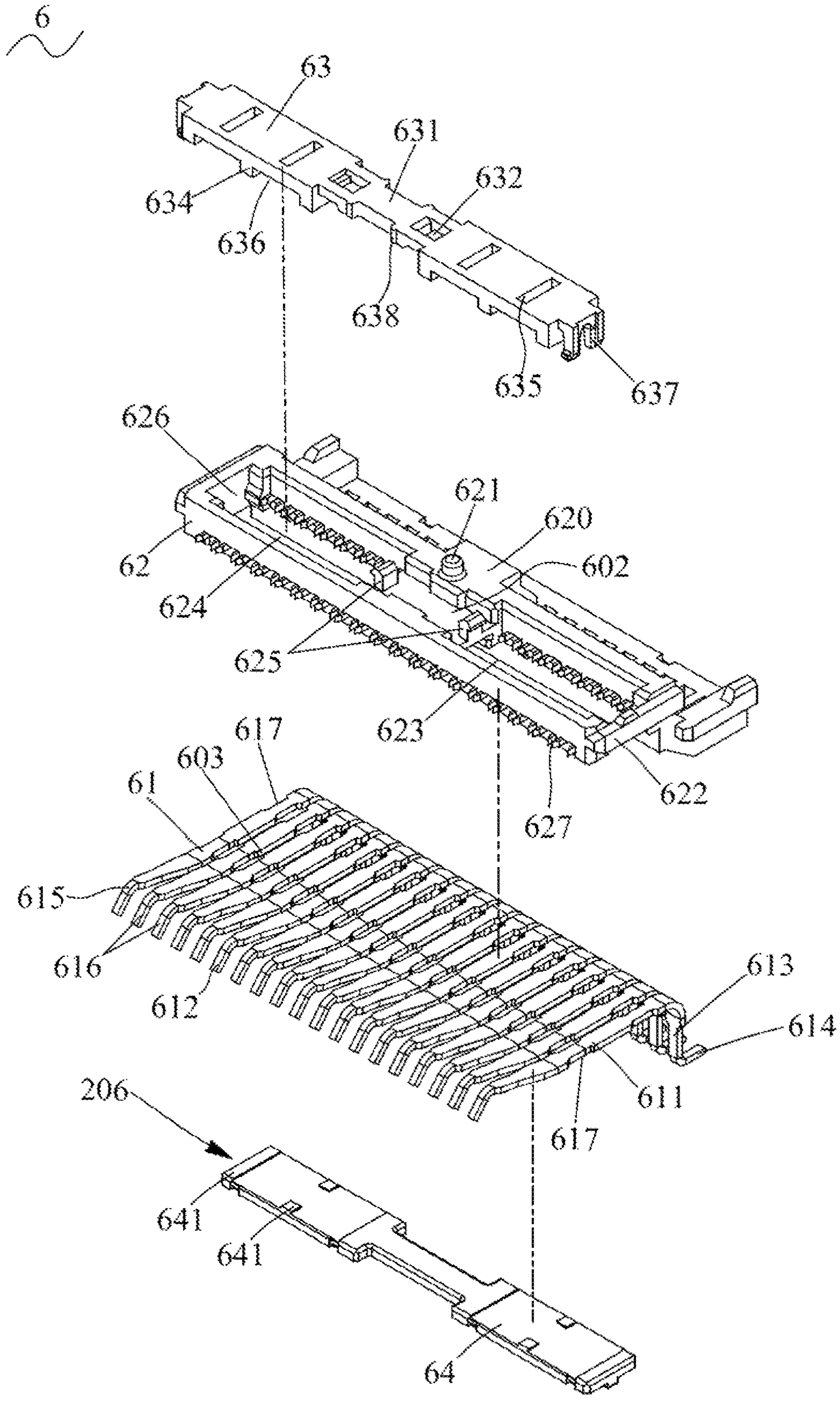
FIG. 31 is an exploded view of the fourth terminal assembly of the terminal module of the high-speed connector of FIG. 29.
Figure 32:
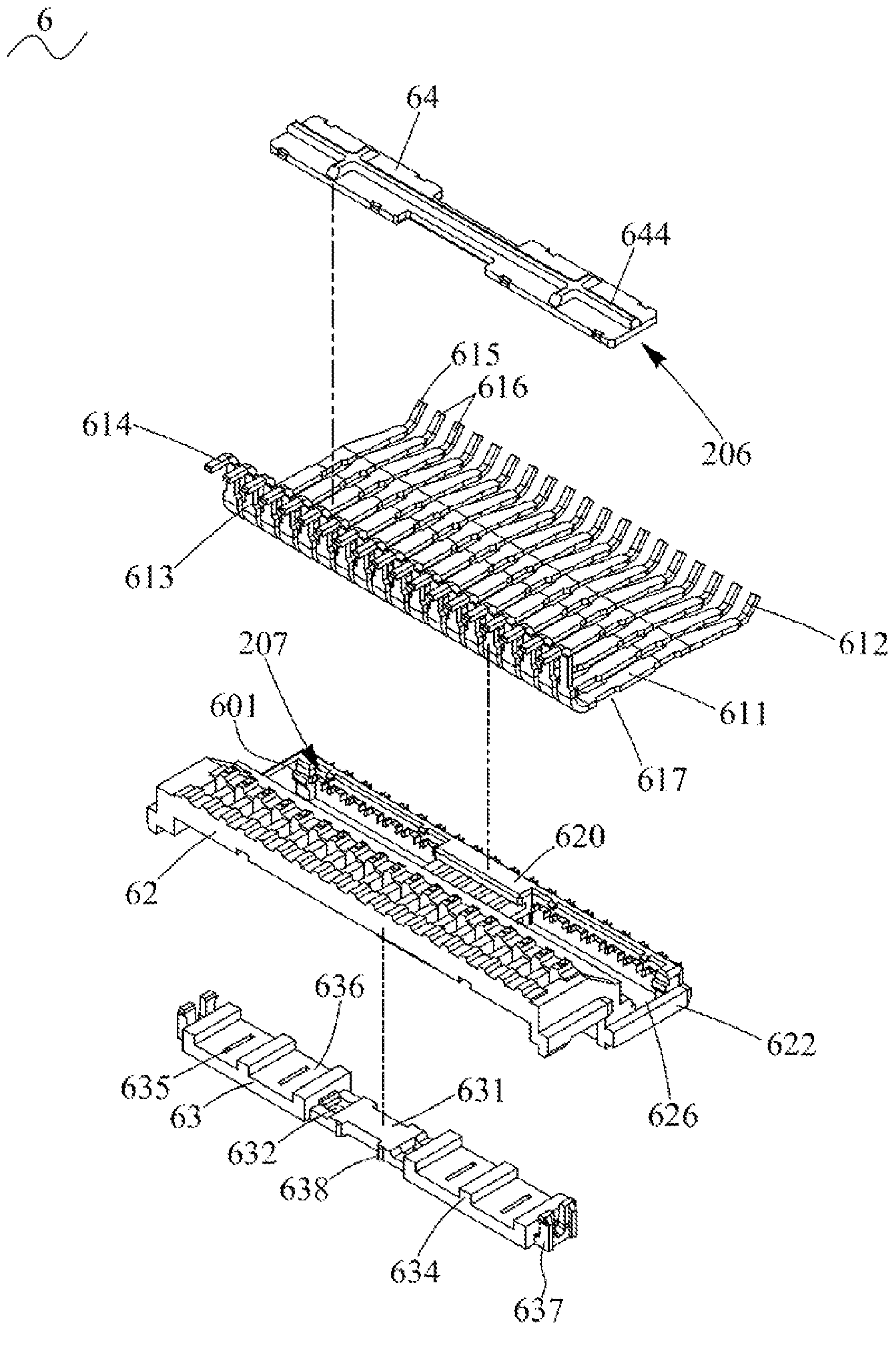
FIG. 32 is another exploded view of the fourth terminal assembly of the terminal module of the high-speed connector of FIG. 29.
Figure 33:
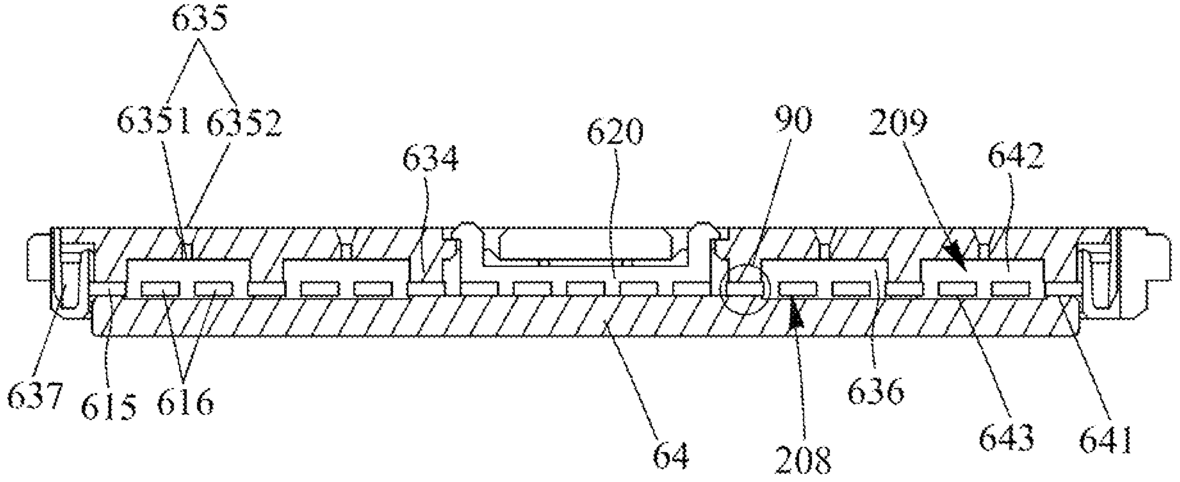
FIG. 33 is a cross-sectional view of the fourth terminal assembly of the high-speed connector along a line D-D of FIG. 29.
Figure 34:
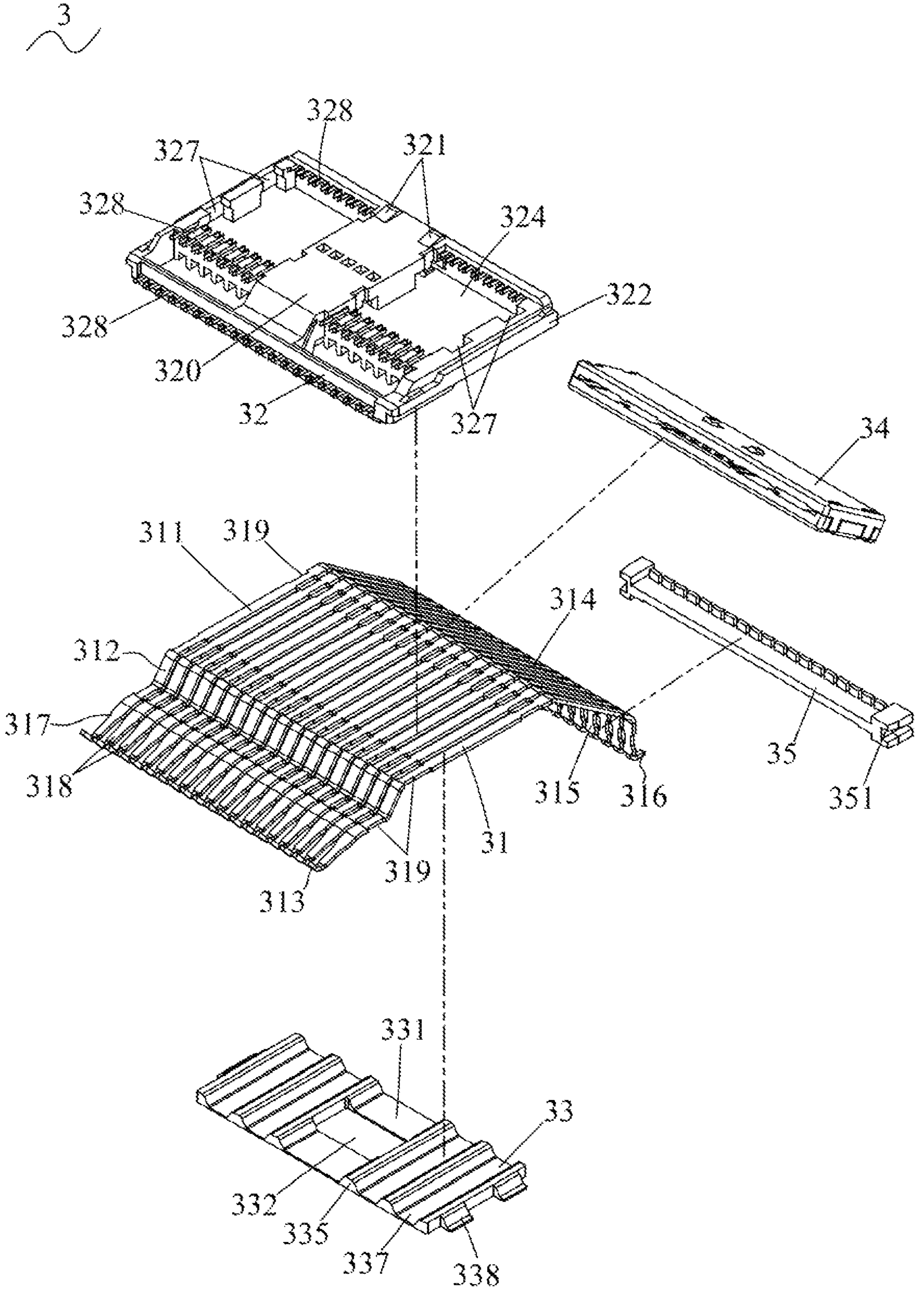
FIG. 34 is an exploded view of the first terminal assembly of the terminal module of the high-speed connector in accordance with a second preferred embodiment of the present invention.
Figure 35:
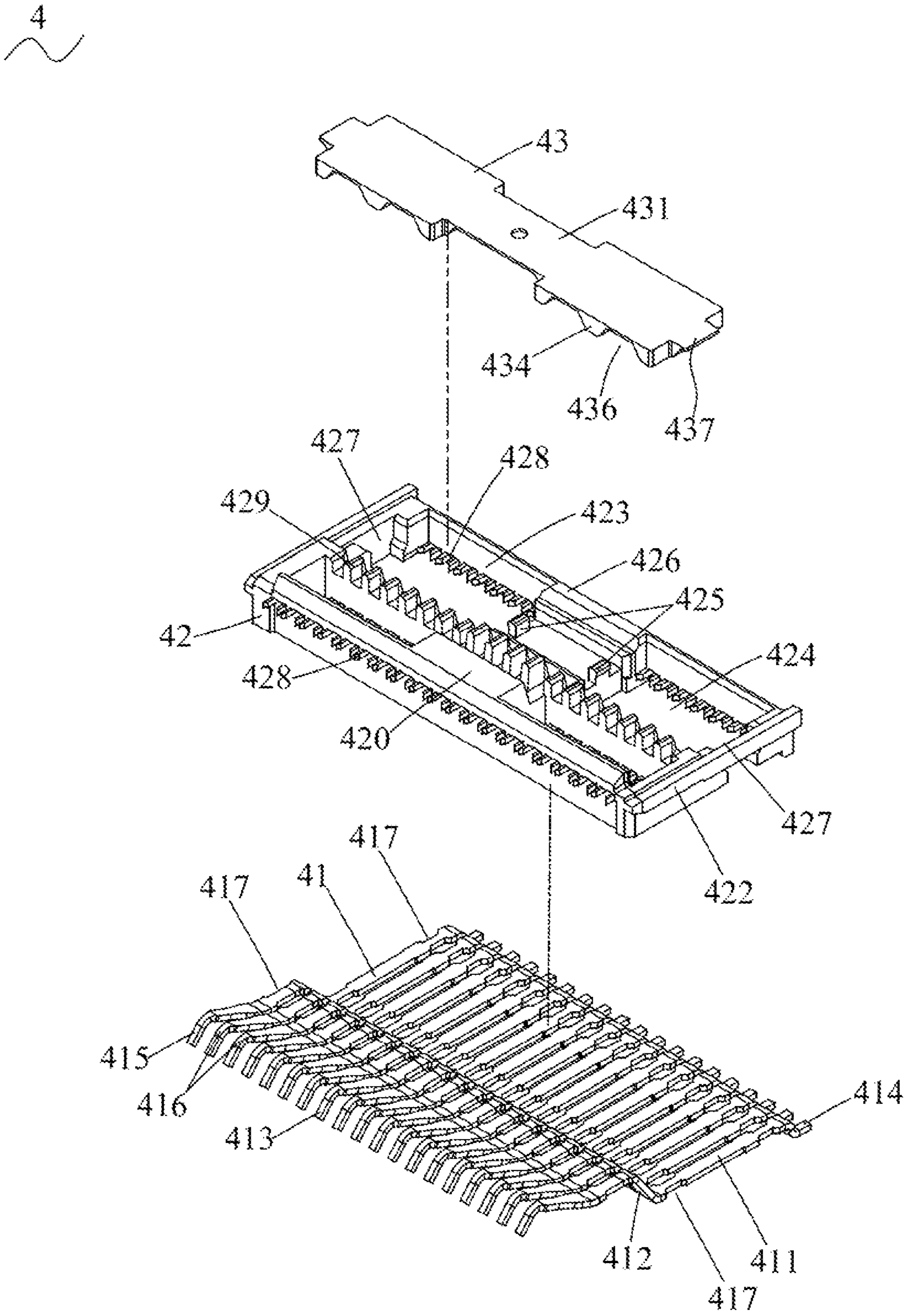
FIG. 35 is an exploded view of the second terminal assembly of the high-speed connector in accordance with the second preferred embodiment of the present invention.
Figure 36:
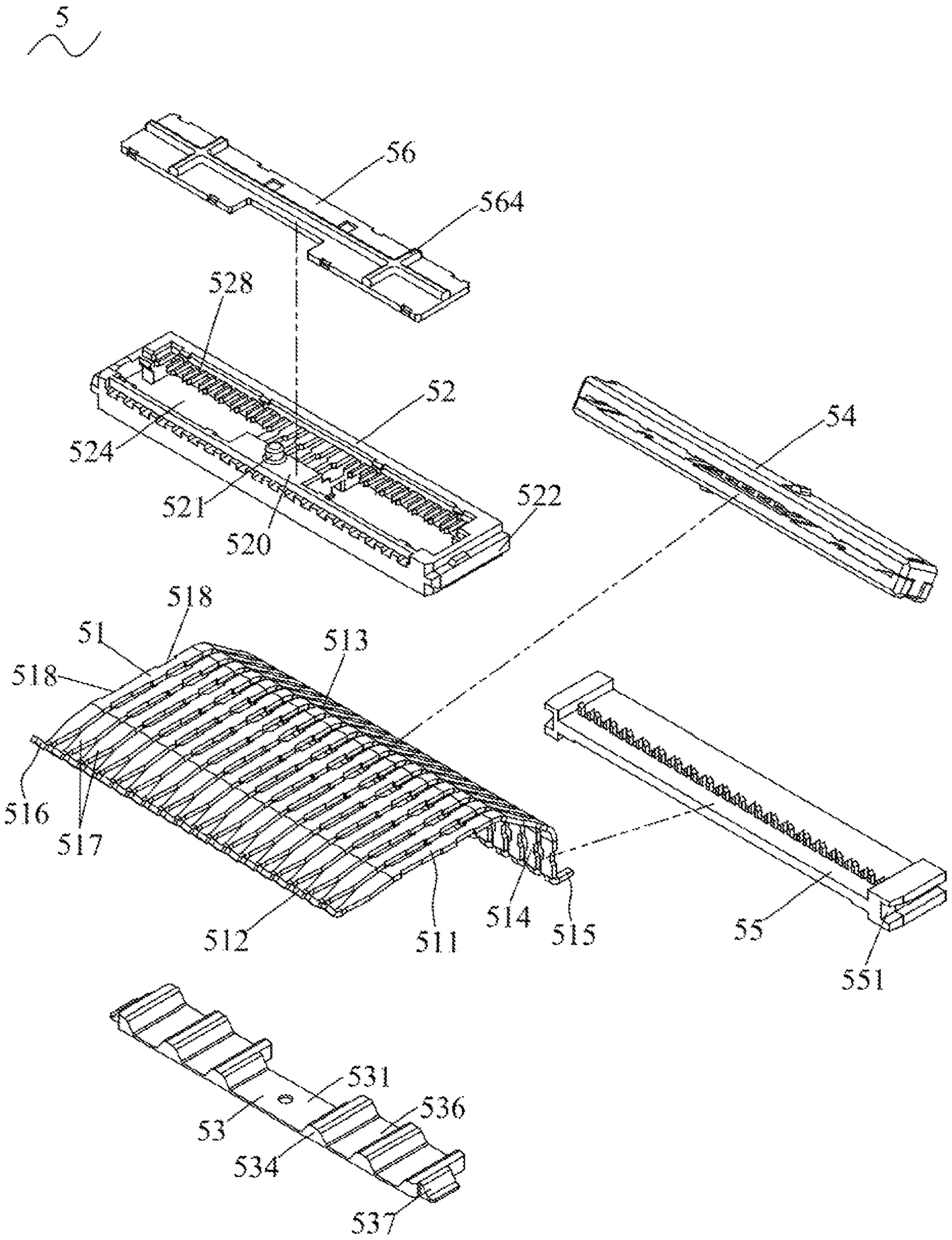
FIG. 36 is an exploded view of the third terminal assembly of the high-speed connector in accordance with the second preferred embodiment of the present invention.
Figure 37:
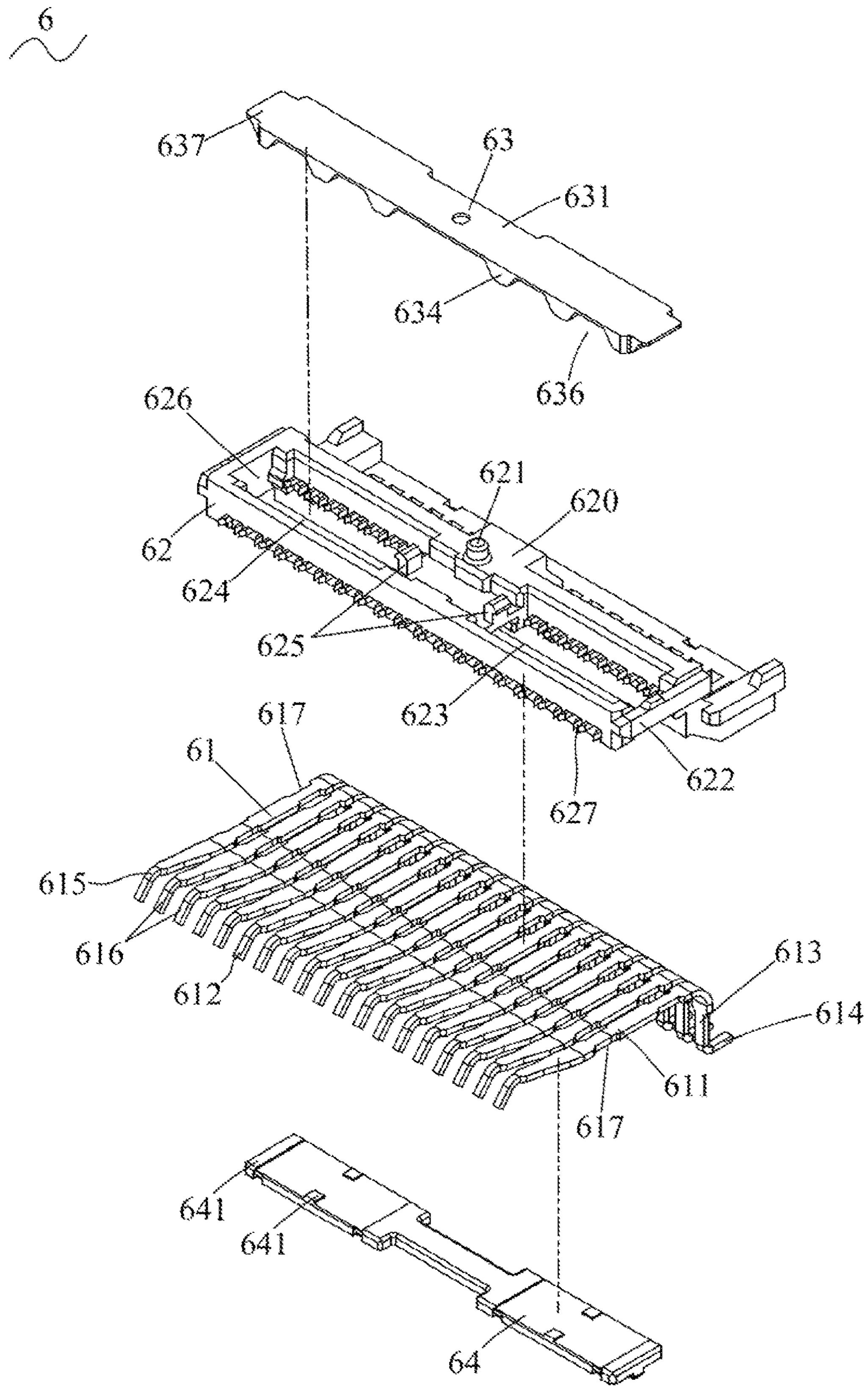
FIG. 37 is an exploded view of the fourth terminal assembly of the high-speed connector in accordance with the second preferred embodiment of the present invention.

Referring to FIG. 31 to FIG. 33, the second laminar structure 64 is formed by the plastic injection molding technology. The second laminar structure 64 is located in the second locating groove 601. An inner surface of the second laminar structure 64 has a plurality of fourth attaching surfaces 641. Several portions of two sides of a bottom surface of the second laminar structure 64 protrude downward to form the plurality of the fourth attaching surfaces 641. In the first preferred embodiment, the plurality of the fourth attaching surfaces 641 of the second laminar structure 64 are corresponding to the bottom surfaces of the fourth fastening portions 611 of the fourth grounding terminals 615 of the two sides of the fourth terminal assembly 6. The plurality of the fourth attaching surfaces 641 of the second laminar structure 64 contact with the bottom surfaces of the fourth fastening portions 611 of the fourth grounding terminals 615 of the two sides of the fourth terminal assembly 6.

Referring to FIG. 3, FIG. 31, FIG. 32 and FIG. 33, the second laminar structure 64 is spaced from the fourth metal block 63. The second laminar structure 64, the fourth main plate 631 and the plurality of the fourth contacting blocks 634 of the fourth metal block 63 surround a plurality of second internal spaces 642. Each second internal space 642 is formed among the second laminar structure 64, the fourth main plate 631 and the two adjacent fourth contacting blocks 634 of the fourth metal block 63. The fourth fastening portions 611 of each two adjacent fourth differential signal terminals 616 of the two sides of the fourth terminal assembly 6 pass through one second internal space 642. The bottom surface of the fourth fastening portion 611 of each fourth differential signal terminal 616 of the two sides of the fourth terminal assembly 6 is spaced from the inner surface of the second laminar structure 64 to form a second clearance 643. A plurality of the second clearances 643 are formed between the fourth terminal assembly 6 and the inner surface of the second laminar structure 64. Each second internal space 642 and the second clearance 643 are used for adjusting the dielectric coefficient of the peripheral structure of each fourth terminal 61 of the high-speed connector 100 to improve the electromagnetic characteristic and the cross-talk interference of the high-speed connector 100.

In the concrete implementation, according to a whole structure adjustment of the fourth terminal assembly 6, a size of the second clearance 643 is changed, and the second clearance 643 is even canceled. An outer surface of the second laminar structure 64 extends outward to form a second strengthening structure 644. The second strengthening structure 644 is used for reinforcing a structural strength of the second laminar structure 64. In the first preferred embodiment, two sides of the second strengthening structure 644 are shown as the two cross structures from a vertical view to reinforce the structural strength of the second laminar structure 64.

Referring to FIG. 3 to FIG. 33, in the first preferred embodiment, the first holding element 35 of the first terminal assembly 3 abuts against a rear end of the second holding element 55 of the third terminal assembly 5. The rear end of the fourth base body 62 abuts against a front end of the second holding element 55 of the third terminal assembly 5. The bottom surface of the third base body 52 of the third terminal assembly 5 abuts against the top surface of the front end of the fourth base body 62 of the fourth terminal assembly 6. The bottom surface of the front end of the fourth base body 62 of the fourth terminal assembly 6 abuts against a top surface of the rear end of the second base body 42 of the second terminal assembly 4.

Referring to FIG. 1 to FIG. 37, the high-speed connector 100 in accordance with a second preferred embodiment of the present invention is shown. Differences between the high-speed connector 100 in accordance with the first preferred embodiment and the high-speed connector 100 in accordance with the second preferred embodiment are described as follows. Shapes of the first contacting blocks 335 of the first metal block 33, the second contacting blocks 434 of the second metal block 43, the third contacting blocks

534 of the third metal block 53 and the fourth contacting blocks 634 of the fourth metal block 63 are different. A thickness of the first main plate 331 of the first metal block 33, a thickness of the second main plate 431 of the second metal block 43, a thickness of the third main plate 531 of the third metal block 53 and a thickness of the fourth main plate 631 of the fourth metal block 63 are all different. In the first preferred embodiment, the first contacting blocks 335 of the first metal block 33, the second contacting blocks 434 of the second metal block 43, the third contacting blocks 534 of the third metal block 53 and the fourth contacting blocks 634 of the fourth metal block 63 are rectangular. In the second preferred embodiment, each first contacting block 335 of the first metal block 33, each second contacting block 434 of the second metal block 43, each third contacting block 534 of the third metal block 53 and each fourth contacting block 634 of the fourth metal block 63 are trapezoidal. The first metal block 33, the second metal block 43, the third metal block 53 and the fourth metal block 63 are forged from metal chunks.

Referring to FIG. 1 to FIG. 37, in summary, the high-speed connector 100 includes at least one terminal assembly 10 disposed in the insulating housing 1. The at least one terminal assembly 10 is at least one of the first terminal assembly 3, the second terminal assembly 4, the third terminal assembly 5 and the fourth terminal assembly 6. The at least one terminal assembly 10 includes a base body 101, a plurality of the terminals 205 fastened to the base body 101, a metal block 104 and a laminar structure 206. The plurality of the terminals 205 includes a plurality of grounding terminals 102 and a plurality of differential signal terminals 103. A surface of the base body 101 is recessed inward to form a fastening groove 105. Specifically, two opposite surfaces of the base body 101 are recessed inward to form the fastening groove 105 and a locating groove 207, respectively. The plurality of the grounding terminals 102 and the plurality of the differential signal terminals 103 are fastened to the base body 101. Each terminal 205 has a fastening portion 106. Each of the plurality of the grounding terminals 102 and the differential signal terminals 103 has the fastening portion 106. Two opposite ends of the fastening portion 106 are connected with a contacting portion 107 and a soldering portion 108. The fastening portions 106 of the plurality of the grounding terminals 102 and the differential signal terminals 103 are fastened in the base body 101, and the fastening portions 106 of the plurality of the grounding terminals 102 and the differential signal terminals 103 are partially exposed to the fastening groove 105.

The metal block 104 is fastened in the fastening groove 105. The metal block 104 has a main plate 201. Several portions of a surface of the main plate 201 protrude towards the plurality of the grounding terminals 102 to form a plurality of contacting blocks 202. The main plate 201 defines at least one slit 203 penetrating through two opposite surfaces of the main plate 201 along the up-down direction. The at least one slit 203 is formed between two adjacent contacting blocks 202.

The fastening portions 106 of at least several of the plurality of the grounding terminals 102 and the differential signal terminals 103 are exposed to the fastening groove 105. Specifically, two opposite surfaces of each fastening portion 106 of the plurality of the grounding terminals 102 and the differential signal terminals 103 which are fastened to two sides of the at least one terminal assembly 10 are exposed to the fastening groove 105 and the locating groove 207, respectively. The fastening portions 106 of the grounding terminals 102 which are exposed to the fastening groove 105 are electrically connected with the plurality of the contacting blocks 202 of the metal block 104 to form the grounding structure 90.

Each two adjacent differential signal terminals 103 are disposed between two grounding terminals 102. Each two adjacent differential signal terminals 103 which are disposed between the two grounding terminals 102 form a differential signal terminal pair 109. The at least one slit 203 is aligned with an interstice 204 which is formed between the two fastening portions 106 of the two adjacent differential signal terminals 103 of at least one differential signal terminal pair 109, and the two fastening portions 106 of the two adjacent differential signal terminals 103 of the at least one differential signal terminal pair 109 are exposed to the fastening groove 105. An extending direction of the at least one slit 203 and extending directions of the two fastening portions 106 of the two adjacent differential signal terminals 103 of the at least one differential signal terminal pair 109 are the same. The main plate 201 keeps distances from the two fastening portions 106 of the two adjacent differential signal terminals 103 of the at least one differential signal terminal pair 109. The laminar structure 206 is fastened in the locating groove 207. The laminar structure 206 is spaced from the main plate 201 and each two adjacent contacting blocks 202 of the metal block 104 to form an internal space 209 between the laminar structure 206 and the metal block 104. The fastening portions 106 of the differential signal terminals 103 of the two sides of the at least one terminal assembly 10 pass through the internal spaces 209 which are formed between the laminar structure 206 and the metal block 104. One surface of each fastening portion 106 of the differential signal terminals 103 of the two sides of the at least one terminal assembly 10 faces an inner surface of the laminar structure 206. The one surface of each fastening portion 106 of the differential signal terminals 103 of the two sides of the at least one terminal assembly 10 is spaced from the inner surface of the laminar structure 206 to form a clearance 208 between the one surface of each fastening portion 106 of the differential signal terminals 103 of the two sides of the at least one terminal assembly 10 and the inner surface of the laminar structure 206.

The base body 101 of the at least one terminal assembly 10 is at least one of the first base body 32 of the first terminal assembly 3, the second base body 42 of the second terminal assembly 4, the third base body 52 of the third terminal assembly 5 and the fourth base body 62 of the fourth terminal assembly 6 of the terminal module 2. Each terminal 205 of the at least one terminal assembly 10 is at least one of the first terminal 31 of the first terminal assembly 3, the second terminal 41 of the second terminal assembly 4, the third terminal 51 of the third terminal assembly 5 and the fourth terminal 61 of the fourth terminal assembly 6 of the terminal module 2. Each grounding terminal 102 of the at least one terminal assembly 10 is at least one of the first grounding terminal 317 of the first terminal assembly 3, the second grounding terminal 415 of the second terminal assembly 4, the third grounding terminal 516 of the third terminal assembly 5 and the fourth grounding terminal 615 of the fourth terminal assembly 6 of the terminal module 2. Each differential signal terminal 103 of the at least one terminal assembly 10 is at least one of the first differential signal terminal 318 of the first terminal assembly 3, the second differential signal terminal 416 of the second terminal assembly 4, the third differential signal terminal 517 of the third terminal assembly 5 and the fourth differential signal terminal 616 of the fourth terminal assembly 6 of the terminal module 2.

The metal block 104 of the at least one terminal assembly 10 is at least one of the first metal block 33 of the first terminal assembly 3, the second metal block 43 of the second terminal assembly 4, the third metal block 53 of the third terminal assembly 5 and the fourth metal block 63 of the fourth terminal assembly 6 of the terminal module 2. The fastening groove 105 of the at least one terminal assembly 10 is at least one of the first fastening groove 323 of the first terminal assembly 3, the second fastening groove 423 of the second terminal assembly 4, the third fastening groove 523 of the third terminal assembly 5 and the fourth fastening groove 623 of the fourth terminal assembly 6 of the terminal module 2. Each fastening portion 106 of the at least one terminal assembly 10 is at least one of the first fastening portion 311 of the first terminal 31 of the first terminal assembly 3, the second fastening portion 411 of the second terminal 41 of the second terminal assembly 4, the third fastening portion 511 of the third terminal 51 of the third terminal assembly 5 and the fourth fastening portion 611 of the fourth terminal 61 of the fourth terminal assembly 6 of the terminal module 2. The contacting portion 107 of the at least one terminal assembly 10 is at least one of the first contacting portion 313 of the first terminal 31 of the first terminal assembly 3, the second contacting portion 413 of the second terminal 41 of the second terminal assembly 4, the third contacting portion 512 of the third terminal 51 of the third terminal assembly 5 and the fourth contacting portion 612 of the fourth terminal 61 of the fourth terminal assembly 6 of the terminal module 2. The soldering portion 108 of the at least one terminal assembly 10 is at least one of the first soldering portion 316 of the first terminal 31 of the first terminal assembly 3, the second soldering portion 414 of the second terminal 41 of the second terminal assembly 4, the third soldering portion 515 of the third terminal 51 of the third terminal assembly 5 and the fourth soldering portion 614 of the fourth terminal 61 of the fourth terminal assembly 6 of the terminal module 2. The at least one differential signal terminal pair 109 is at least one of the first differential signal terminal pair of the first terminal assembly 3, the second differential signal terminal pair of the second terminal assembly 4, the third differential signal terminal pair of the third terminal assembly 5 and the fourth differential signal terminal pair of the fourth terminal assembly 6 of the terminal module 2.

The main plate 201 of the at least one terminal assembly 10 is at least one of the first main plate 331 of the first metal block 33 of the first terminal assembly 3, the second main plate 431 of the second metal block 43 of the second terminal assembly 4, the third main plate 531 of the third metal block 53 of the third terminal assembly 5 and the fourth main plate 631 of the fourth metal block 63 of the fourth terminal assembly 6 of the terminal module 2. Each contacting block 202 of the at least one terminal assembly 10 is at least one of the first contacting block 335 of the first metal block 33 of the first terminal assembly 3, the second contacting block 434 of the second metal block 43 of the second terminal assembly 4, the third contacting block 534 of the third metal block 53 of the third terminal assembly 5 and the fourth contacting block 634 of the fourth metal block 63 of the fourth terminal assembly 6 of the terminal module 2. The at least one slit 203 is at least one of the first slit 336 of the first metal block 33, the second slit 435 of the second metal block 43, the third slit 535 of the third metal block 53 and the fourth slit 635 of the fourth metal block 63 of the terminal module 2. The interstice 204 of the at least one terminal assembly 10 is at least one of the first interstice 302 of the first differential signal terminal pair of the first terminal assembly 3, the second interstice 304 of the second differential signal terminal pair of the second terminal assembly 4, the third interstice 503 of the third differential signal terminal pair of the third terminal assembly 5 and the fourth interstice 603 of the fourth differential signal terminal pair of the fourth terminal assembly 6 of the terminal module 2. The laminar structure 206 is at least one of the first laminar structure 56 of the third terminal assembly 5 and the second laminar structure 64 of the fourth terminal assembly 6. The locating groove 207 is at least one of the first locating groove 501 of the third terminal assembly 5 and the second locating groove 601 of the fourth terminal assembly 6. The clearance 208 is at least one of the first clearance 563 of the third terminal assembly 5 and the second clearance 643 of the fourth terminal assembly 6. The internal space 209 is at least one of the first internal space 562 of the third terminal assembly 5 and the second internal space 642 of the fourth terminal assembly 6.

In the first preferred embodiment, each contacting block 202 of the at least one terminal assembly 10 is rectangular. The first contacting block 335 of the first terminal assembly 3, the second contacting block 434 of the second terminal assembly 4, the third contacting block 534 of the third terminal assembly 5 and the fourth contacting block 634 of the fourth terminal assembly 6 of the terminal module 2 is rectangular.

In the second preferred embodiment, each contacting block 202 of the at least one terminal assembly 10 is trapezoidal. The first contacting block 335 of the first terminal assembly 3, the second contacting block 434 of the second terminal assembly 4, the third contacting block 534 of the third terminal assembly 5 and the fourth contacting block 634 of the fourth terminal assembly 6 of the terminal module 2 is trapezoidal.

As described above, the contacting blocks 202 of the metal block 104 contact with the grounding terminals 102 of the at least one terminal assembly 10 to form the grounding structures 90, so that the signal noise is able to be effectively absorbed and the signal noise is able to be effectively restrained for improving the transmission quality of the high-frequency signal of the high-speed connector 100. Furthermore, the first interval 3414 and each first gap 3415 of the first dielectric structure 34 are used for adjusting the dielectric coefficient of the peripheral structure of each first terminal 31, the second interval 5414 and each second gap 5415 of the second dielectric structure 54 are used for adjusting the dielectric coefficient of the peripheral structure of each third terminal 51, the first internal space 562 and the first clearance 563 are used for adjusting the dielectric coefficient of the peripheral structure of each third terminal 51 of the high-speed connector 100, and each second internal space 642 and the second clearance 643 are used for adjusting the dielectric coefficient of the peripheral structure of each fourth terminal 61 of the high-speed connector 100 to improve the electromagnetic characteristic and the crosstalk interference of the high-speed connector 100. In addition, the first slit 336 of the first metal block 33, the second slit 435 of the second metal block 43, the third slit 535 of the third metal block 53 and the fourth slit 635 of the fourth metal block 63 are used to improve the electromagnetic field crosstalk interference so as to improve the crosstalk interference of the high-speed connector 100. As a result, the high-speed connector 100 improves the transmission quality of the high-frequency signal of the high-speed connector 100 by adjusting a dielectric coefficient of a peripheral structure of the terminal 205 of the high-speed connector 100, the high-speed connector 100 improves the electromagnetic characteristic and the crosstalk interference of the high-speed connector 100.

What is claimed is:

1. A high-speed connector, comprising:

an insulating housing; and at least one terminal assembly disposed in the insulating housing, the at least one terminal assembly including:

a base body, a surface of the base body being recessed inward to form a fastening groove;

a plurality of terminals fastened to the base body, the plurality of the terminals including a plurality of grounding terminals and a plurality of differential signal terminals, each of the plurality of the grounding terminals and the differential signal terminals having a fastening portion, two opposite ends of the fastening portion being connected with a contacting portion and a soldering portion, the fastening portions of the plurality of the grounding terminals and the differential signal terminals being fastened in the base body, and the fastening portions of at least several of the plurality of the grounding terminals and the differential signal terminals being exposed to the fastening groove; and a metal block fastened in the fastening groove, the metal block having a main plate, several portions of a surface of the main plate protruding towards the plurality of the grounding terminals to form a plurality of contacting blocks, the main plate defining at least one slit penetrating through two opposite surfaces of the main plate along an up-down direction, the at least one slit being formed between two adjacent contacting blocks, the fastening portions of the grounding terminals which are exposed to the fastening groove being electrically connected with the plurality of the contacting blocks of the metal block to form a grounding structure;

wherein each two adjacent differential signal terminals are disposed between two grounding terminals, each two adjacent differential signal terminals which are disposed between the two grounding terminals form a differential signal terminal pair, the at least one slit is aligned with an interstice which is formed between the two fastening portions of the two adjacent differential signal terminals of at least one differential signal terminal pair, and the two fastening portions of the two adjacent differential signal terminals of the at least one differential signal terminal pair are exposed to the fastening groove, an extending direction of the at least one slit and extending directions of the two fastening portions of the two adjacent differential signal terminals of the at least one differential signal terminal pair are the same, the main plate keeps distances from the two fastening portions of the two adjacent differential signal terminals of the at least one differential signal terminal pair.

2. The high-speed connector as claimed in claim 1, wherein the high-speed connector includes a terminal module disposed in the insulating housing, the terminal module includes a first terminal assembly, a second terminal assembly, a third terminal assembly and a fourth terminal assembly, the first terminal assembly and the second terminal assembly are disposed opposite to each other, the third terminal assembly and the fourth terminal assembly are disposed opposite to each other, the third terminal assembly and the fourth terminal assembly are mounted between the first terminal assembly and the second terminal assembly, the at least one terminal assembly is at least one of the first terminal assembly, the second terminal assembly, the third terminal assembly and the fourth terminal assembly.

3. The high-speed connector as claimed in claim 2, wherein the base body is at least one of a first base body of the first terminal assembly, a second base body of the second terminal assembly, a third base body of the third terminal assembly and a fourth base body of the fourth terminal assembly, each terminal is at least one of a first terminal of the first terminal assembly, a second terminal of the second terminal assembly, a third terminal of the third terminal assembly and a fourth terminal of the fourth terminal assembly, each grounding terminal is at least one of a first grounding terminal of the first terminal assembly, a second grounding terminal of the second terminal assembly, a third grounding terminal of the third terminal assembly and a fourth grounding terminal of the fourth terminal assembly, each differential signal terminal is at least one of a first differential signal terminal of the first terminal assembly, a second differential signal terminal of the second terminal assembly, a third differential signal terminal of the third terminal assembly and a fourth differential signal terminal of the fourth terminal assembly, the metal block is at least one of a first metal block of the first terminal assembly, a second metal block of the second terminal assembly, a third metal block of the third terminal assembly and a fourth metal block of the fourth terminal assembly, the fastening groove is at least one of a first fastening groove of the first terminal assembly, a second fastening groove of the second terminal assembly, a third fastening groove of the third terminal assembly and a fourth fastening groove of the fourth terminal assembly, each fastening portion is at least one of a first fastening portion of the first terminal, a second fastening portion of the second terminal, a third fastening portion of the third terminal and a fourth fastening portion of the fourth terminal, the contacting portion is at least one of a first contacting portion of the first terminal, a second contacting portion of the second terminal, a third contacting portion of the third terminal and a fourth contacting portion of the fourth terminal, the soldering portion is at least one of a first soldering portion of the first terminal, a second soldering portion of the second terminal, a third soldering portion of the third terminal and a fourth soldering portion of the fourth terminal, the at least one differential signal terminal pair is at least one of a first differential signal terminal pair of the first terminal assembly, a second differential signal terminal pair of the second terminal assembly, a third differential signal terminal pair of the third terminal assembly and a fourth differential signal terminal pair of the fourth terminal assembly, the main plate is at least one of a first main plate of the first metal block, a second main plate of the second metal block, a third main plate of the third metal block and a fourth main plate of the fourth metal block, each contacting block is at least one of a first contacting block of the first metal block, a second contacting block of the second metal block, a third contacting block of the third metal block and a fourth contacting block of the fourth metal block, the at least one slit is at least one of a first slit of the first metal block, a second slit of the second metal block, a third slit of the third metal block and a fourth slit of the fourth metal block, the interstice is at least one of a first interstice of the first differential signal terminal pair, a second interstice of the second differential signal terminal pair, a third interstice of the third differential signal terminal pair and a fourth interstice of the fourth differential signal terminal pair.

4. The high-speed connector as claimed in claim 3, wherein the insulating housing has a main portion, two sides of a middle of a top of the main portion form a plurality of first penetrating grooves arranged along a transverse direction, the first terminal assembly includes the first base body, each first penetrating groove penetrates through the top of the main portion and extends longitudinally, the first fastening portions of the plurality of the first terminals which are located at two sides of the first base body of two sides of the first terminal assembly are corresponding to the plurality of the first penetrating grooves, two sides of a front end of a bottom of the main portion form a plurality of second penetrating grooves arranged along the transverse direction, each second penetrating groove penetrates through the bottom of the main portion and extends longitudinally, the second contacting portions of the plurality of the second terminals of two sides of the second terminal assembly are corresponding to the plurality of the second penetrating grooves.

5. The high-speed connector as claimed in claim 3, wherein the first base body has a plurality of first openings, two first openings of a front end of the first base body penetrate through two sides of a top surface and two sides of a bottom surface of the front end of the first base body, two tops of two sides of the first fastening groove extend upward to form the other two first openings penetrating through two sides of a top surface of a rear end of the first base body, the insulating housing has a main portion, two sides of an inner surface of a top of the main portion extend downward to form two convex surfaces, a quantity of the first openings of the rear end of the first base body is equal to a quantity of the convex surfaces of insulating housing, the first openings of the rear end of the first base body of the first terminal assembly are corresponding to the convex surfaces of the insulating housing.

6. The high-speed connector as claimed in claim 5, wherein the first base body has a first surrounding portion, the first surrounding portion is disposed to a middle of the first base body, and the first surrounding portion is connected between the front end of the first base body and the rear end of the first base body, a middle of the inner surface of the top of the main portion of the insulating housing has a concave surface formed between the two convex surfaces, the first surrounding portion of the first base body of the first terminal assembly is corresponding to the concave surface of the insulating housing.

7. The high-speed connector as claimed in claim 6, wherein the top of the main portion has at least one first through-hole vertically penetrating through the top of the main portion, at least one portion of a rear end of a top surface of the first surrounding portion protrudes upward to form at least one first protruding block, at least one portion of the middle of the inner surface of the top of the main portion is recessed inward to form at least one sliding groove, the at least one first through-hole is disposed in front of the at least one sliding groove, the at least one sliding groove extends longitudinally, the at least one first through-hole is longitudinally aligned with the at least one sliding groove, an inner surface of a top wall of the at least one sliding groove has an inclining zone, a buffering zone and a stopping zone longitudinally arranged in sequence, a rear end of the inner surface of the top wall of the at least one sliding groove slantwise extends frontward and downward to form the inclining zone, a front end of the inclining zone extends frontward to form the buffering zone, a front end of the buffering zone protrudes downward, and then extends frontward and towards the at least one first through-hole to form the stopping zone, a top surface of the buffering zone is a flat plane, a top surface of the stopping zone is another flat plane, the top surface of the stopping zone and the top surface of the buffering zone form a segment difference, so that a horizontal level of the top surface of the stopping zone is lower than a horizontal level of the top surface of the buffering zone, the concave surface is disposed among the at least one sliding groove and the two convex surfaces, the at least one first protruding block passes through the at least one sliding groove, a quantity of the at least one first protruding block of the first base body is equal to a quantity of the at least one first through-hole of the insulating housing, the at least one first protruding block is fastened in the at least one first through-hole.

8. The high-speed connector as claimed in claim 3, wherein the first terminal assembly includes the first base body and the first metal block, the first metal block has the first main plate, a middle of the first main plate defines a first limiting hole vertically penetrating through middles of a top surface and a bottom surface of the first main plate, the first base body has a first surrounding portion, a middle of a bottom surface of a rear end of the first surrounding portion extends downward to form a supporting block, the first limiting hole is positioned corresponding to the supporting block, a front and a rear of the first main plate defines a plurality of first locking holes penetrating through the top surface and the bottom surface of the first main plate, the first locking holes of the front of the first main plate are located in front of the first limiting hole, the first locking holes of the rear of the first main plate are located behind the first limiting hole, several portions of the bottom surface of the rear end of the first surrounding portion of the first base body extend downward and then protrude outward to form a plurality of first locking hooks, the plurality of the first locking hooks pass through the plurality of the first locking holes, the plurality of the first locking hooks are buckled to side walls of the plurality of the first locking holes, bottoms of the plurality of the first locking hooks are blocked by the bottom surface of the first main plate, several portions of two middles of a front surface and a rear surface of the first main plate protrude outward to form a plurality of first contacting points, the plurality of the first contacting points abut against a front inner wall and a rear inner wall of the first fastening groove of the first base body.

9. The high-speed connector as claimed in claim 3, wherein the first terminal assembly includes a plurality of the first terminals and the first metal block, the plurality of the first terminals include a plurality of the first grounding terminals and a plurality of the first differential signal terminals, each first terminal has the first fastening portion, the first metal block has the first main plate, several portions of two sides of a top surface of the first main plate protrude upward and towards the plurality of the first terminals to form a plurality of the first contacting blocks, the first limiting hole is located between the first contacting blocks of the two sides of the top surface of the first main plate, the plurality of the first contacting blocks are in contact with the first fastening portions of the first grounding terminals of the first terminals of two sides of the first terminal assembly to form the grounding structure, the first metal block has a plurality of first separating grooves, each first separating groove is formed among two adjacent first contacting blocks and the first main plate, the first fastening portions of each two adjacent first differential signal terminals of the two sides of the first terminal assembly are received in one first separating groove, bottom walls of the plurality of the first separating grooves are spaced from the first fastening portions of the first differential signal terminals of the two sides of the first terminal assembly along a vertical direction, and several portions of the first main plate are defined as the bottom walls of the plurality of the first separating grooves, so the first main plate keeps distances from the first fastening portions of the first differential signal terminals of the two sides of the first terminal assembly along the vertical direction.

10. The high-speed connector as claimed in claim 9, wherein the first main plate has a plurality of the first slits penetrating through the top surface and a bottom surface of the first main plate, a transverse width of a top of each first slit is narrower than a transverse width of a bottom of each first slit, each first slit has a first narrow aperture and a first wide aperture, the first narrow aperture is formed at the top surface of the first main plate, the first wide aperture is formed at the bottom surface of the first main plate, each two first slits are formed between two adjacent first contacting blocks, each first slit extends in a longitudinal direction, each two adjacent first differential signal terminals form a first differential signal terminal pair, each two first slits formed between the two adjacent first contacting blocks are aligned in the longitudinal direction, each two first slits which are formed between the two adjacent first contacting blocks are aligned with a first interstice between the two first fastening portions of the two adjacent first differential signal terminals of one first differential signal terminal pair along the up-down direction.

11. The high-speed connector as claimed in claim 10, wherein the second terminal assembly includes a plurality of the second terminals, the second base body and the second metal block, the second base body has a second surrounding portion, the plurality of the second terminals include a plurality of the second grounding terminals and a plurality of the second differential signal terminals, each second terminal has the second fastening portion, the second metal block has the second main plate, several portions of two sides of a bottom surface of the second main plate protrude downward and towards the plurality of the second terminals to form a plurality of the second contacting blocks, each second contacting block extends in the longitudinal direction, the plurality of the second contacting blocks are in contact with the second fastening portions of the second grounding terminals of the second terminals of two sides of the second terminal assembly to form the grounding structure, a middle of the second main plate defines two second locking holes vertically penetrating through a top surface and the bottom surface of the second main plate, the two second locking holes are located between the second contacting blocks of the two sides of the bottom surface of the second main plate, a middle of a top surface of a rear end of the second surrounding portion is recessed inward to form a first buckling groove, two sides of the top surface of the rear end of the second surrounding portion extend upward and then protrude outward to form two second locking hooks, the two second locking hooks are located to the first buckling groove, the two second locking hooks pass through the two second locking holes, the two second locking hooks are buckled to side walls of the two second locking holes, tops of the two second locking hooks are blocked by the top surface of the second main plate, several portions of two middles of a front surface and a rear surface of the second main plate protrude outward to form a plurality of second contacting points, the plurality of the second contacting points abut against a front inner wall and a rear inner wall of the first buckling groove.

12. The high-speed connector as claimed in claim 11, wherein the second main plate has a plurality of the second slits penetrating through two sides of the top surface and the two sides of the bottom surface of the second main plate, a transverse width of a bottom of each second slit is narrower than a transverse width of a top of each second slit, each second slit has a second narrow aperture and a second wide aperture, the second narrow aperture is formed at the bottom surface of the second main plate, the second wide aperture is formed at the top surface of the second main plate, each second slit is formed between two adjacent second contacting blocks, each second slit extends along the longitudinal direction, each two adjacent second differential signal terminals form a second differential signal terminal pair, each second slit which is formed between the two adjacent second contacting blocks is aligned with a second interstice between the two second fastening portions of the two adjacent second differential signal terminals of one second differential signal terminal pair along the up-down direction.

13. The high-speed connector as claimed in claim 12, wherein the third terminal assembly includes a plurality of the third terminals, the third base body and the third metal block, the third base body has a third surrounding portion, the plurality of the third terminals include a plurality of the third grounding terminals and a plurality of the third differential signal terminals, each third terminal has the third fastening portion, the third metal block has the third main plate, several portions of two sides of a top surface of the third main plate protrude upward and towards the plurality of the third terminals to form a plurality of the third contacting blocks, each third contacting block extends in the longitudinal direction, a middle of the third main plate defines two third locking holes vertically penetrating through the top surface and a bottom surface of the third main plate, the two third locking holes are located between the third contacting blocks of the two sides of the top surface of the third main plate, the plurality of the third contacting blocks are in contact with bottom surfaces of the third fastening portions of the plurality of the third grounding terminals of the third terminals of two sides of the third terminal assembly to form the grounding structure, two sides of a bottom of the third surrounding portion extend downward and then protrude outward to form two third locking hooks, the two third locking hooks pass through the two third locking holes, the two third locking hooks are buckled to side walls of the two third locking holes, bottoms of the two third locking hooks are blocked by the bottom surface of the third main plate, a middle of the third fastening groove of the third base body transversely penetrate through a middle of a bottom surface of the third surrounding portion to form a second buckling groove, the two third locking hooks are located to the second buckling groove, several portions of two middles of a front surface and a rear surface of the third main plate protrude outward to form a plurality of third contacting points, the plurality of the third contacting points abut against a front inner wall and a rear inner wall of the second buckling groove, the third metal block has a plurality of third separating grooves, each third separating groove is formed among two adjacent third contacting blocks and the third main plate, the third fastening portions of each two adjacent third differential signal terminals of the two sides of the third terminal assembly are received in one third separating groove, bottom walls of the plurality of the third separating grooves are spaced from the third fastening portions of the third differential signal terminals of the two sides of the third terminal assembly along a vertical direction, and several portions of the third main plate are defined as the bottom walls of the plurality of the third separating grooves, so the third main plate keeps distances from the third fastening portions of the third differential signal terminals of the two sides of the third terminal assembly along the vertical direction.

14. The high-speed connector as claimed in claim 13, wherein the third main plate has a plurality of the third slits penetrating through the two sides of the top surface and two sides of the bottom surface of the third main plate, a transverse width of a top of each third slit is narrower than a transverse width of a bottom of each third slit, each third slit has a third narrow aperture and a third wide aperture, the third narrow aperture is formed at the top surface of the third main plate, the third wide aperture is formed at the bottom surface of the third main plate, each third slit is formed between the two adjacent third contacting blocks, each third slit extends along the longitudinal direction, each two adjacent third differential signal terminals form a third differential signal terminal pair, each third slit which is formed between the two adjacent third contacting blocks is aligned with a third interstice between the two third fastening portions of the two adjacent third differential signal terminals of one third differential signal terminal pair along the up-down direction.

15. The high-speed connector as claimed in claim 14, wherein the fourth terminal assembly includes a plurality of the fourth terminals, the fourth base body and the fourth metal block, the fourth base body has a fourth surrounding portion, the plurality of the fourth terminals include a plurality of fourth grounding terminals and a plurality of fourth differential signal terminals, each fourth terminal has the fourth fastening portion, the fourth metal block has the fourth main plate, several portions of two sides of a bottom surface of the fourth main plate protrude downward and towards the plurality of the fourth terminals to form a plurality of the fourth contacting blocks, each fourth contacting block extends in the longitudinal direction, the plurality of the fourth contacting blocks are in contact with top surfaces of the fourth fastening portions of the plurality of the fourth grounding terminals of the fourth terminals of two sides of the fourth terminal assembly to form the grounding structure, a middle of the fourth main plate defines two fourth locking holes vertically penetrating through a top surface and the bottom surface of the fourth main plate, the two fourth locking holes are located between the fourth contacting blocks of the two sides of the bottom surface of the fourth main plate, a middle of the fourth fastening groove of the fourth base body transversely penetrate through a middle of a top surface of the fourth surrounding portion to form a third buckling groove, two sides of a top of the fourth surrounding portion extend upward and then protrude outward to form two fourth locking hooks, the two fourth locking hooks are located to the third buckling groove, the two fourth locking hooks pass through the two fourth locking holes, the two fourth locking hooks are buckled to side walls of the two fourth locking holes, tops of the two fourth locking hooks are blocked by the top surface of the fourth main plate, several portions of two middles of a front surface and a rear surface of the fourth main plate protrude outward to form a plurality of fourth contacting points, the plurality of the fourth contacting points abut against a front inner wall and a rear inner wall of the third buckling groove.

16. The high-speed connector as claimed in claim 15, wherein the fourth main plate has a plurality of the fourth slits penetrating through two sides of the top surface and the two sides of the bottom surface of the fourth main plate, a transverse width of a bottom of each fourth slit is narrower than a transverse width of a top of each fourth slit, each fourth slit has a fourth narrow aperture and a fourth wide aperture, the fourth narrow aperture is formed at the bottom surface of the fourth main plate, each fourth slit is formed between two adjacent fourth contacting blocks, each fourth slit extends along the longitudinal direction, each two adjacent fourth differential signal terminals form a fourth differential signal terminal pair, each fourth slit which is formed between the two adjacent fourth contacting blocks is aligned with a fourth interstice between the two fourth fastening portions of the two adjacent fourth differential signal terminals of one fourth differential signal terminal pair along the up-down direction.

17. The high-speed connector as claimed in claim 3, wherein the first contacting block, the second contacting block, the third contacting block and the fourth contacting block of the terminal module is rectangular.

18. The high-speed connector as claimed in claim 3, wherein the first contacting block, the second contacting block, the third contacting block and the fourth contacting block of the terminal module is trapezoidal.

19. A high-speed connector, comprising:

an insulating housing; and at least one terminal assembly disposed in the insulating housing, the at least one terminal assembly including:

a base body, a surface of the base body being recessed inward to form a fastening groove;

a plurality of terminals fastened to the base body, the plurality of the terminals including a plurality of grounding terminals and a plurality of differential signal terminals, each of the plurality of the grounding terminals and the differential signal terminals having a fastening portion, two opposite ends of the fastening portion being connected with a contacting portion and a soldering portion, the fastening portions of the plurality of the grounding terminals and the differential signal terminals being fastened in the base body, and the fastening portions of at least several of the plurality of the grounding terminals and the differential signal terminals being exposed to the fastening groove; and a metal block fastened in the fastening groove, the metal block having a main plate, several portions of a surface of the main plate protruding towards the plurality of the grounding terminals to form a plurality of contacting blocks, the main plate defining at least one slit penetrating through two opposite surfaces of the main plate along an up-down direction, the at least one slit being formed between two adjacent contacting blocks, the fastening portions of the grounding terminals which are exposed to the fastening groove being electrically connected with the plurality of the contacting blocks of the metal block to form a grounding structure;

wherein each two adjacent differential signal terminals are disposed between two grounding terminals, each two adjacent differential signal terminals which are disposed between the two grounding terminals form a differential signal terminal pair, the at least one slit is aligned with an interstice which is formed between the two fastening portions of the two adjacent differential signal terminals of at least one differential signal terminal pair, and the two fastening portions of the two adjacent differential signal terminals of the at least one differential signal terminal pair are exposed to the fastening groove, an extending direction of the at least one slit and extending directions of the two fastening portions of the two adjacent differential signal terminals of the at least one differential signal terminal pair are the same, the main plate keeps distances from the two fastening portions of the two adjacent differential signal terminals of the at least one differential signal terminal pair; and wherein each contacting block of the at least one terminal assembly is rectangular.

20. A high-speed connector, comprising:

an insulating housing; and at least one terminal assembly disposed in the insulating housing, the at least one terminal assembly including:

a base body, two opposite surfaces of the base body being recessed inward to form a fastening groove and a locating groove, respectively;

a plurality of terminals fastened to the base body, the plurality of the terminals including a plurality of grounding terminals and a plurality of differential signal terminals, each of the plurality of the grounding terminals and the differential signal terminals having a fastening portion, two opposite ends of the fastening portion being connected with a contacting portion and a soldering portion, the fastening portions of the plurality of the grounding terminals and the differential signal terminals being fastened in the base body, and two opposite surfaces of each fastening portion of the plurality of the grounding terminals and the differential signal terminals which are fastened to two sides of the at least one terminal assembly being exposed to the fastening groove and the locating groove, respectively;

a metal block fastened in the fastening groove, the metal block having a main plate, several portions of a surface of the main plate protruding towards the plurality of the grounding terminals to form a plurality of contacting blocks, the main plate defining at least one slit penetrating through two opposite surfaces of the main plate along an up-down direction, the at least one slit being formed between two adjacent contacting blocks, the fastening portions of the grounding terminals which are exposed to the fastening groove being electrically connected with the plurality of the contacting blocks of the metal block to form a grounding structure; and a laminar structure fastened in the locating groove;

wherein each two adjacent differential signal terminals are disposed between two grounding terminals, each two adjacent differential signal terminals which are disposed between the two grounding terminals form a differential signal terminal pair, the at least one slit is aligned with an interstice which is formed between the two fastening portions of the two adjacent differential signal terminals of at least one differential signal terminal pair, and the two fastening portions of the two adjacent differential signal terminals of the at least one differential signal terminal pair are exposed to the fastening groove, an extending direction of the at least one slit and extending directions of the two fastening portions of the two adjacent differential signal terminals of the at least one differential signal terminal pair are the same, the main plate keeps distances from the two fastening portions of the two adjacent differential signal terminals of the at least one differential signal terminal pair, the laminar structure is spaced from the main plate and each two adjacent contacting blocks of the metal block to form an internal space between the laminar structure and the metal block, the fastening portions of the differential signal terminals of the two sides of the at least one terminal assembly pass through the internal spaces which are formed between the laminar structure and the metal block, one surface of each fastening portion of the differential signal terminals of the two sides of the at least one terminal assembly faces an inner surface of the laminar structure, the one surface of each fastening portion of the differential signal terminals of the two sides of the at least one terminal assembly is spaced from the inner surface of the laminar structure to form a clearance between the one surface of each fastening portion of the differential signal terminals of the two sides of the at least one terminal assembly and the inner surface of the laminar structure.

* * * * *